United States Patent
Okamoto et al.

(10) Patent No.: US 8,089,589 B2
(45) Date of Patent: Jan. 3, 2012

(54) SEMI-TRANSMISSIVE-TYPE LIQUID CRYSTAL DISPLAY DEVICE AND METHOD FOR MANUFACTURING SAME

(75) Inventors: Mamoru Okamoto, Kanagawa (JP); Michiaki Sakamoto, Kanagawa (JP); Osamu Sukegawa, Kanagawa (JP); Ken-Ichirou Naka, Kanagawa (JP); Shin-Ichi Nakata, Kagoshima (JP); Masami Yamashita, Kagoshima (JP)

(73) Assignee: NLT Technologies, Ltd., Kanagawa (JP)

( * ) Notice: Subject to any disclaimer, the term of this patent is extended or adjusted under 35 U.S.C. 154(b) by 798 days.

(21) Appl. No.: 11/408,224

(22) Filed: Apr. 20, 2006

(65) Prior Publication Data
US 2006/0187392 A1 Aug. 24, 2006

Related U.S. Application Data

(62) Division of application No. 10/615,172, filed on Jul. 8, 2003, now Pat. No. 7,064,799.

(30) Foreign Application Priority Data

Jul. 10, 2002 (JP) .................................. 2002-201776

(51) Int. Cl.
G02F 1/1335 (2006.01)
(52) U.S. Cl. ........................................................ 349/114
(58) Field of Classification Search .................... 349/114
See application file for complete search history.

(56) References Cited

U.S. PATENT DOCUMENTS

| | | | |
|---|---|---|---|
| 6,124,799 A | 9/2000 | Parker | |
| 6,195,140 B1 | 2/2001 | Kubo et al. | |
| 6,452,654 B2 * | 9/2002 | Kubo et al. | 349/114 |
| 6,466,280 B1 * | 10/2002 | Park et al. | 349/43 |
| 6,657,689 B2 | 12/2003 | Baek | |
| 6,693,692 B1 | 2/2004 | Kaneko et al. | |
| 6,697,138 B2 * | 2/2004 | Ha et al. | 349/114 |
| 6,707,519 B1 | 3/2004 | Okamura et al. | |
| 6,853,421 B2 * | 2/2005 | Sakamoto et al. | 349/114 |
| 6,867,822 B2 | 3/2005 | Kim et al. | |

FOREIGN PATENT DOCUMENTS

| | | |
|---|---|---|
| CN | 1263607 A | 8/2000 |
| CN | 1310545 A | 8/2001 |
| CN | 1469675 A | 1/2004 |
| EP | 1 111 437 A1 | 6/2001 |
| JP | H11-101992 | 4/1999 |
| JP | H11-109417 | 4/1999 |
| JP | H11-316382 | 11/1999 |
| JP | 2000-187220 | 7/2000 |

(Continued)

Primary Examiner — James Dudek
(74) Attorney, Agent, or Firm — Scully, Scott, Murphy & Presser, P.C.

(57) ABSTRACT

A semi-transmissive-type liquid crystal display device is provided which is capable of preventing an electric erosion reaction between a reflective film made of Al (aluminum) or an Al alloy and a transparent electrode film made of ITO or a like (Indium Tin Oxide) and of inhibiting occurrence of a flicker caused by a residual DC (Direct Current) voltage in the reflective film. In the semi-transmissive-type of a liquid crystal display device, a transmissive region to provide light from a backlight source and a reflective region to receive ambient light are placed in a pixel region and a transparent electrode film is formed above a reflective film formed in the reflective region on an active matrix substrate with a second passivation film being interposed between the reflective film and the transparent electrode film.

3 Claims, 32 Drawing Sheets

FOREIGN PATENT DOCUMENTS

| | | |
|---|---|---|
| JP | 2000-258802 | 9/2000 |
| JP | 2001-201768 | 7/2001 |
| JP | 2001-221995 | 8/2001 |
| JP | 2002-90742 | 3/2002 |
| JP | 2002-162645 | 6/2002 |
| KR | 2001-0025955 | 4/2001 |

* cited by examiner

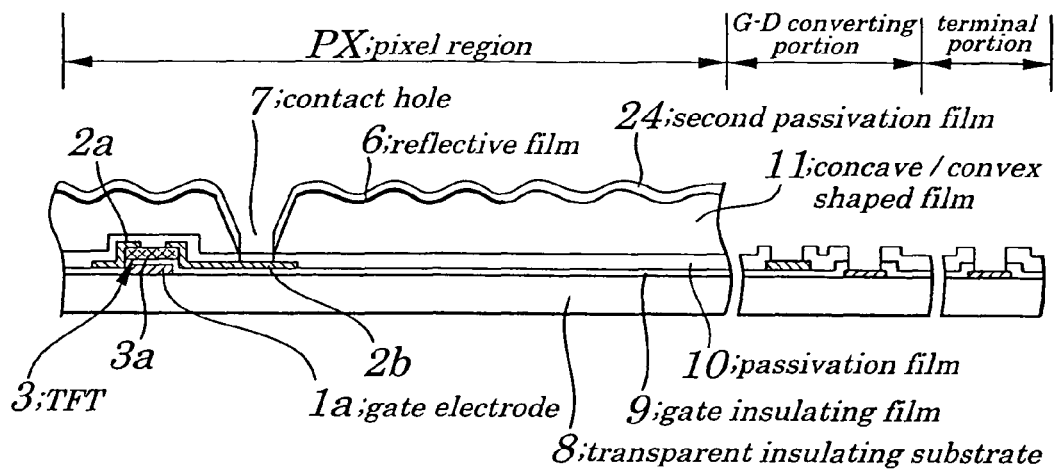
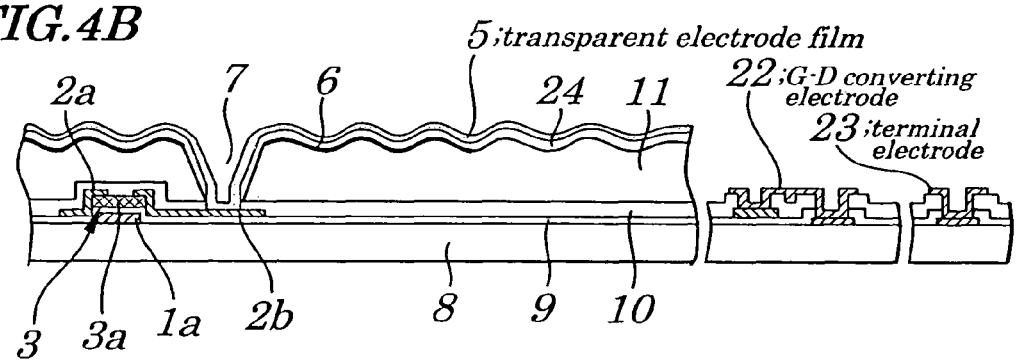
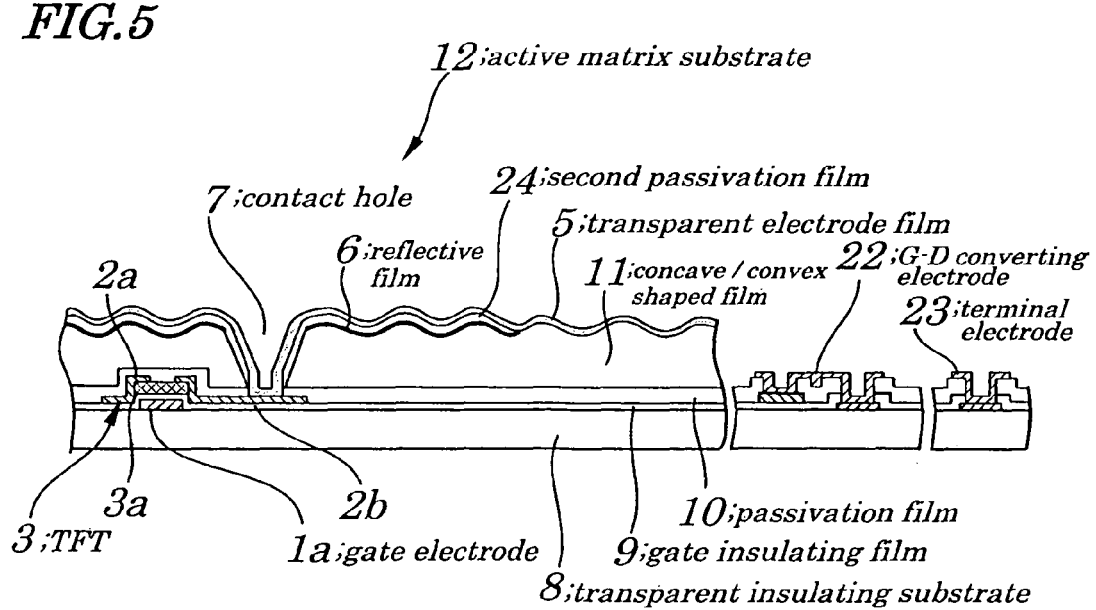

7;contact hole

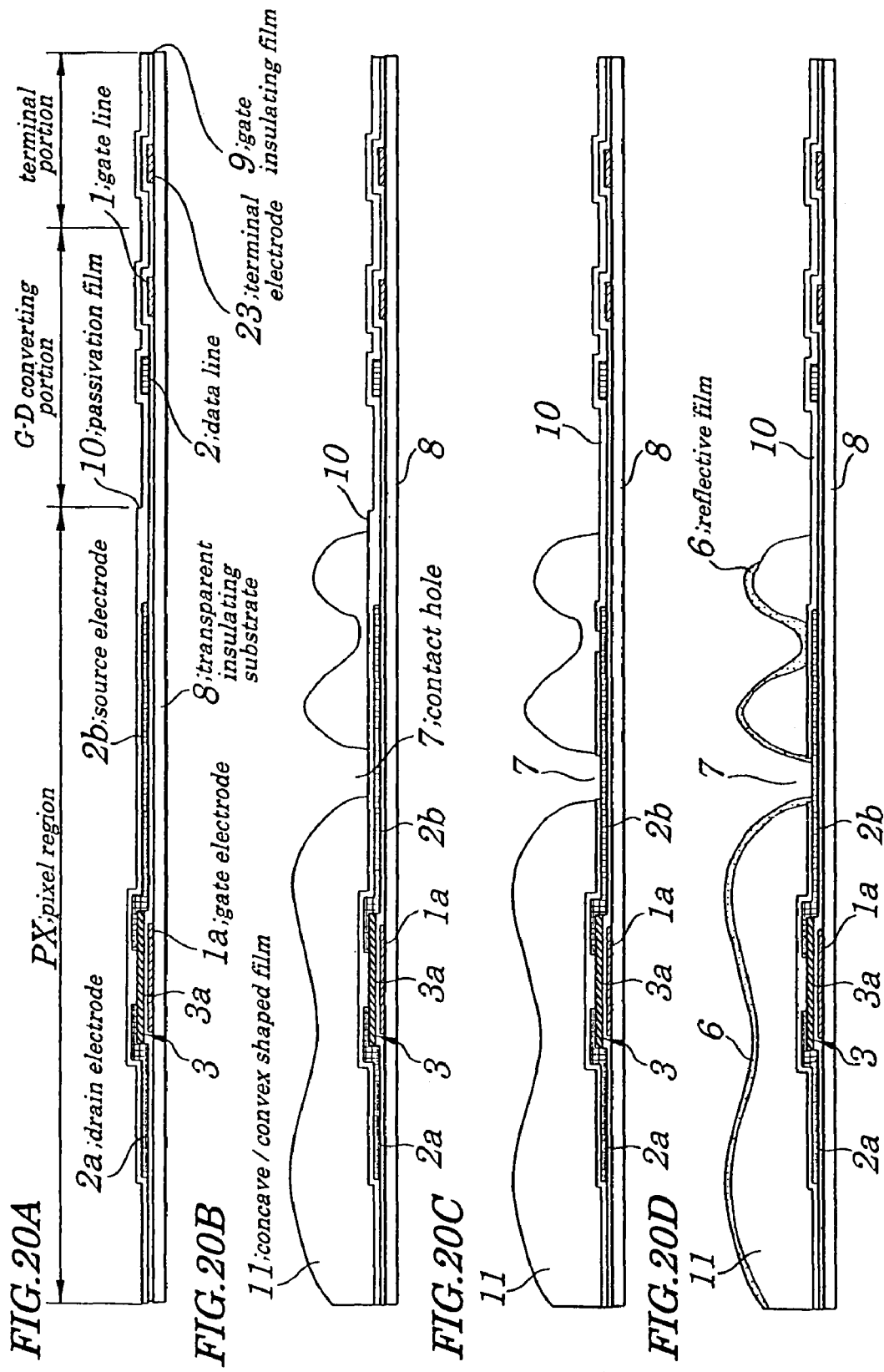

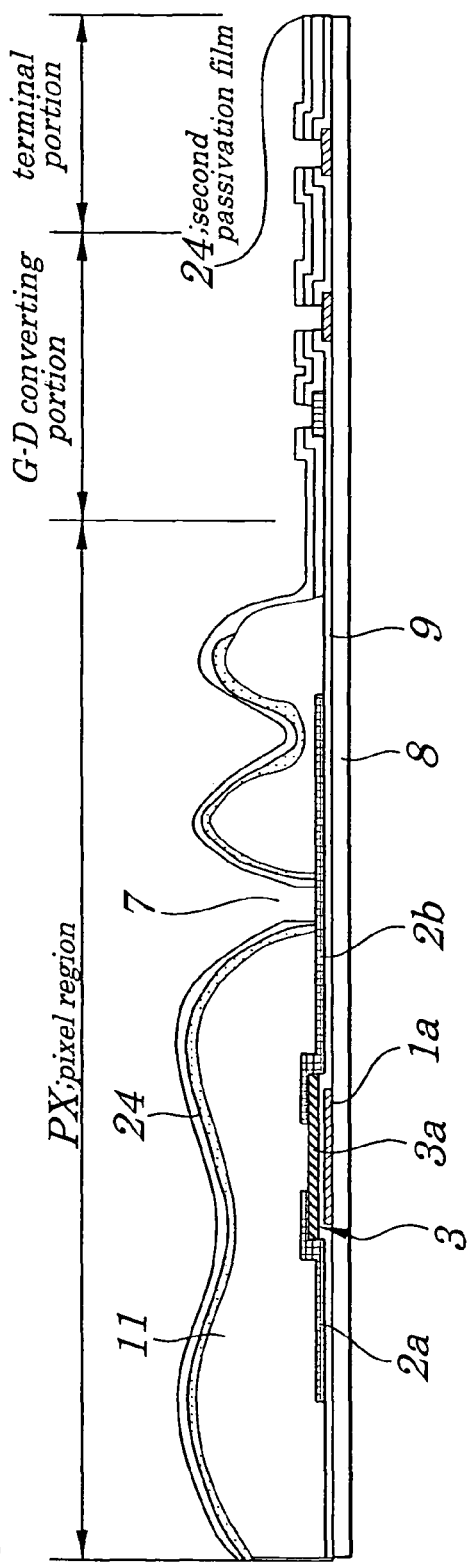
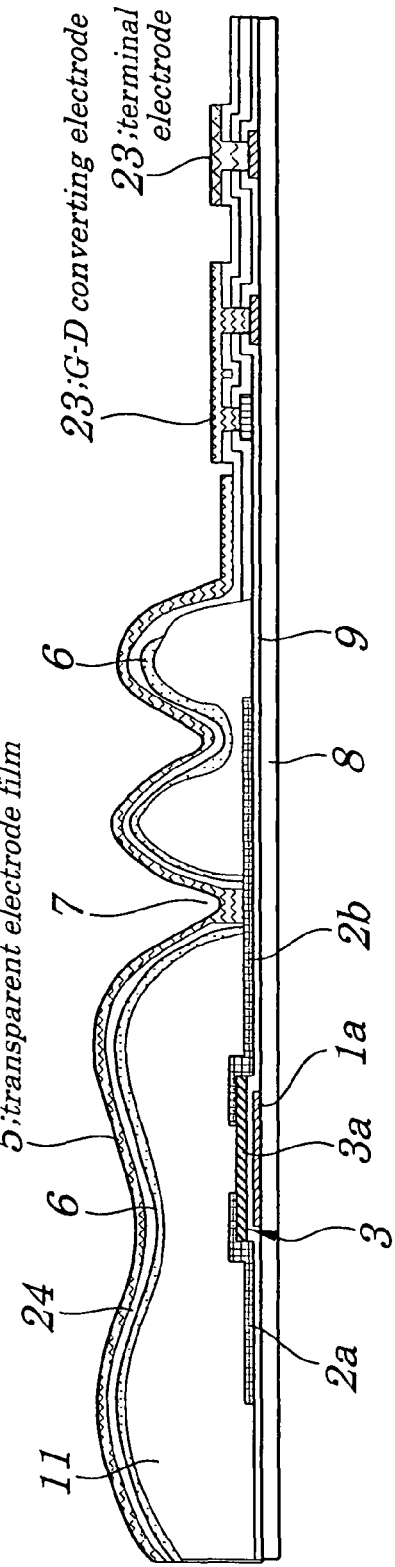
FIG.21A
FIG.21B

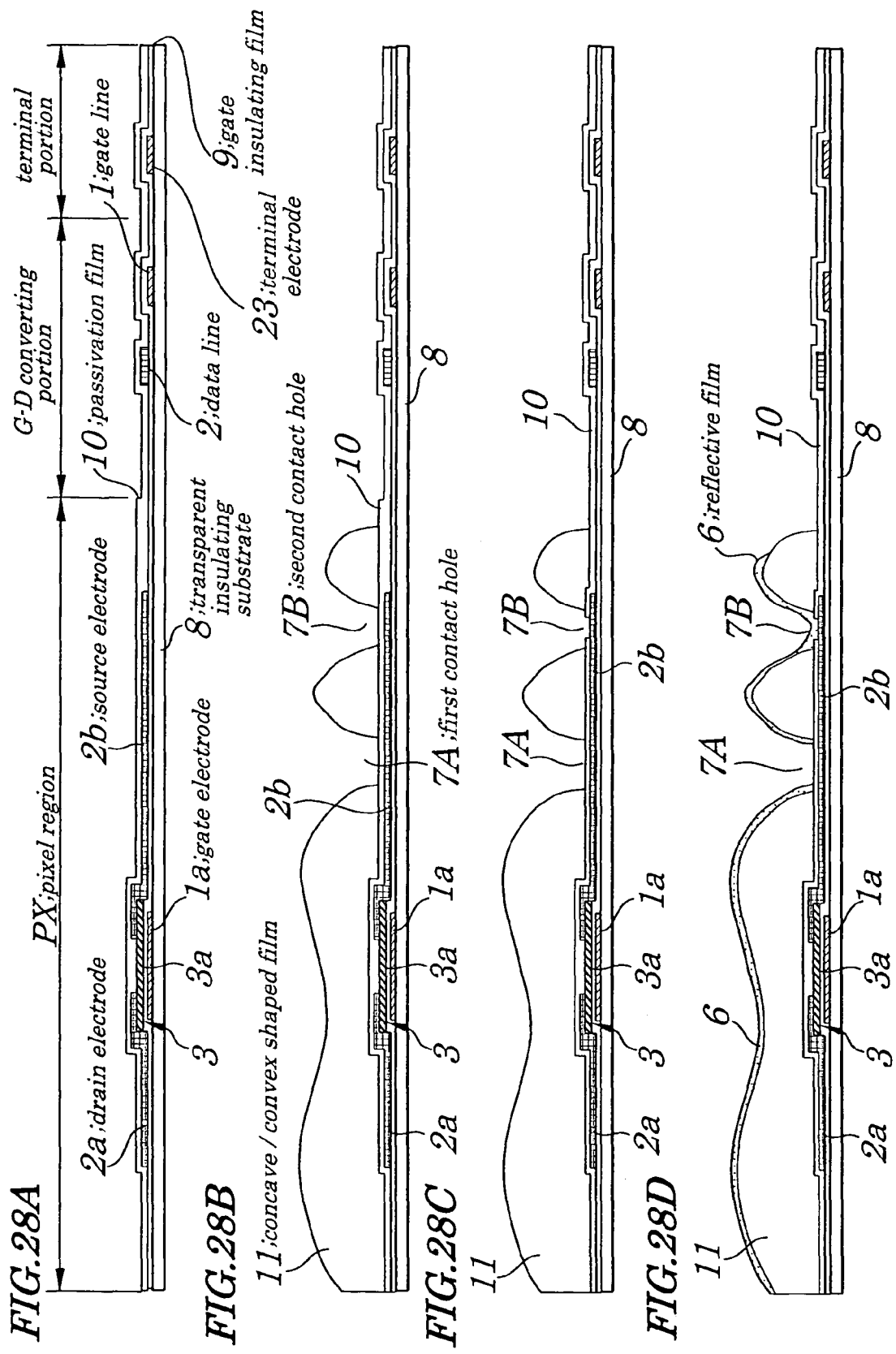

SEMI-TRANSMISSIVE-TYPE LIQUID CRYSTAL DISPLAY DEVICE AND METHOD FOR MANUFACTURING SAME

CROSS REFERENCE TO RELATED APPLICATION:

The present application is a divisional of U.S. patent application Ser. No. 10/615,172, filed on Jul. 8, 2003 now U.S. Pat. No. 7,064,799.

BACKGROUND OF THE INVENTION

1. Field of the Invention

The present invention relates to a semi-transmissive-type liquid crystal display device and a method for manufacturing the same and more particularly to the semi-transmissive-type liquid crystal display device having a plurality of pixel regions, each of which has a transmissive region and a reflective region and the method for manufacturing the same.

The present application claims priority of Japanese Patent Application Nos. 2002-201776 filed on Jul. 10, 2002, which is hereby incorporated by reference.

2. Description of the Related Art

A liquid crystal display device, thanks to its features being compact, thin, and low-power consuming, is becoming commercially practical in wide applications such as OA (Office Automation) equipment, portable cellular phones, or a like. Two types of methods for driving liquid crystal display devices including an active matrix method and a passive matrix method are known and the former that enables high quality display in particular is widely used. Moreover, such the liquid crystal display device that can be driven by the active matrix method is further classified into two types of the liquid crystal display devices, one being a transmissive-type liquid crystal display device and another being a reflective-type liquid crystal display device and both the two-types of liquid crystal display devices are operated based on a principle that a liquid crystal panel making up a main component of the liquid crystal display device serves as an electronic shutter to pass or intercept light fed from an outside to display an image and, therefore, the both have no self-emitting function, unlike in the case of a CRT (Cathode Ray Tube) display device, an EL (Electroluminescence) display device or a like. As a result, a liquid crystal display of any type separately requires a light source in order to display an image. For example, a transmissive-type liquid crystal display device is constructed so as to have a light source made up of a backlight source on a rear (that is, on a face opposite to an image display face) of the liquid crystal panel and so that a liquid crystal panel does switching between transmission and interception of light fed from the backlight source to control the display.

In such the transmissive-type liquid crystal display device as described above, a bright image can be obtained by receiving light fed from a backlight source all the time, irrespective of ambient brightness in places where the transmissive-type liquid crystal display device is used, however, its power consumption of the backlight source is generally large and a half of power of the transmissive-type liquid crystal display device is consumed by the backlight source, thus causing an increase in its power consumption. Especially, in the case of a transmissive-type liquid crystal display device that is driven by a battery, time during which the liquid crystal display can be used is short and, if a large-sized battery is employed in order to lengthen the time during which the liquid crystal display can be used, weight of an entire liquid crystal display device become large, causing an obstacle to making the device compact and lightweight.

To solve the problem of power consumption by a backlight source in a transmissive-type liquid crystal display device, a reflective-type liquid crystal display device is proposed which is constructed so that use of a light source is made unnecessary and light (ambient light) existing in a place surrounding the liquid crystal display device is used as a light source. The reflective-type liquid crystal display device is constructed so that a reflective plate is placed within a liquid crystal panel and displaying of an image is controlled in a manner that switching is done between transmission and interception of ambient light which has been fed into an internal portion of the liquid crystal panel and has been reflected off the reflective plate.

In the reflective-type liquid crystal display device, unlike in the case of the transmissive-type liquid crystal display device, since light from the backlight source is not required, it is possible to reduce its power consumption, to make it small-sized and lightweight. However, such the reflective-type liquid crystal display device has a problem in that, if it is dark in surroundings, ambient light does not serve sufficiently as a light source and therefore visibility is remarkably lowered.

Thus, each of a transmissive-type liquid crystal display device and a reflective-type liquid crystal display device has both merits and demerits. In order to obtain stable display, though light fed from a backlight source is effective, if only a backlight source is used as a light source, an increase in power consumption is inevitable.

To solve this problem, a conventional semi-transmissive-type liquid crystal display device is proposed, which is constructed so as to have both a transmissive region and a reflective region in a pixel region of a liquid crystal panel in order to reduce power consumption of a backlight source and to improve visibility even in the case of dark ambient light and so that operations as a transmissive-type liquid crystal display device and as a reflective-type liquid crystal display device can be performed by one liquid crystal panel.

Since such the semi-transmissive-type liquid crystal display device as described above has both the transmissive region and reflective region in the pixel region of the liquid crystal panel, even when ambient light is dark, by turning ON a backlight source and by using the above transmissive region, the semi-transmissive-type liquid crystal display device can be operated as the transmissive-type liquid crystal display device and a characteristic of high visibility that the transmissive-type liquid crystal display device provides can be fully utilized. On the other hand, when ambient light is fully bright, by turning OFF the backlight source and by using the above reflective region, the conventional semi-transmissive-type liquid crystal display device can be operated as the reflective-type liquid crystal display device and a characteristic of low power consumption that the reflective-type liquid crystal display device provides can be fully utilized.

In the conventional semi-transmissive-type liquid crystal device, light fed from a backlight source passes through a liquid crystal layer in the transmissive region used to have the conventional semi-transmissive-type liquid crystal device be operated as the transmissive-type liquid crystal display device and, on the other hand, incident light being ambient light travels and returns through the liquid crystal layer in the reflective-type liquid crystal display device used to have the conventional semi-transmissive-type liquid crystal display device be operated as the reflective-type liquid crystal display device and, as a result, a difference in optical paths occurs between the incident light fed from the backlight source and the light being ambient light in the liquid crystal layer. Therefore, in the conventional semi-transmissive-type display device, as described later, unless a dimension of a gap (reflective gap) of a reflective region serving as a layer thickness of a liquid crystal layer and of a gap (transmissive gap) of a transmissive region also serving as, a layer thickness of the liquid crystal layer are set to be optimum values according to a twisted angle of the liquid crystal layer, intensity of outgoing light output from a display surface cannot be made optimum, due to a difference in retardation in the reflective region and in the transmissive region. Optimization of intensity of outgoing light in a transmissive region and a reflective region of a pixel region in the conventional semi-transmissive-type liquid crystal display device is described below.

[1] Optimization of Intensity of Outgoing Light in Transmissive Region and Reflective Region FIG. 34 is a diagram showing an outline of configurations of a conventional semi-transmissive-type liquid crystal display device needed to optimize intensity of outgoing light in a transmissive region and in a reflective region. The conventional semi-transmissive-type liquid crystal display device, as shown in FIG. 34, includes an active matrix substrate 112, a facing substrate 116, a liquid crystal layer 117 being sandwiched between both the active matrix substrate 112 and the facing substrate 116, a backlight 118 being placed on a rear of the active matrix substrate 112, phase difference plates (λ/4, 4 plates) 120a and 120b being placed on an outside of each of the active matrix substrate 112 and the facing substrate 116, and polarizers 119a and 119b. Here, on a surface of the active matrix substrate 112 being opposite to the facing substrate 116 are placed a transmissive film 105 serving as a transmissive region in a pixel region and a reflective film 106 serving as a reflective region in the pixel region. Thus, by constructing the conventional semi-transmissive-type liquid crystal display device by arranging each of the components, it is made possible to control a state of polarization of incident light and outgoing light, as described later.

[2] Arrangement of Polarizer and Phase Difference Plate Placed in Upper Position First, a case is explained in which the above conventional semi-transmissive-type liquid crystal display device is operated as a reflective-type liquid crystal device. A phase difference plate 120b is placed between the liquid crystal layer 117 and the polarizer 119b so that the reflective region is displayed in a normally white mode, that is, white display is made by a state in which liquid crystal molecules of the liquid crystal layer 117 lay themselves down (that is, liquid crystal molecules lie in a horizontal direction) due to no application of voltages between a facing electrode (not shown) of the facing substrate 116 and a pixel electrode (not shown) of the active matrix substrate 112 and so that black display is made by a state in which liquid crystal molecules stand up (that is, the liquid crystal molecules rise in a vertical direction) due to application of voltages between the facing electrode (not shown) of the facing substrate 116 and the pixel electrode (not shown) of the active matrix substrate 112. By placing the phase difference plate 120b in an manner so as to be rotated by 45° relative to an optical axis of the polarizer 119b, linearly polarized light (horizontal light) being ambient light having passed through the polarizer 119b becomes clockwise circularly polarized light. The clockwise circularly polarized light reaches the reflective light 106 as a linearly polarized light by setting a reflection gap "dr" at a specified value. The linearly polarized light is reflected off the reflective film 106, as it is, as linearly polarized light and becomes clockwise circularly polarized light when going out from the liquid crystal layer 117. The clockwise circularly polarized light is changed to be a linearly polarized light (horizontal light) by the phase difference plate 120b and goes out through the polarizer 119b having an optical axis in a horizontal direction and is displayed in a white mode. On the other hand, when a voltage is applied between the above facing electrode (not shown) and the above pixel electrode (not shown), liquid crystal molecules rise. At this point, light having incident on the liquid crystal layer 117 as clockwise circularly polarized light reaches the reflective film 106 as it is and is changed to be counterclockwise circularly polarized light by the reflective film 106 and is then reflected. The counterclockwise circularly polarized light, after having been emitted from the liquid crystal layer 117, is changed to be linearly polarized light (vertical light) by the phase difference plate 120b and is absorbed by the polarizer 120b without being emitted. This causes black display to be made.

[3] Arrangement of Polarizer and Phase Difference Plate Placed in Lower Position Next, a case is explained in which the above conventional semi-transmissive-type liquid crystal display device is operated as a transmissive-type liquid crystal display device. Arrangement angle of an optical axis of each of the phase difference plate 120a and the polarizer 119a both being placed in a lower position is determined so that black display is made with a voltage being applied. The polarizer 119a in the lower position and the polarizer 119b in the upper position are placed in a manner so as to produce a cross Nicol relationship, that is, in a manner that the polarizer 119a in the lower position is arranged in a direction being rotated by 900 relative to the polarizer 119b. Moreover, in order to cancel (or compensate for) an influence by the phase difference plate 120b placed in the upper position, the phase difference plate 120a is placed in a manner that the phase difference plate 120a placed in the lower position is rotated also by 90° relative to the phase difference plate 120b placed in the upper position. Since liquid crystal molecules have risen while a voltage is being applied, a state of polarization of light remains unchanged. That is, a state in which liquid crystal molecules have risen with a voltage being applied is optically equivalent to a state in which the polarizer 119a and the polarizer 119b are placed in a manner. so as to produce a cross Nicol relationship between them, thus causing black display to be made with a voltage being applied. By configuring as above, arrangement of optical components and arrangement angle of an optical axis are determined in a liquid crystal panel in the conventional semi-transmissive-type liquid crystal display device.

[4] Setting of Twisted Angle

FIG. 35 shows a relation among a twisted angle (0° to 90°) of a liquid crystal, a reflection gap "dr" (layer thickness of a liquid crystal layer) and a transmissive gap "df" (layer thickness of a liquid crystal layer) in the conventional semi-transmissive-type liquid crystal display device configured by placing optical components at arrangement angles described above and by using a nematic liquid crystal having refractivity anisotropy "n" of 0.086 as the above liquid crystal layer 117. Moreover, FIG. 36 shows a relation among a twisted angles φ (0° to 90°), a transmittance, and a reflectivity obtained when the reflective gap "dr" and transmissive gap "dr" are optimized in the conventional semi-transmissive-type liquid crystal display device. In general, as a twisted angle becomes smaller, a usage rate of light in a transmissive mode becomes the higher and a color shift occurring when a field of view is swung becomes the larger. As is apparent from FIG. 35, when the twisted angle φ is about 72°, the reflective gap "dr" and the transmissive gap "df" are made equal to each other in which a reflectivity of white light and a transmittance of white light become maximum. Moreover, as the twisted angles φ becomes smaller, the optimum reflective gap, "dr" becomes smaller than the optimum transmissive gap "df".

As is apparent from FIG. 35, the optimum reflective gap "dr" and transmissive gap "df" are made equal to each other, both being about 2.7 μm, when a nematic liquid crystal having refractivity anisotropy □n of 0.086 is used and the twisted angle φ is set at about 72°. When the twisted angle φ is set at about 0°, a maximum reflective gap "dr" is about 1.5 μm and a maximum transmissive gap "df" is about 2.9 μm. When the twisted angle φ is set at about 60°, the maximum reflective gap "dr" becomes about 2.0 μm and the maximum transmissive gap "df" becomes about 2.8 μm.

As described above, to correct for a difference in optical paths of incident light passing through the transmissive region and the reflective region in the pixel region and to perform optimization on an intensity of outgoing light in the conventional semi-transmissive-type liquid crystal display device, it is necessary that an optimum reflective gap "dr" and optimum transmissive gap "df" that maximizes reflectivity and transmittance of white light, depending on a twisted angle of a liquid crystal, have to be set in a manner as shown in FIG. 35. Therefore, by placing a step as in the case of the conventional semi-transmissive-type liquid crystal display device as shown in FIG. 30 so that the reflective gap is made different from the transmissive gap and by forming the active matrix substrate 112 as in the case of the conventional semi-transmissive-type liquid crystal display device as shown in FIG. 33 so that the reflective gap is made equal to the transmissive gap, a contrivance to obtain an optimum reflective gap and an optimum transmissive gap, depending on a specified twist angle, has been conventionally used.

Configurations of a conventional semi-transmissive-type liquid crystal display device are described below by referring to FIG. 30. The semi-transmissive-type liquid crystal display device shown in FIG. 30 includes an active matrix substrate 112 on which a TFT (thin film transistor) is formed to operate as a switching element, a facing substrate 116, a liquid crystal layer 117 being sandwiched between the facing substrate 116 and the active matrix substrate 112, a backlight 118 placed on a rear of the active matrix substrate 112.

The active matrix substrate 112 includes a transparent insulating substrate 108, a gate line and a data line (not shown) being formed on the transparent insulating substrate 108, a gate electrode 101a connected to the gate line, a gate insulating film 109, a semiconductor layer 103a, a drain electrode 102a and a source electrode 102b drawn from both ends of the semiconductor layer 103a and connected respectively to the data line and a pixel electrode (not shown), and a passivation film 110. Also, the pixel region PX is divided into two portions, one being a transmissive region PXa to allow light fed from the backlight 118 to transmit and another being a reflective region PXb to reflect incident ambient light. In the above transmissive region PXa, a transparent electrode film 105 made of ITO (Indium Tin Oxide) or a like being formed on the passivation film 110. In the above reflective region PXb, a reflective electrode film 106a made of Al (Aluminum) or an Al alloy formed with a concave/convex shaped film 111 made of organic films or a like being interposed between the reflective electrode film 106a is formed in a manner to be connected to the transparent electrode film 105. The transparent electrode film 105 and the reflective electrode film 106a being connected to the source electrode 102b through a contact hole 107 formed on the concave/convex shaped film 111 operate as a pixel electrode (not shown). On the transparent electrode film 105 and the reflective electrode film 106a is formed an orientated film 129. Here, the TFT 103 is made up of the gate electrode 101a, gate insulating film 109, semiconductor layer 103a, drain electrode 102 and, source electrode 102b. On the other hand the facing substrate 116 includes a transparent insulating substrate 113, a color filter 114, a black matrix (not shown), a facing electrode 115, and the orientated film 105.

The semi-transmissive-type liquid crystal display device having such the configurations as shown in FIG. 30 operates in a manner that, in the transmissive region PXa, light from the backlight 118 which has entered from a rear of the active matrix substrate 112, after having passed the liquid crystal layer 117, is output from the facing substrate 116 and, in the reflective region PXb, ambient light which has entered from the facing substrate 116, after having passed through the liquid crystal layer 117, is reflected off the reflective electrode film 106a and again passes through the liquid crystal layer 117 and is then output from the facing substrate 116. By forming a step on the concave/convex shaped film 111 so that the reflective gap "dr" becomes a half of the transmissive gap "df" (however, in this case, the twisted angle φ is set at about 0°) and by making approximately equal lengths of optical paths of light passing through each of the transmissive region PXa and reflective region PXb, a polarization state of outgoing light is calibrated.

A reflective-type liquid crystal display device is disclosed in Japanese Patent Application No. 2001-221995 in which a transparent electrode is formed on a reflective plate having concave/convex portions with a protective film made of a transparent acrylic resin being interposed between the transparent electrode and the reflective plate. In the disclosed semi-transmissive-type liquid crystal display device, in order to solve a problem that, if a liquid crystal whose retardation is different between a transmissive display region and a reflective display region is oriented at a same driving voltage, a high-contrast display cannot be obtained and bright display is difficult, orientation of a liquid crystal is controlled after calibration has been made so that retardation in a portion to perform transmissive display and in a portion to perform reflective display is put into a near range. However, in the disclosed semi-transmissive-type liquid crystal display device, a countermeasure against a display defect caused by an electric erosion reaction and a flicker caused by a residual DC (Direct Current) voltage, which present a problem to be solved in the present invention, is not taken.

Moreover, in the disclosed semi-transmissive-type liquid crystal display device, since the reflective electrode film (reflective plate) is formed in a central portion of a pixel and a TFT device is not covered by the reflective plate, any countermeasure against problems handled in the present invention cannot be taken.

However, such the conventional semi-transmissive-type liquid crystal display device as described above has two problems. One problem (first problem) is that, in the conventional semi-transmissive-type liquid crystal display device, since the reflective electrode film 106a made of Al or an Al alloy is formed on the transparent electrode film 105 made of ITO, Al and/or ITO are eroded due to an electric erosion reaction when a resist pattern used to perform patterning on the reflective electrode film 106a is formed. Another problem (second problem) is that a flicker occurs due to a residual DC voltage produced in a region of the reflective electrode film 106a.

The first problem of the electric erosion reaction is described first. For example, in such the conventional semi-transmissive-type liquid crystal display device as shown in FIG. 30, in order to connect the transparent electrode film 105 to the source electrode 102b in the TFT 103 through the reflective electrode film 106a, the transparent electrode film 105 and the reflective electrode film 106a are formed so as to overlap each other within each pixel, however, since electric separation is necessary between pixels adjacent to one another, overlapping between the transparent electrode film 105 in one pixel and the reflective electrode film 106*a* in other pixel being adjacent to the one pixel is not allowed. Therefore, as shown in FIG. 31A, when a resist pattern 121 used to form the reflective electrode film 106*a* is formed, only a reflective region side of a conductive film for the reflective electrode film 106*a* in each pixel already formed on entire surfaces of the pixel region PX has to be covered. However, as shown in FIG. 31B, if a crack occurs in the reflective electrode film 106*a* in an end portion (portion surrounded by broken lines in FIG. 31B) of the transparent electrode film 105 already formed due to some reasons, a developer 126 permeates the reflective electrode film 106*a* through this crack 127.

Since the Al material making up the reflective electrode film 106*a* is highly reactive and easily reacts with oxygen, if the developer 126 permeates through the crack 127 as described above, the Al material reacts with ITO being an oxide conductor which makes up the transparent electrode film 105. As a result, a reaction of erosion (oxidation) of Al and dissolution (reduction) of ITO of the developer 126 serving as an electrolytic solution, which are called an "electric erosion reaction") occur which causes a contact failure between the Al and ITO and/or a peeled portion 128 between the poor-adhesive transparent electrode 105 and the passivation film 110 occurs. The electric erosion reaction is thought to occur due to a mechanism described below.

[A] An Al component having many lattice defect and impurity is dissolved as a local anode, causing formation of a pinhole.
[B] The developer 126 comes into contact with ITO contained in a lower layer through the formed pinhole.
[C] Oxidation of Al and reduction of ITO given by following expressions are stimulated by a potential between oxidation potential of Al and reduction potential of ITO in the developer 126 which serves as a driving force of reaction.

$$Al + 4OH^- \rightarrow 4 H_2AlO_3 + H_2O + 3e \quad (1)$$

$$In_2O_3 + 3H_2O + 6e \rightarrow 2In + 6OH^- \quad (2)$$

Although the electric erosion reaction can be suppressed to some extent by taking a layout of the transparent electrode film 105 and the reflective electrode film 106*a*, that is, a state of overlapping of ITO and Al, into considerations, the electric erosion reaction is an essential problem in a structure in which an Al film or an Al alloy film is formed on ITO and, therefore, a proposal of a structure in which occurrence of the electric erosion reaction can be surely prevented is expected.

Next, the second problem of a flicker is explained. A semi-transmissive-type liquid crystal display device being driven by an active matrix method is ordinarily operated with an AC (alternating current) voltage and uses a voltage applied to its facing electrode as a reference voltage and feeds a voltage being changed to become a positive polarity and negative polarity in every period of time to its pixel electrode (pixel electrode) Though it is preferable that waveforms of a positive voltage, applied to a liquid crystal and of a negative voltage applied to the liquid crystal are symmetric to each other, even if AC voltages whose waveforms are symmetric are applied to its pixel electrode, waveforms of the voltage actually applied to the liquid crystal are not symmetric due to an unintentional DC component as described later. As a result, optic transmittance obtained when a positive voltage is applied is different from that obtained when a negative voltage is applied and luminance changes in a period of an AC voltage to be applied to a pixel electrode, causing a flicker to occur. As described later, this flicker occurs due to an orien-tated film 129 being formed on a face of each of the facing substrate 116 and active matrix substrate 112 placed on both sides of the liquid crystal layer 117 used to control orientation of a liquid crystal molecule.

As a material for the above orientated film 129, a polyimide resin is used because its mechanical strength is sufficient since rubbing processing is performed on the thin film with a thickness of about several-hundred angstroms, because the material has a resistance to solvents to be used in rinsing of the orientated films 129 with water or organic solvents after rubbing operations have been completed, and because the material has a resistance to heat which is generated when an epoxy resin used as a seal material is heated and cured at the time of sealing of the liquid crystal. However, it is known that the polyimide resin, when rubbing processing is performed thereon or when intense light is applied thereto, generates an electron within the polyimide resin.

In the semi-transmissive-type liquid crystal display device shown in FIG. 30, on the active matrix substrate 112 are formed the transparent electrode film 105 and the reflective electrode film 106*a* on which (on surfaces of sides of the liquid crystal layer 117 to be inserted) the orientated film 129 made up of polyimide is applied and, as described above, electrons are generated within polyimide due to the rubbing processing and/or application of light. Oxidation easily occurs on a surface of Al making up the reflective electrode film 106*a* and a Schottky barrier occurs at an interface surface between polyimide and the Al, making it difficult for electrons within polyimide to go out. On the other hand, since ITO making up the transparent electrode film 105 is not oxidized, the Schottky barrier does not occur at an interface surface between polyimide and ITO, thus allowing electrons deposited within polyimide to go out. As a results electrons reside only in polyimide making up the orientated film 129 on the reflective electrode film 106*a* and a residual DC voltage is produced. Since waveforms of a DC voltage to be applied to a pixel electrode (not shown) are not symmetric to one another due to existence of the DC component, a flicker occurs.

The second problem is also an essential problem in a structure in which, on an uppermost layer of the active matrix substrate 112 is formed the reflective electrode film 106*a* made of Al or a like on which the orientated film 129 made of polyimide is applied and a proposal of a structure in which occurrence of flickers caused by a residual DC voltage can be prevented is expected.

PREFACE TO THE INVENTION

The occurrence of the electric erosion reaction can be suppressed by improving a plane layout of the transparent electrode film 105 and the reflective electrode film 106*a* and by improving configurations of the reflective electrode film 106*a* and the inventors of the present invention have made various improvements as shown in FIG. 32 and FIG. 33. FIG. 32 is a plan view showing configurations of the semi-transmissive-type liquid crystal display device proposed by the inventors of the present invention. FIG. 33 is a cross-sectional view of the semi-transmissive-type liquid crystal display of FIG. 32 taken along a line H-H.

An active matrix substrate 112 making up in the semi-transmissive-type liquid crystal display device, as shown in FIGS. 32 and 33, includes a transparent insulating substrate 108, a gate line 101 and a data line 102 formed on the transparent insulating substrate 108, a gate electrode 101*a* connected to the gate line 101, a gate insulating film 109, a semiconductor layer 103*a*, a drain electrode 102*a* and a source electrode 102b being drawn from both ends of the semiconductor layer 103a and being connected respectively to the data line 102 and to a pixel electrode (not shown), a passivation film 110, a concave/convex shaped film 111 formed on an entire pixel region PX, a transparent electrode film 105 formed on the concave/convex shaped film 111 in a transmissive region PXa, and a reflective electrode film 106a having a layer-stacked structure formed so that the reflective electrode film 106a and all portions surrounding the transparent electrode film 105 overlap each other and wherein, as one of means to suppress the electric erosion reaction, a structure is proposed which can calibrate a positional relation on a plane between the transparent electrode film 105 and the reflective electrode film 106a.

That is, the electric erosion reaction, as shown in FIG. 31, is caused mainly by permeation of the developer 126 through a crack 127 having occurred in the reflective electrode film 106a made up of a thin film at an end of the transparent electrode film 105. To solve this problem, as shown in FIGS. 32 and 33, the permeation of the developer 126 is prevented by having the reflective electrode film 106a and all portions surrounding the transparent electrode film 105 overlap with a width of, for example, 2 μm or more to cover all portions surrounding an end of the transparent electrode film 105 with a resist pattern 121.

The inventors have devised various methods for preventing permeation of the developer 126. That is, since the electric erosion reaction occurs due to permeation of the developer 126 through a pinhole of Al into an interface surface between Al and ITO, the reflective electrode film 106a is constructed in a manner that metal films made of Al, an Al alloy, or a like are stacked on a barrier metal film made of molybdenum or a like in layers and that each of the metal films is 100 nm or more in thickness to prevent the developer 126 permeating into ITO portions. Moreover, in order to inhibit peeling at an interface surface between the transparent electrode film 105 and the concave/convex shaped film 111, by selecting optimum conditions for UV (Ultraviolet) processing and/or oxygen ashing processing on the concave/convex shaped film 111 before formation of the transparent electrode film 105, adhesion between the transparent electrode film 105 and the concave/convex shaped film 111 is improved to prevent the developer 126 from the permeation.

By employing various configurations and manufacturing methods as described above, it is possible to inhibit electric erosion reactions occurring at the time of formation of a resist pattern to be used to perform patterning on the reflective electrode film 106a. However, even in such the semi-transmissive-type liquid crystal display device as described above, since the orientated film 129 made of polyimide is formed on the reflective electrode film 106a, for reasons as described above, it is impossible to prevent occurrence of a flicker caused by a residual DC voltage. The inventor of the present invention studied a structure of a semi-transmissive-type liquid crystal display device that can solve the two problems of occurrence of the electric erosion reaction and flickers at a same time and, as a result, has found that it is made possible to simultaneously and effectively solve both the two problems by using a semi-transmissive-type liquid crystal display device constructed based on a configuration in which the transparent electrode film 105 and reflective electrode film 106a are stacked in layers in a way being reverse to that employed in the conventional semi-transmissive-type liquid crystal display device, that is, the reflective electrode film 106a made of Al or an Al alloy is placed so as to form a lower layer and the transparent electrode film 105 made of ITO is formed directly on the reflective film 106 or with an insulating film being interposed between the reflective electrode film 106a and the transparent electrode film 105.

SUMMARY OF THE INVENTION

In view of the above, it is an object of the present invention to provide a semi-transmissive-type liquid crystal display device being capable of preventing an electric erosion reaction between a reflective electrode film (hereinafter, simply called a "reflective film") and a transparent electrode film and of inhibiting occurrence of a flicker caused by a residual DC voltage in the reflective film and a method for manufacturing the semi-transmissive-type liquid crystal display device.

According to a first aspect of the present invention, there is provided a semi-transmissive-type liquid crystal display device including:

a first substrate including a plurality of signal electrodes being arranged in parallel to one another along a first direction;

a second substrate including a plurality of scanning electrodes being arranged in parallel to one another along a second direction orthogonal to the first direction and a plurality of pixel regions each being placed in a one-to-one correspondence to an intersection between each of the signal electrodes and each of the scanning electrodes;

a liquid crystal layer inserted between the first substrate and the second substrate;

a backlight source to feed light to the liquid crystal layer; and wherein each of the pixel regions includes a reflective region having a reflective film to receive ambient light from an outside and to display in a reflective manner while being in a reflective display mode, and a transmissive region having a transmissive electrode film to allow light from the backlight source to be transmitted to display in a transmissive manner at time of operations in a transmissive display mode; and wherein in each of the pixel regions, the transparent electrode film is extended to the reflective film in a manner to cover at least one part of the reflective film.

In the foregoing first aspect, a preferable mode is one wherein the transparent electrode film is formed over the reflective film through an insulating film which is interposed between the transparent electrode film and the reflective film.

Another preferable mode is one wherein the transparent electrode film is formed directly on the reflective film.

Still another preferable mode is one wherein the reflective film is electrically connected to the transparent electrode film through a contact hole formed in the insulating film.

An additional preferable mode is one wherein in each of the pixel regions, a switching element to turn on or off a voltage signal to be applied to the liquid crystal layer is formed on a surface of the first substrate at a side facing the second substrate and the reflective film is formed in a manner to cover the switching element.

A still additional preferable mode is one wherein the reflective film covers the switching element with an insulating film having a concave and convex surface being interposed between the reflective film and the switching element.

A furthermore preferable mode is one wherein a contact hole is formed in a manner so as to contact commonly with the insulating film and, in the contact hole, the reflective film and the transparent electrode film are electrically connected to an arbitrary electrode out of a plurality of electrodes making up the switching element.

A still furthermore preferable mode is one wherein a first contact hole and a second contact hole are formed in the insulating film and the reflective film is electrically connected to one electrode of the switching element through the first contact hole and the transparent electrode film is electrically connected to one electrode of the switching element through the second contact hole.

Also, a furthermore preferable mode is one wherein a G-D (Gate-Drain) converting portion to draw a signal;line used to apply a voltage signal to the liquid crystal layer from a gate layer on the surface of the first substrate at the side of facing the second substrate outside of the transmissive region and the reflective region.

Also, a still furthermore preferable mode is one wherein the reflective film is made of a conductive material containing Al (aluminum) or an Al alloy and the transparent electrode film is made of ITO (Indium Tin Oxide).

According to a second aspect of the present invention, there is provided a semi-transmissive-type liquid crystal display device including:

a first substrate including a plurality of signal electrodes being arranged in parallel to one another along a first direction;

a second substrate including a plurality of scanning electrodes being arranged in parallel to one another along-a second direction orthogonal to the first direction and a plurality of pixel regions each being placed in a one-to-one correspondence to an intersection between each of the signal electrodes and each of the scanning electrodes;

a liquid crystal layer inserted between the first substrate and the second substrate;

a backlight source to feed light to the liquid crystal layer; and wherein each of the pixel regions includes a reflective region having a reflective film to receive ambient light from an outside and to display in a reflective manner while being in a reflective display mode, and a transmissive region having a transmissive electrode film to allow light from the backlight source to be transmitted to display in a transmissive manner at time of operations in a transmissive display mode; and wherein in each of the pixel regions, a first gap between the first substrate and the second substrate in the reflective region and a second gap between the first substrate and the second substrate in the transmissive region are calibrated so that reflectance or transmittance in white display is maximized according to a twisted angle of the liquid crystal layer.

In the foregoing second aspect, a preferable mode is one wherein, when a twisted angle of the liquid crystal is set to about 72°, a calibration is so done that the first gap in the reflective region becomes equal approximately to the second gap in the transmissive region.

Another preferable mode is one wherein, when a twisted angle of the liquid crystal is set to about 0°, a calibration is so done that the first gap in the reflective region is approximately a half of the second gap in the transmissive region.

Still another preferable mode is one wherein, when a twisted angle of the liquid crystal is set to about 60°, a calibration is so done that the first gap in the reflective region accounts for approximately 70% of the second gap in the transmissive region.

According to a third aspect of the present invention, there is provided a method for manufacturing a semi-transmissive-type liquid crystal display device including a first substrate including a plurality of signal electrodes being arranged in parallel to one another along a first direction; a second substrate including a plurality of scanning electrodes being arranged in parallel to one another along a second direction orthogonal to the first direction and a plurality of pixel regions each being placed in a one-to-one correspondence to an intersection between each of the signal electrodes and each of the scanning electrodes; a liquid crystal layer inserted between the first substrate and the second substrate; a backlight source to feed light to the liquid crystal layer; and wherein each of the pixel regions includes a reflective region having a reflective film to receive ambient light from an outside and to display in a reflective manner while being in a reflective display mode, and a transmissive region having a transmissive electrode film to allow light from the backlight source to be transmitted to display in a transmissive manner at time of operations in a transmissive display mode, the method including:

a first process of forming the reflective film making up the reflective region on a surface of the first substrate facing the second substrate; and a second process of forming the transparent electrode film making up the transmissive region in a manner that the transparent electrode film covers part or all of the reflective film.

In the foregoing third aspect, a preferable mode is one that wherein further includes including a third process of forming an insulating film on the reflective film to be performed between the first process and the second process.

Another preferable mode is one that wherein further includes a fourth process of forming a contact hole to electrically connect the reflective film and the transparent electrode film in the insulating film.

According to a fourth aspect of the present invention, there is provided a method for manufacturing a semi-transmissive-type liquid crystal display device including a first substrate including a plurality of signal electrodes being arranged in parallel to one another along a first direction; a second substrate including a plurality of scanning electrodes being arranged in parallel to one another along a second direction orthogonal to the first direction and a plurality of pixel regions each being placed in a one-to-one correspondence to an intersection between each of the signal electrodes and each of the scanning electrodes; a liquid crystal layer inserted between the first substrate and the second substrate; a backlight source to feed light to the liquid crystal layer; and wherein each of the pixel regions includes a reflective region having a reflective film to receive ambient light from an outside and to display in a reflective manner while being in a reflective display mode, and a transmissive region having a transmissive electrode film to allow light from the backlight source to be transmitted to display in a transmissive manner at time of operations in a transmissive display mode, the method including:

a process of performing a calibration on a first gap between the first substrate and the second substrate in the reflective region and a second gap between the first substrate and the second substrate in the transmissive region so that reflectance or transmittance in white display is maximized according to a twisted angle of the liquid crystal layer by inserting the liquid crystal layer between the first substrate and the second substrate, wherein the first substrate is formed by processes of forming the reflective film making up the reflective region on a surface of the first substrate facing the second substrate and of forming the transparent electrode film making up the transmissive region in a manner that the transparent electrode film covers part or all of the reflective film.

In the foregoing fourth aspect, a preferable mode is one wherein a calibration is performed on the first gap between the first substrate and the second substrate in the reflective region and the second gap between the first substrate and the second substrate in the transmissive region so that reflectance or transmittance in white display is maximized according to a twisted angle of the liquid crystal layer by forming the reflective film on a surface of the first substrate facing the second substrate through an insulating film having a concave and convex surface being interposed between the reflective film and the second substrate.

Another preferable mode is one wherein a calibration is performed on the first gap between the first substrate and the second substrate in the reflective region and the second gap between the first substrate and the second substrate in the transmissive region so that reflectance or transmittance in white display is maximized according to a twisted angle of the liquid crystal layer by processing a surface of the first substrate facing the second substrate.

Also, a furthermore preferable mode is one wherein a thickness of the insulating film is made different between the transmissive region and the reflective region.

With the above configurations, by inserting a liquid crystal layer between a first substrate and a second substrate, constructing a pixel region of the liquid crystal layer, and placing a transmissive region to provide light from a backlight and a reflective region to receive ambient light in the pixel region, having a transparent electrode film extend in each pixel to the reflective region in a manner so as to cover part or all of the reflective film, an electric erosion reaction between the reflective region and the transparent electrode film can be prevented and a flicker caused by a residual DC voltage of the reflective film can be suppressed.

With another configuration as above, by inserting a liquid crystal layer between a first substrate and a second substrate, constructing a pixel region of the liquid crystal layer, placing a transmissive region to provide light from a backlight and a reflective region to receive ambient light, and forming, after having formed the reflective film, the transparent electrode film in a manner so as to cover part or all of the reflective film, an electric erosion reaction between the reflective region and the transparent electrode film can be prevented and a flicker caused by a residual DC voltage of the reflective film can be suppressed.

BRIEF DESCRIPTION OF THE DRAWINGS

The above and other objects, advantages, and features of the present invention will be more apparent from the following description taken in conjunction with the accompanying drawings in which:

FIGS. 4A and 4B are also process charts for illustrating the manufacturing method of the active matrix substrate making up the semi-transmissive-type liquid crystal display device in order of step according to the first embodiment of the present invention;

FIG. 5 is a cross-sectional view for showing an other configuration of an active matrix substrate of the semi-transmissive-type liquid crystal display device according to the first embodiment of the present invention;

FIGS. 20A, 20B, 20C, and 20D are process charts illustrating a method of manufacturing the semi-transmissive-type liquid crystal display device in order of step according to the fourth embodiment of the present invention;

FIGS. 21A and 21B are also process charts illustrating the method of manufacturing the semi-transmissive-type liquid crystal display device in order of step according to the fourth embodiment of the present invention;

FIGS. 28A, 28B, 28C, and 28D are process charts illustrating a method of manufacturing the semi-transmissive-type liquid crystal display device in order of step according to the fifth embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
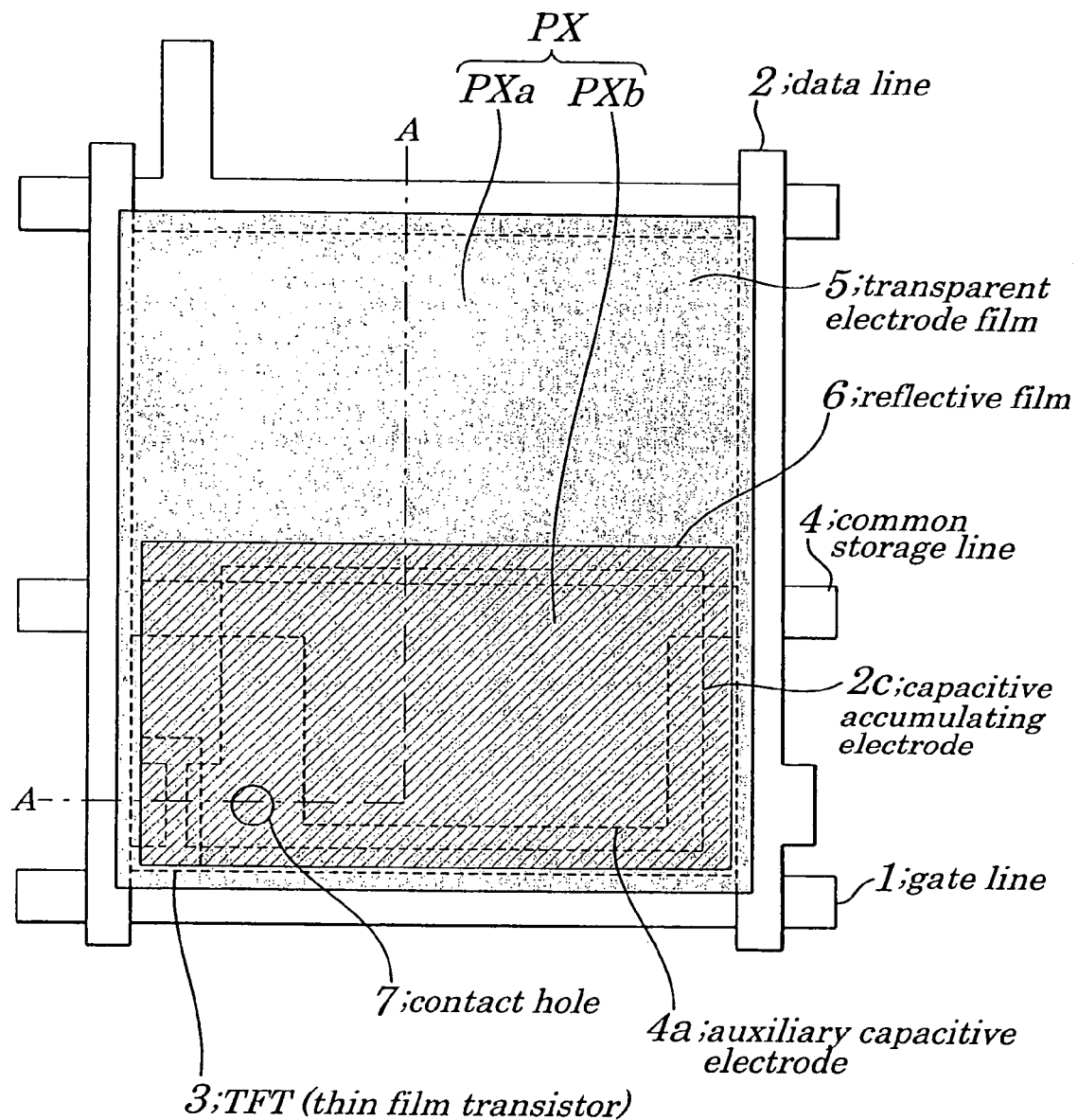
FIG. 1 is a plan view for showing a configuration of a semi-transmissive-type liquid crystal display device according to a first embodiment of the present invention.
Figure 2:
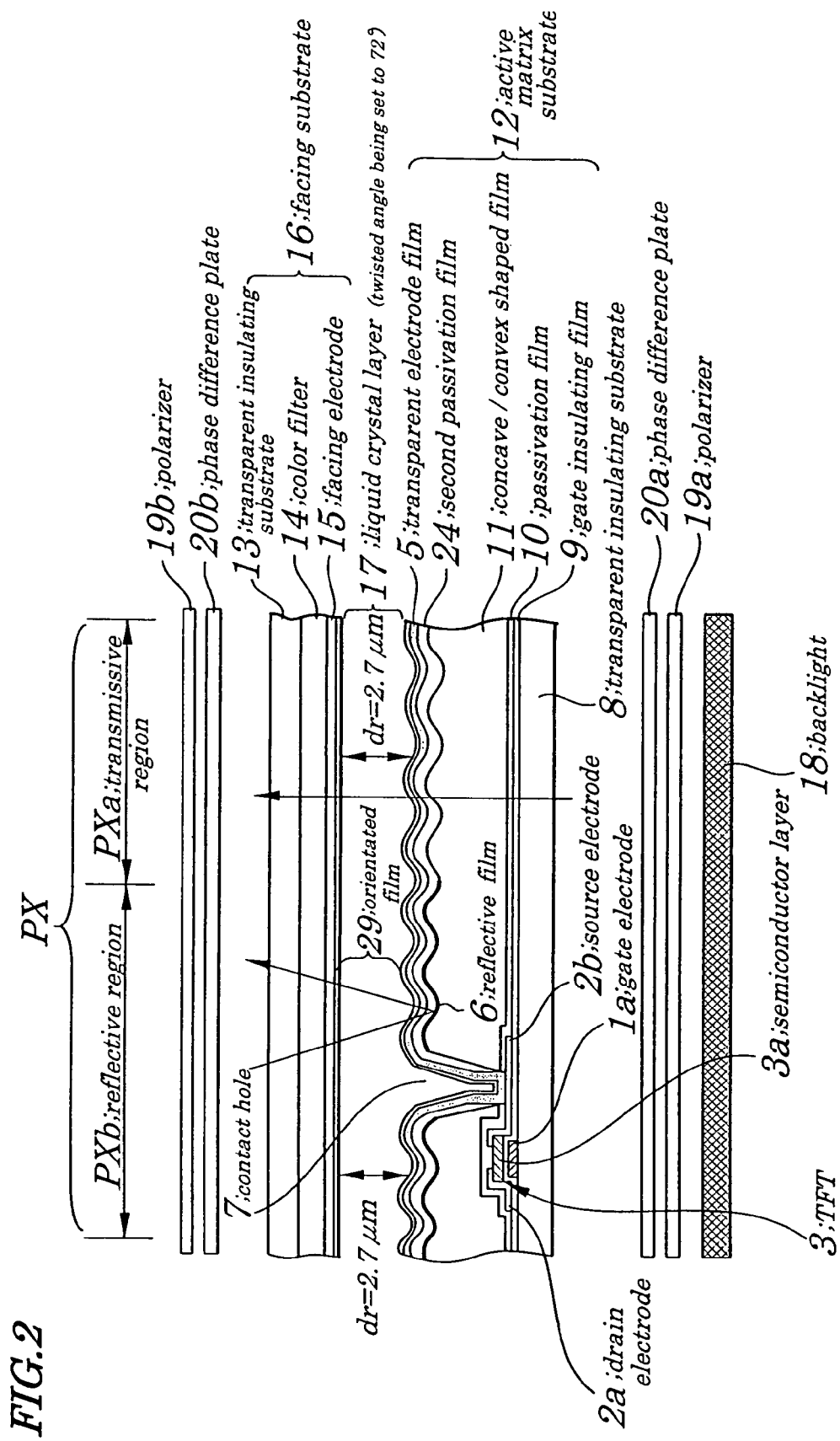
FIG. 2 is a cross-sectional view for showing a configuration of the semi-transmissive-type liquid crystal display device of FIG. 1 taken along a line A-A.
Figure 3A:
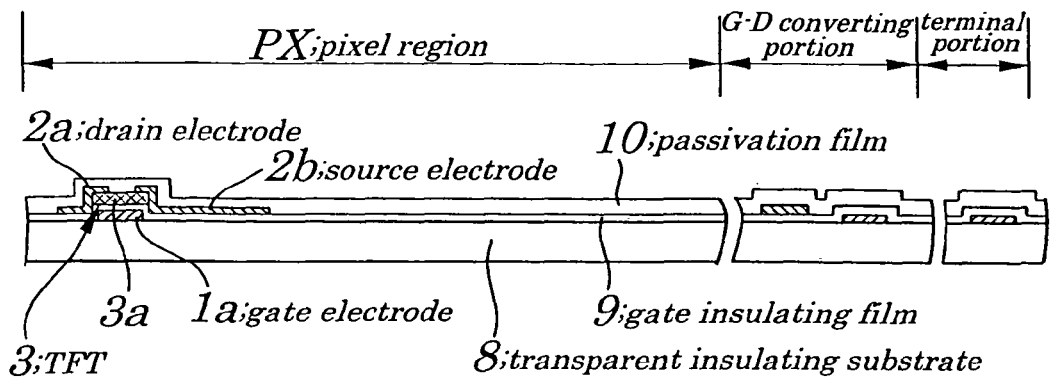
FIGS. 3A, 3B, and 3C are process charts illustrating a manufacturing method of an active matrix substrate making up the semi-transmissive-type liquid crystal display device in order of step according to the first embodiment of the present invention.
Figure 3B:
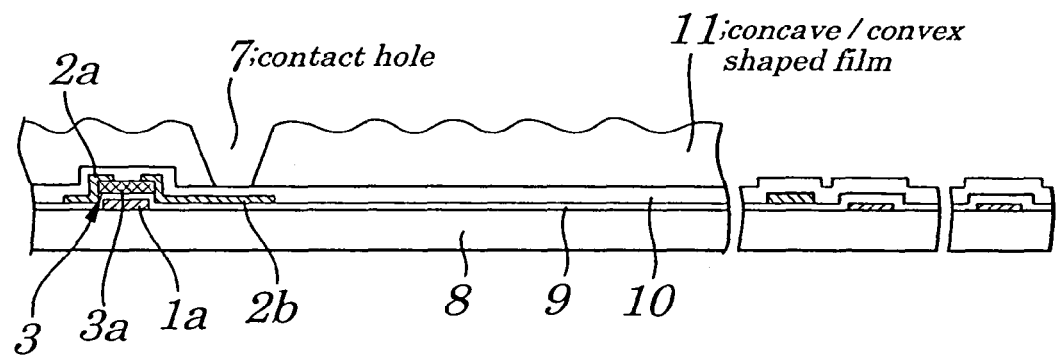
Figure 3C:
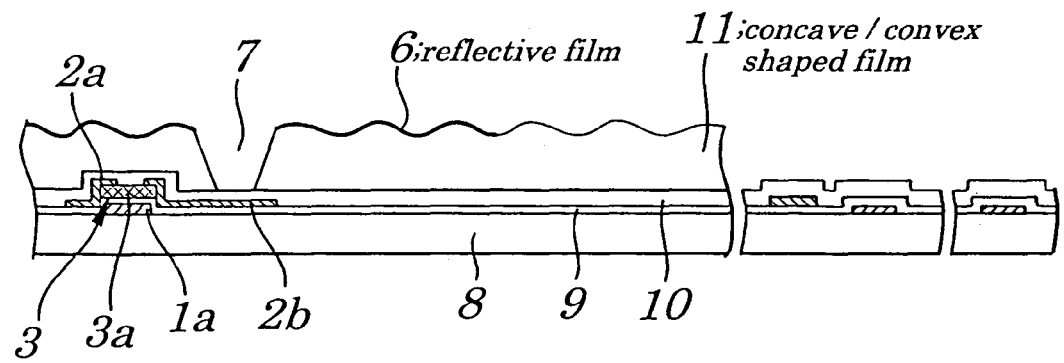
Figure 6:
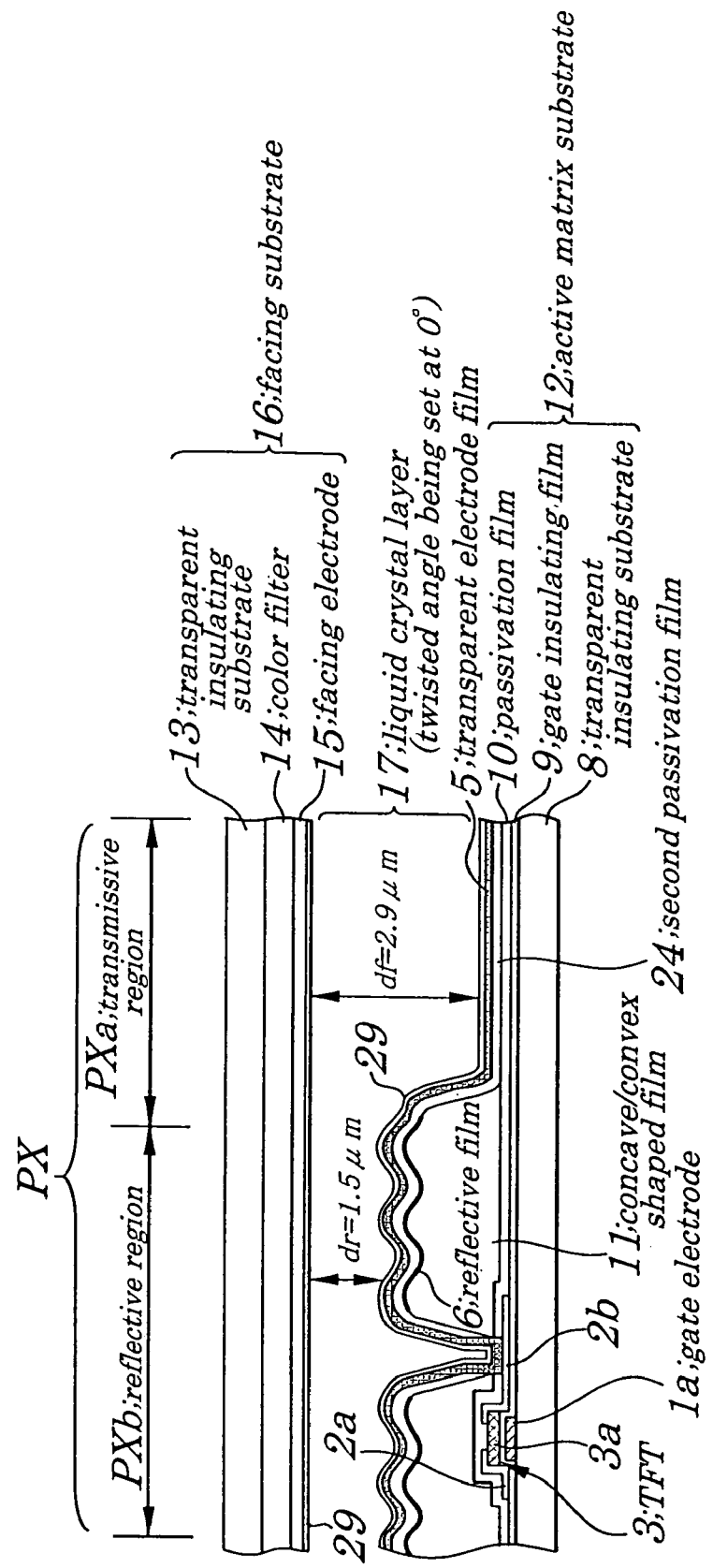
FIG. 6 is a cross-sectional view of a first modified example (twisted angle being set at about 0°) of the semi-transmissive-type liquid crystal display device of FIG. 1.
Figure 7:
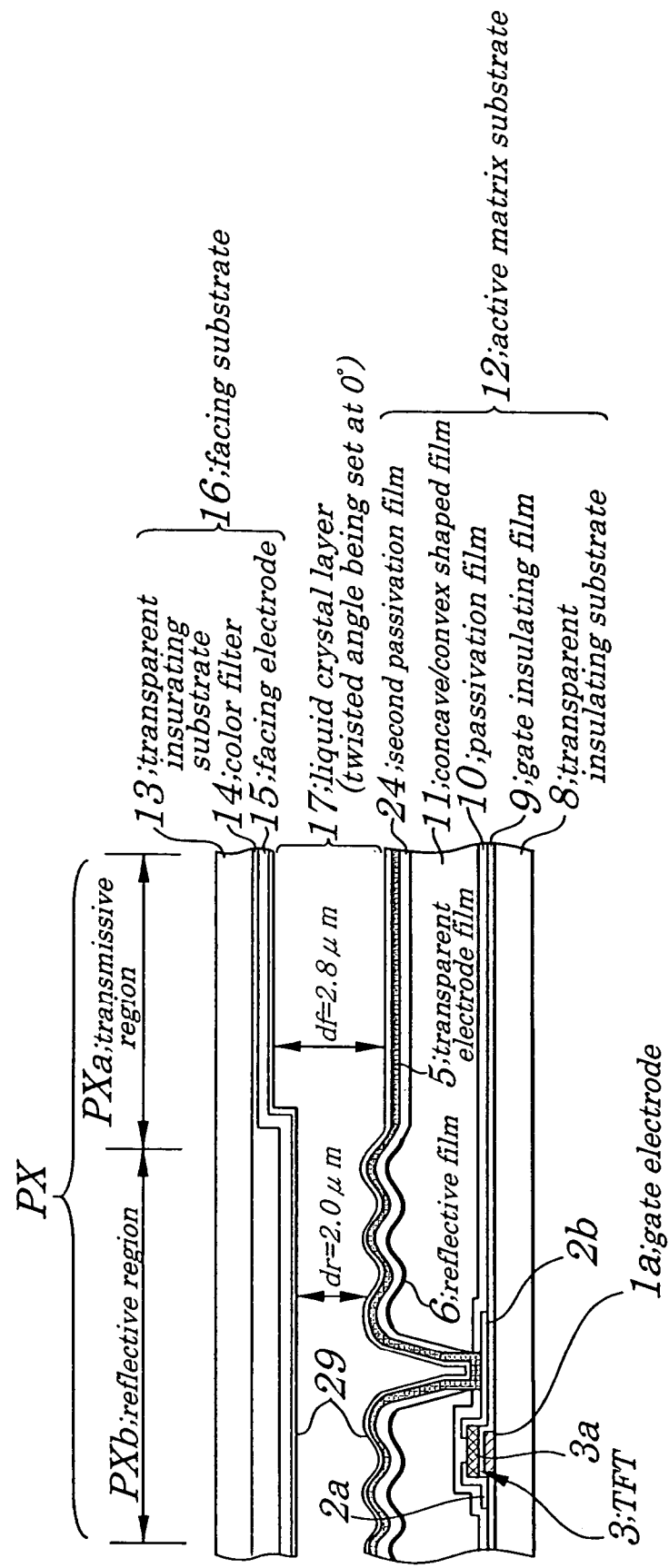
FIG. 7 is a cross-sectional view of a second modified example (twisted angle being set at about 60°) of the semi-transmissive-type liquid crystal display device of FIG. 1.

FIG. 1 is a plan view for showing a configuration of a semi-transmissive-type liquid crystal display device according to a first embodiment of the present invention. FIG. 2 is a cross-sectional view for showing a configuration of the semi-transmissive-type liquid crystal display device of FIG. 1 taken along a line A-A. FIGS. 3A, 3B, and 3C are process charts illustrating a method of manufacturing the semi-transmissive-type liquid crystal display device in order of step according to the first embodiment of the present invention. FIGS. 4A and 4B are process charts illustrating the method of manufacturing the semi-transmissive-type liquid crystal display device in order of step according to the first embodiment of the present invention. FIG. 5 is a cross-sectional view of another configuration of an active matrix substrate on the semi-transmissive-type liquid crystal display device of FIG. 1. FIG. 6 is a cross-sectional view of a first modified example (twisted angle being set at about 0°) of the semi-transmissive-type liquid crystal display device of FIG. 1. FIG. 7 is a cross-sectional view of a second modified example (twisted angle being set at about 60°) of the semi-transmissive-type liquid crystal display device of FIG. 1. Moreover, in the example described below, a case is explained in which a twisted angle is set at about 72°, that is, a reflective gap is equal to a transmissive gap.

The semi-transmissive-type liquid crystal display device of the first embodiment includes, as shown in FIG. 1 and FIG. 2, an active matrix substrate 12 on which a TFT 3 operating as a switching element is formed, a facing substrate 16, a liquid crystal layer 17 being sandwiched between the active matrix substrate 12 and the facing substrate 16, a backlight source 18 placed on a rear face of the active matrix substrate 12, and phase difference plates (λ/4 plates) 20a and 20b and polarizers 19a and 19b placed outside of the active matrix substrate 12 and the facing substrate 16, respectively.

The active matrix substrate 12 includes a transparent insulating substrate 8, a gate line 1 and a data line (signal electrode) 2 formed on the transparent insulating substrate 8, a gate electrode (scanning electrode) 1a being connected to the gate line 1, a common storage line 4, an auxiliary capacitive electrode 4a, a gate insulating film 9, a semiconductor layer 3a, a drain electrode 2a and a source electrode 2b drawn from both ends of the semiconductor layer 3a and connected respectively to the data line 2 and a pixel electrode (described later), a capacitive accumulating electrode 2c, and a passivation film 10. The pixel electrode is so constructed that there is a one-to-one correspondence to an intersecting point between the signal electrode 2 and the scanning electrode 1 each of pixel regions PX is made up of a transmissive region PXa to allow light fed from the backlight source 18 to transmit and a reflective region PXb to have incident ambient light be reflected and each of the transmissive region PXa and the reflective region PXb is covered by a concave/convex shaped film 11 made of organic films or a like. In the reflective region PXb, a reflective film 6 (since it is not necessary for a metal film formed in the reflective region PXb to be used as an electrode and, in this embodiment, it is simply called a "reflective film 6" accordingly) made of Al or an Al alloy is formed and a transparent electrode film 5 made of ITO (Indium Tin Oxide) or a like is formed throughout the pixel region PX in a manner so as to cover all surfaces of the reflective film 6 through a second passivation film 24 being sandwiched between the transparent electrode film 5 and the reflective film 6. The transparent electrode film 5 being connected to the source electrode 2b through a contact hole 7 operates as a pixel electrode and an orientated film 29 made of polyimide or a like is formed on the transparent electrode film 5. The TFT 3 consists of the gate electrode 1a, gate insulating film 9, semiconductor layer 3a, drain electrode 2a, and source electrode 2b. On the other hand, the facing substrate 16 includes a transparent insulating substrate 13, a color filter 14, a black matrix (not shown), a facing electrode 15, and the orientated film 29.

As described above, by forming the transparent electrode film 5 over the reflective film 6 through the second passivation film 24 being sandwiched between the transparent electrode film 5 and the reflective film, 6, ITO making up the transparent electrode film 5 is not formed at the time of formation of a resist pattern used to process the reflective film 6 and, therefore, even if a developer permeates through a pinhole of Al, no electric erosion reaction occurs, thus enabling prevention of occurrence of a pixel defect such as peeling or a like. However, only if the reflective film 6 and the transparent electrode film 5 are stacked in layers in a way being reverse to that employed in the conventional semi-transmissive-type liquid crystal display device, when there exists a region in which coverage by the transparent electrode film 5 in an end portion of the reflective film 6 is insufficient at the time of formation of a resist pattern used to process the transparent electrode film 5, Al film of the lower layer comes into contact with the developer, as a result, causing an electric erosion reaction and erosion of Al and/or ITO.

To solve this problem, in the first embodiment, when the transparent electrode film 5 is formed on the reflective film 6, a layout is made in a manner that the reflective film 6 and the transparent electrode film 5 overlap over all portions surrounding the reflective film 6. More particularly, as shown in FIG. 1 and FIG. 2, the reflective film 6 is formed in the reflective region PXb containing an upper layer on the TFT 3 and the transparent electrode film 5 is formed throughout the pixel region PX in a manner so as to fully cover the reflective films (lower layer) 6.

Therefore, since, at the time of formation of a resist pattern to be used for processing of the transparent electrode film 5, the reflective film 6 is fully covered by the transparent electrode film 5 with the second passivation film 24 being sandwiched between the transparent electrode film 5 and the reflective film 6, Al film can avoid contact with the developer. This enables an electric erosion reaction between Al and ITO to be surely prevented and occurrence of a failure caused by the electric erosion reaction to be avoided.

Moreover, as described above, by covering the TFT 3 with the reflective film 6, even when light from an outside enters TFT 3, the reflective film 6 successfully intercepts the incident light. This can prevent inconvenience in which an OFF current of the TFT 3 is increased by a photoelectric effect caused by the incident light and an operational failure occurs. However, there is a fear that, if a distance between the reflective film 6 and the TFT 3 is short, due to an influence by a voltage (gate voltage in particular) applied to the TFT 3, a potential of the reflective film 6 being floating electrically fluctuates, which disturbs a controlled electric field of a liquid crystal. To solve this problem, in the embodiment, by forming the concave/convex shaped film 11 also on the TFT 3, the distance between the TFT 3 and the reflective film 6 is made longer, which serves to reduce the influence by the voltage to be applied to the above TFT 3 on the reflective film 6.

Moreover, since the reflective film 6 is covered with the transparent electrode film 5 with the second passivation film 24 being interposed between the reflective film 6 and the transparent electrode film 5, polyimide film making up the orientated film 29 formed on an upper face of the active matrix substrate 12 can avoid contact with Al making up the reflective film 6 and, therefore, accumulation of electric charges within polyimide can be inhibited and occurrence of a flicker caused by a residual DC voltage can be prevented, thus enabling a simultaneous solution of the two problems including the electric erosion reaction and the flicker is made possible.

Also, in the embodiment, though polyimide film making up the orientated film 29 can avoid contact with Al film making up the reflective film 6 and, since an ITO film making up the transparent conductive film 5 is formed on an upper surface of the active matrix substrate 12, ITO comes into contact with polyimide film. However, since ITO is not oxidized, no Schottky barrier is produced and, since an electron produced due to rubbing processing or a like goes out from ITO to an outside, a residual DC voltage does not occur.

Furthermore, a relation between the reflective film 6 and the transparent electrode film 5 in the semi-transmissive-type liquid crystal display device is applied to each pixel or each segment (sub-pixel) making up a pixel. This is the same in other embodiments described later.

The method for manufacturing the semi-transmissive-type liquid crystal display device of the embodiment is described below in order of step by referring to FIGS. 3 and 4. Moreover, in addition to the method for manufacturing the above semi-transmissive-type liquid crystal display device, a method of manufacturing the G-D converting portion in which G-D conversion is made is also explained. The G-D converting portion is required to prevent a short among drawing wirings by a conductive seal. A function of the G-D converting portion is that, when a drain electrode has to be electrically drawn to an outside, since it is difficult to directly draw it due to a structural restraint including occurrence of a short, the drain electrode is drawn using a gate layer through a transparent electrode film.

First, as shown in FIG. 3A, by having metal such as Cr (Chromium) deposited entirely on the transparent insulating substrate 8 made of glass or a like and by removing unwanted metal by using known photolithography and etching methods, the gate line 1 (not shown), the gate electrode 1a, the common storage line 4 (not shown), and the auxiliary capacitive electrode 4a (not shown) are formed. Components not shown in FIG. 3 are shown in FIG. 1. Next, the gate insulating film 9 made of SiO, (Silicon Dioxide), $SiN_x$ (Silicon Nitride), $SiO_x$ (Silicon Oxide), or a like is formed on all surfaces of the transparent insulating substrate 8. Then, after having a-Si (amorphous silicon) or a like deposited on all surfaces of the gate insulating film 9, patterning operations are performed to form an island portion which operates as the semiconductor layer 3a. Next, after having metal such as Cr deposited on all surfaces thereof, patterning operations are performed to form the data line 2 (not shown), the drain electrode 2a, the source electrode 2b, and the capacitive accumulating electrode 2c (not shown). The TFT has been now formed by processes described above. Then, in order to protect the TFT 3, the passivation film 10 made of an $SiN_x$ film or a like is deposited on all surfaces thereof by using a plasma CVD (Chemical Vapor Deposition) method or a like. Moreover, outside of the pixel region PX above the transparent insulating substrate 8, the G-D converting portion described above and a terminal portion are formed.

Next, as shown in FIG. 3B, by coating the passivation film 10 with a photosensitive acrylic resin (such as PC403, 415G, 405G or a like manufactured by JSR Co., Ltd in Japan) by using a spin coating method, the concave/convex shaped film 11 is formed in the pixel region PX. An aim of forming the concave/convex shaped film 11 is to enhance visibility of reflected light produced when ambient light having entered the reflective region PXb is reflected off the reflective film 6 therein. Moreover, a concave portion in the concave/convex shaped film 11 made of the photosensitive acrylic resin is exposed to a comparatively small amount of light and a convex portion is not exposed to light. A region making up the contact hole 7, G-D converting portion, and terminal portion are exposed to a comparatively large amount of light.

Such the exposure process can be performed by using a half-tone (gray-tone) mask having, for example, a reflective film formed in a portion corresponding to the above convex portion of the concave/convex shaped film, a transmissive film formed in a portion corresponding to the contact hole, G-D converting portion, and terminal portion, and a semi-transmissive film formed in a portion corresponding to the concave portion of the concave/convex shaped film. Thus, the half-tone mask enables a concave and convex portion to be formed by one-time exposure. Moreover, the concave and convex portion can be formed even by using only the reflective film 6 and a transmissive film as a photomask. Also, the concave and convex portion can be formed by making exposure separately on the contact hole 7 and on the concave portion and by changing an amount of light to be used for the exposure.

Then, concave and convex portions are formed by making use of a difference in speed of dissolution by an alkaline developer in each of the concave portion, convex portion, contact hole 7, or a like. Moreover, in FIG. 3B, the concave and convex shaped film 11 is formed in the entire pixel region PX including the reflective region PXb and transmissive region PXa, however, a surface of the concave/convex shaped film 11 to be formed in the transmissive region PXa can be made flat without forming a concave and convex portion. Moreover, when the concave/convex shaped film 11 is formed also on the transmissive region PXa, in order to suppress an attenuation of transmitted light caused by the concave/convex shaped film 11, exposure processing is performed on all the surfaces thereof and decoloring process is performed on the acrylic film. Then, by curing, for example, at 220° C. for about one hour, the concave/convex shaped film 11 having a desired shape can be formed.

As described above, if an interval between the TFT 3 and the reflective film 6 to be formed on the TFT 3 is small, a potential of the reflective film 6 fluctuates due to a gate voltage applied to the TFT 3 or a like, which disturbs a controlled electric field of a liquid crystal and degrades display quality. Therefore, in the embodiment, the concave/convex shaped film 11 is formed also on the TFT 3.

Next, as shown in FIG. 3C; after having Al deposited on all the surfaces thereof by using a sputtering method or an, evaporation method, by covering only the reflective region PXb in the pixel region PX with a resist pattern and by patterning dry or wet etching partially on the exposed Al, the reflective film 6 is formed. At this point, the reflective film 6 is formed also on the TFT 3 so that light from an outside is not incident on the TFT 3. In this case, the reflective film 6 is formed in regions inside of the gate line 1 and the data line 2 so that an influence by the gate line 1 and the data line 2 is suppressed and the TFT 3 and the concave/convex shaped film 11 are completely covered by the transparent electrode film 5. Moreover, as a material for the reflective film 6, Al or an Al alloy is used in ordinary cases, however, the present invention is not limited to this, that is, any metal, so long as it has high reflectivity and so long as it can be suitably used for a liquid crystal manufacturing process, may be employed.

Next, as shown in FIG. 4A, after having had an insulating film made of $SiO_x$ deposited on all the surfaces thereof using a plasma CVD method, by forming a resist pattern on the insulating film, the second passivation film 24 is formed. Then, by performing selective etching on exposed portions of the second passivation film 24, passivation film 10, and gate insulating film 9, the contacy holes 7 are formed, whereby the source electrode 2b is exposed through each of the contact holes 7. At this time, the contact holes 7 are not formed only in the pixel region, but also in the G-D converting portion and the terminal portion.

Next, as shown in FIG. 4B, after having had a transparent conductive film made of ITO or a like deposited on all the surfaces thereof by using a sputtering method, by using a resist pattern, the transparent electrode film 5 covering all surfaces of each pixel, a G-D converting electrode 22, and a terminal electrode 23 are formed at a same time. At this point, in order to prevent an electric erosion reaction of the reflective film 6 serving as a lower layer, the transparent electrode film 5 is formed in a manner so as to extend, for example, to regions on the gate line 1 and the data line 2 so that all surfaces of the reflective film 6 are covered. By employing the layer-stacked structure and layout structure of the reflective film 6 and the transparent electrode film 5, the reflective film 6 can avoid contact with the developer.

In the embodiment, since the second passivation film 24 is formed between the reflective film 6 and the transparent electrode film 5, causing the reflective film 6 to be put in an electrically floating state, there is a fear that a potential of the reflective film 6 fluctuates due to a gate voltage to be applied to the TFT 3. However, as described above, by forming a concave/convex shaped film 11 on the TFT 3 and by keeping a distance between the TFT 3 and the reflective film 6 using the concave/convex shaped film 11, it is made possible to fully reduce an influence by the TFT 3 on the reflective film 6.

Then, the orientated film 29 made of polyimide is formed on the transparent electrode film 5 to complete the formation of the active matrix substrate 12. Next, a facing substrate 16 is prepared which includes the color filter 14, black matrix (not shown), facing electrode 15, orientated film 29 having been formed sequentially on the transparent insulating substrate 13. Then, by inserting the liquid crystal layer 17 between the active matrix substrate 12 and the facing substrate 16 and by placing phase difference plates 20a and 20b and polarizers 19a and 19b on both sides of the active matrix substrate 12 and facing substrate 16 respectively and by placing the backlight source 18 on a rear of the polarizer 19a placed on a side of the active matrix substrate 12, the semi-transmissive-type liquid crystal display device as shown in FIGS. 1 and 2 is manufactured.

Thus, according to the semi-transmissive-type liquid crystal display device and the method of manufacturing the same of the embodiment, since the transparent electrode film 5 is formed above the reflective layer 6 with the second passivation film 24 being sandwiched between the reflective film 6 and the transparent electrode film 5, an electric erosion reaction between Al and ITO can be avoided and occurrence of a pixel defect can be prevented and, since polyimide film (orientated film 29) can avoid contact with Al film (reflective film 6) and, a flicker caused by a residual DC voltage can be prevented. Also, G-D conversion can be made in the outer regions of the liquid crystal panel.

Moreover, in the embodiment, an example is shown in which the second passivation film 24 is placed both in the reflective region PXb and the transmissive region PXa. However, since the second passivation film 24 is placed with an aim of avoiding direct contact of the reflective film 6 with the transparent electrode film 5, as shown in FIG. 5, the second passivation film 24 may be formed only on the reflective film 6. In this case, after an $SiN_x$ film has been formed in the process shown in FIG. 4A, before contact holes 7 are formed not only on the source electrode 2b, but in the G-D converting portion and the terminal portion, the second passivation film 24 in the transmissive region PXa is removed by using a resist pattern as a mask. Also, after having consecutively formed Al and $SiN_x$ films and removed the second passivation film 24 and the reflective film 6 in the transmissive region PXa at a same time by using a resist pattern as a mask, and thereafter almost the same process as described above may be performed. Thus, the active matrix substrate 12 having configurations as shown in FIG. 5 is finally completed and the semi-transmissive-type liquid crystal display device using this active matrix substrate 12 can be manufactured.

Moreover, in the semi-transmissive-type liquid crystal display device of the embodiment, since a liquid crystal having a twisted angle being set at about 72° is used, a reflective gap "dr" is made equal to a transmissive gap "df", that is, a film thickness of the concave and convex shaped film 11 formed in the reflective region PXb is equal to that of the concave and convex shaped film 11 formed in the transmissive region PXa. However, as shown in the conventional technology, even if a twisted angle is set at about 0° or at about 60°, by changing the reflective gap "dr" and the transmissive gap "df", optimum intensity of outgoing light can be obtained.

FIG. 6 is a cross-sectional view of a first modified example of the semi-transmissive-type liquid crystal display device of the embodiment. In the semi-transmissive-type liquid crystal display device of the first modified example, by setting a twisted angle of a liquid crystal at about 0° and by forming the concave/convex shaped film 11 only in the reflective region PXb and by setting a thickness of the concave/convex shaped film 11 at about 1.4 μm (2.9 μm-1.5 μm), the reflective gap "dr" is optimized so as to become about 1.5 μm. This structure can be achieved by adjusting conditions for applying a photosensitive acrylic resin so that a thickness of the concave/convex shaped film 11 becomes about 1.4 μm when the concave/convex shaped film 11 is formed, for example, in the process shown in FIG. 3B and by simultaneously removing the concave/convex shaped film 11 in the transmissive region PXa when the contact hole 7 is formed on the source electrode 2b. Then, by performing approximately the same process as described above, the semi-transmissive-type liquid crystal display device having its twisted angle being set at about 0°, having its reflective gap "dr" being about 1.5 μm and having its transmissive gap "df" being about 2.9 μm is manufactured finally as shown in FIG. 6.

FIG. 7 is a cross-sectional view of a second modified example of the semi-transmissive-type liquid crystal display device of the embodiment.

In the semi-transmissive-type liquid crystal display device of the second modified example, as shown in FIG. 7, by setting a twisted angle of its liquid crystal at about 60° and by forming the concave/convex shaped film 11 both in the reflective region PXb and in the transmissive region PXa and by setting a thickness of the concave/convex shaped film 11 in the transmissive region PXa to become slightly thin, optimization is achieved so that its reflective gap "dr" is about 2.0 μm and its transmissive gap "df" is about 2.8 μm. In this case, the reflective gap "dr" accounts for about 70% of the transmissive gap "df". To achieve this structure, since a thickness of a photosensitive acrylic resin cannot be controlled exactly, as shown in FIG. 7, after having formed the concave/convex shaped film 11 both in the reflective region PXb and in the transmissive region PXa (whether or not concave and convex portions exist on a surface of the transmissive region PXa presents no problem), by forming a hollow having a depth of about 0.8 μm (2.8 μm-2.0 μm) only in the transmissive region PXa of the facing substrate 16, its transmissive gap is preferably calibrated. Moreover, this structure can be achieved by forming a hollow in the color filter 14 while being fabricated and by forming, in advance, a hollow in the transparent insulating substrate 13. Then, by performing approximately the same process as described above, the semi-transmissive-type liquid crystal display device having its twisted angle being set at about 60° and its reflective gap "dr" being about 2.0 μm and its transmissive gap "df" being about 2.8 μm is manufactured finally as shown in FIG. 7.

Second Embodiment

Figure 8:
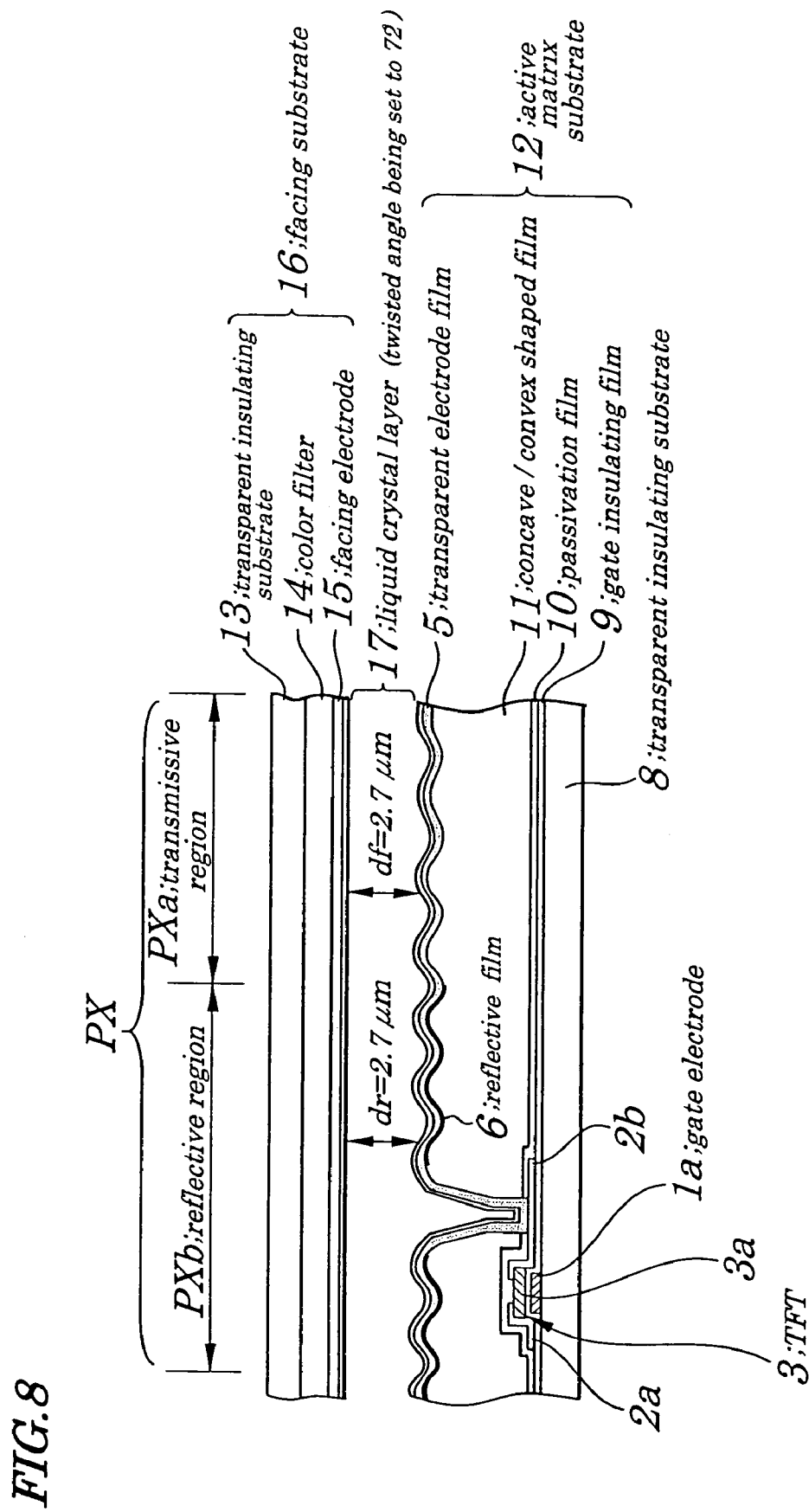
FIG. 8 is a cross-sectional view showing configurations of a semi-transmissive-type liquid crystal display device according to a second embodiment of the present invention.
Figure 9A:
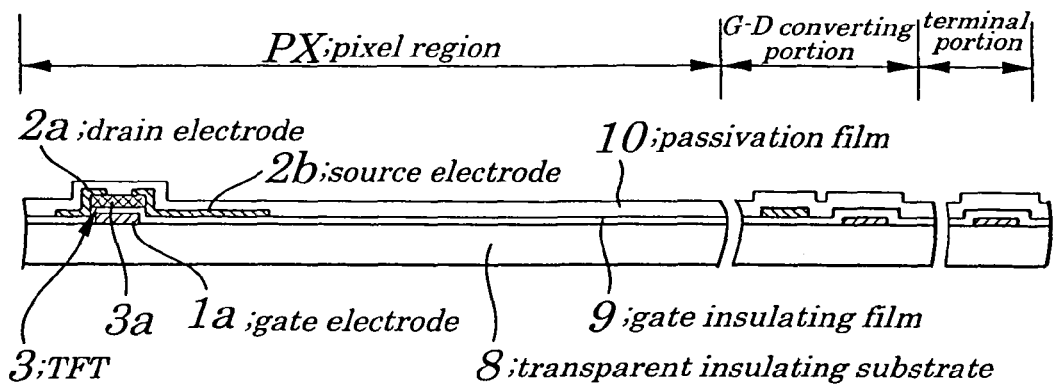
FIGS. 9A, 9B, and 9C are process charts illustrating the method of manufacturing the semi-transmissive-type liquid crystal display device in order of step according to the second embodiment of the present invention.
Figure 9B:
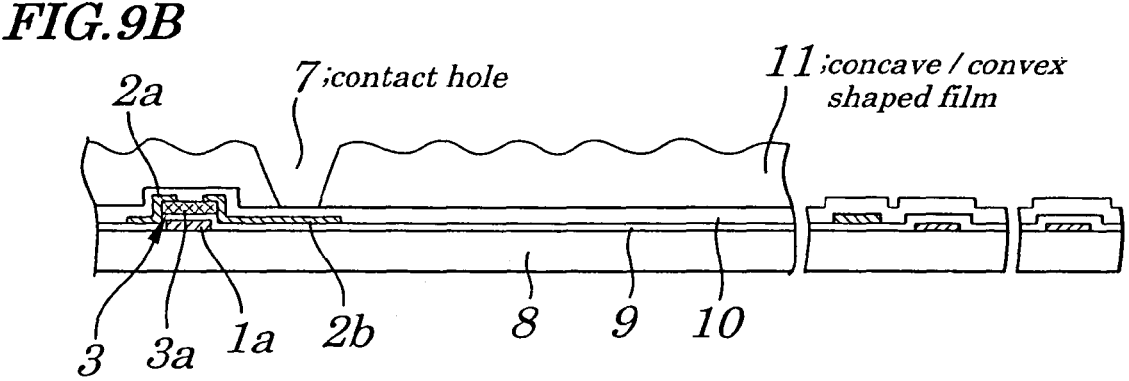
Figure 9C:
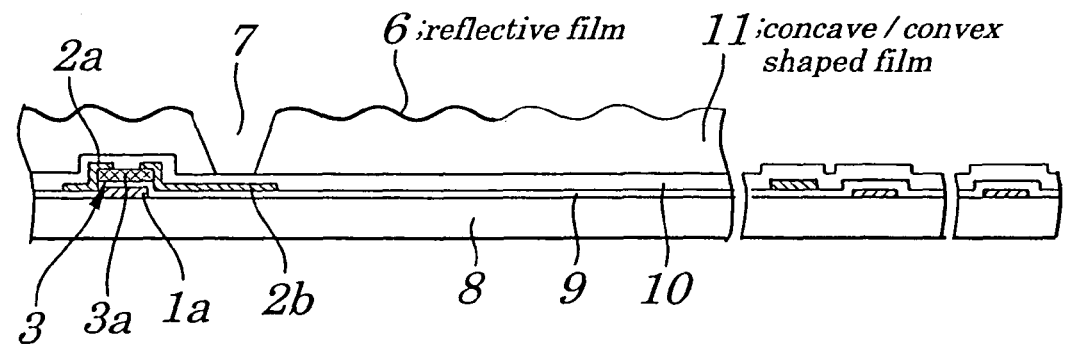
Figure 10A:
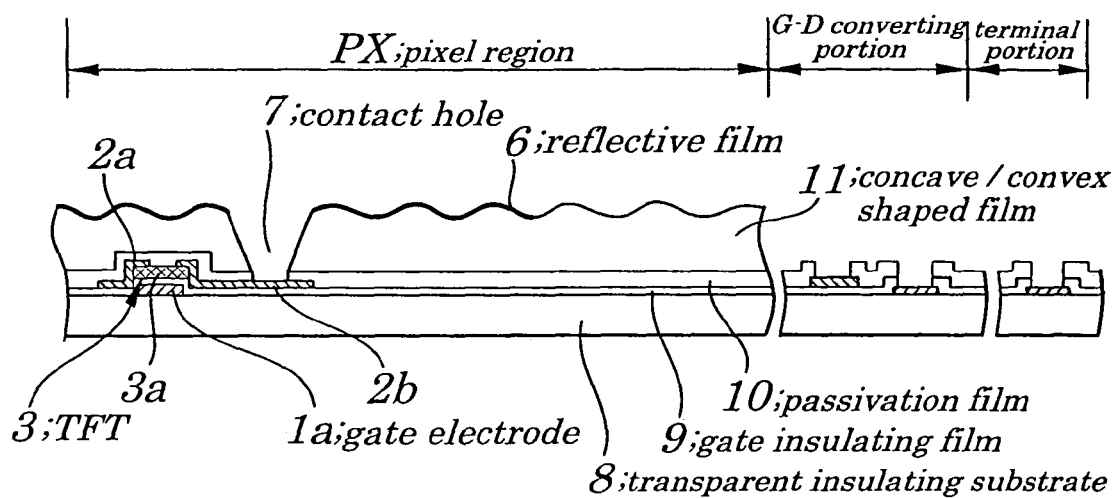
FIGS. 10A and 10B are also process charts illustrating the method of manufacturing the, semi-transmissive-type liquid crystal display device in order of step according to the second embodiment of the present invention.
Figure 10B:
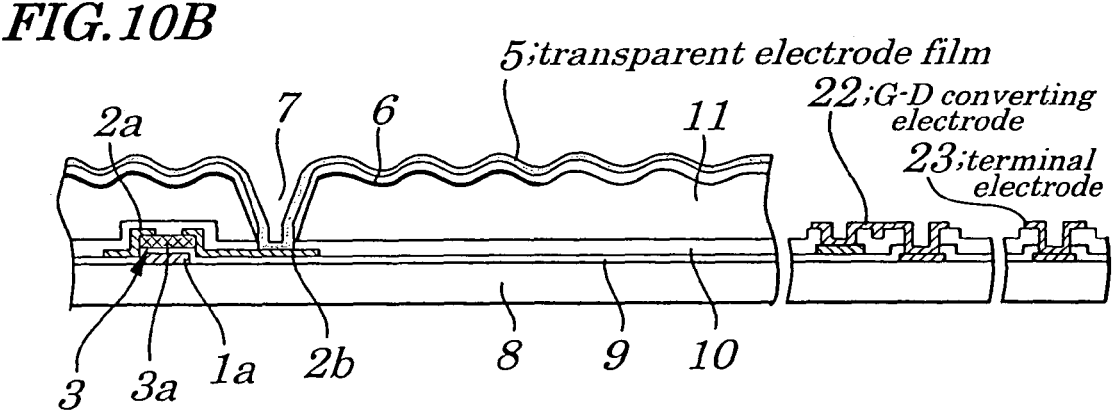
Figure 11:
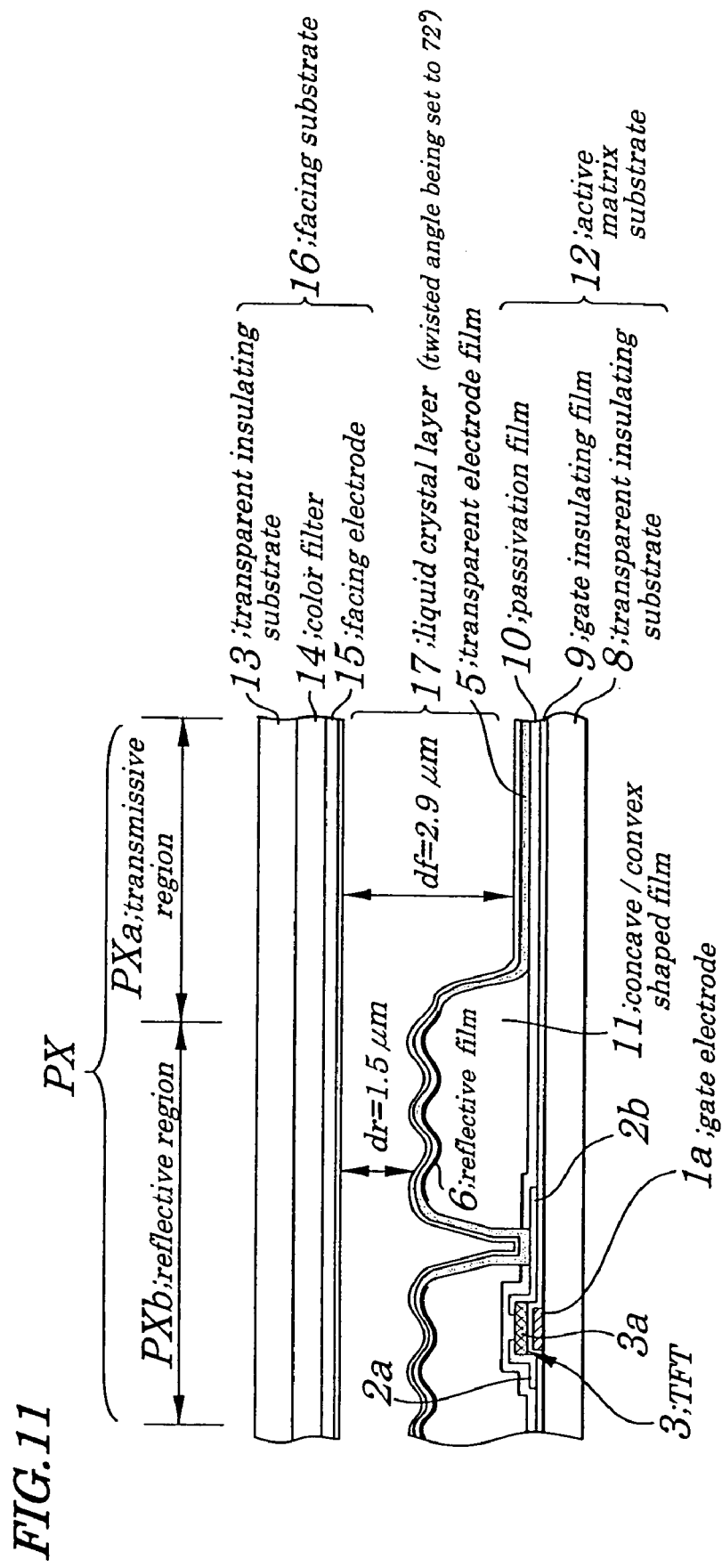
FIG. 11 is a cross-sectional view of a first modified example (twisted Angle being set at about 0°) of the semi-transmissive-type liquid crystal display device of FIG. 8.
Figure 12:
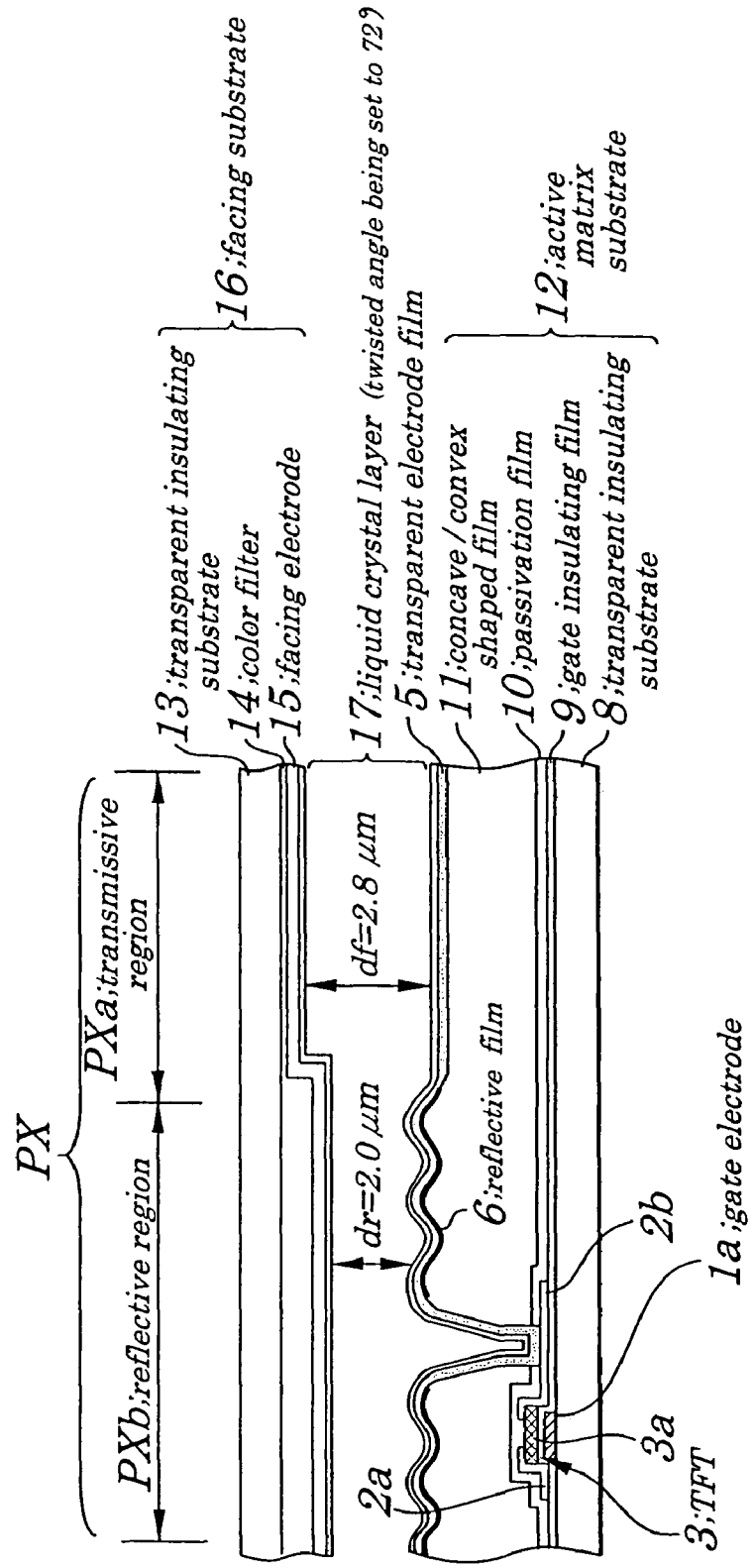
FIG. 12 is a cross-sectional view of a second modified example (twisted angle being set at about 60°) of the semi-transmissive-type liquid crystal display device of FIG. 8.

FIG. 8 is a cross-sectional view showing configurations of a semi-transmissive-type liquid crystal display device according to a second embodiment of the present invention. FIGS. 9A, 9B, and 9C are process charts illustrating a method of manufacturing the semi-transmissive-type liquid crystal display device in order of step according to the second embodiment of the present invention. FIGS. 10A and 10B are process charts illustrating the method of manufacturing the semi-transmissive-type liquid crystal display device in order of step according to the second embodiment. FIG. 11 is a cross-sectional view of a first modified example (twisted angle being set at about 0°) of the semi-transmissive-type liquid crystal display device of FIG. 8. FIG. 12 is a cross-sectional view of a second modified example (twisted angle being set at about 60°) of the semi-transmissive-type liquid crystal display device of FIG. 8. Configurations of the semi-transmissive-type liquid crystal display device of the second embodiment differ greatly from those of the first embodiment in that, in order to simplify manufacturing processes, formation of a second passivation film is made unnecessary and a transparent electrode film 5 is formed directly on a reflective film 6. Moreover, in the example described below, a case is explained in which a twisted angle is set at about 72°, that is, a reflective gap is equal to a transmissive gap. In the semi-transmissive-type liquid crystal display device of the second embodiment, as shown in FIG. 8, the reflective film 6 made of Al or an Al alloy is formed in a reflective region PXb of a pixel region PX, and the transparent electrode film 5 made of ITO or a like is formed throughout the pixel region PX in a manner so as to fully cover the reflective films (lower layer) 6, thus a transmissive region PXa is formed in the pixel region PX except the reflective region PXb. Moreover, in the embodiment, as described later, the reflective film 6 is connected to the transparent electrode film 5 and is used as part of a pixel electrode. Configurations other than described above are the same as in the first embodiment. Therefore, in FIG. 8, same reference numbers are assigned to components corresponding to those in FIG. 1 and their descriptions are omitted accordingly.

Next, a method for manufacturing the semi-transmissive-type liquid crystal display device of the second embodiment is described in order of step by referring to FIGS. 9A, 9B, and 9C and FIGS. 10A and 10B. First, as in the case of the first embodiment, as shown in FIG. 9A, after a gate line 1 (not shown), a gate electrode 1a, a common storage line 4 (not shown), and an auxiliary capacitive electrode 4a (not shown) have been formed on a transparent insulating substrate 8 made of glass or a like by approximately the same method as employed in the first embodiment, a semiconductor layer 3a is formed with a gate insulating film 9 being interposed between the semiconductor layer 3a and the gate electrode 1a. Next, a data line 2 (not shown), a drain electrode 2a, a source electrode 2b, and a capacitive accumulating electrode 2c (not shown) are formed to construct a TFT 3 and then a passivation film 10 is formed. Components not shown in FIG. 9 are described in FIG. 1.

Next, as shown in FIG. 9B, by the same method as in the first embodiment, after the passivation film 10 has been coated with a photosensitive acrylic resin, the acrylic resin is removed from portions of the contact hole 7, a G-D converting section placed outside of the pixel region PX and a terminal region, and then a concave/convex shaped film 11 is formed in the reflective region PXb and in the transmissive region PXa containing the TFT 3. In this case, in order to suppress attenuation of transmitted light caused by the concave/convex shaped film 11, it is preferable that exposure processing is performed on all surfaces thereof and decoloring of the acrylic film is made.

Then, as shown in FIG. 9C, by approximately the same method employed in the first embodiment, after Al has been formed on all the surfaces thereof, Al in the transmissive region PXa is removed by using a resist pattern as a mask and the reflective film 6 is formed only in the reflective region PXb. At this point, to prevent light fed from an outside from entering the TFT 3, it is preferable that the reflective film 6 is formed on the TFT 3.

Then, as shown in FIG. 10A, by performing selective etching on the passivation film 10 formed below the contact hole 7, passivation film 10 in the G-D converting portion and in the terminal portion and gate insulating film 9, the source electrode 2b is made exposed and contact holes 7 are formed also in the G-D converting portion and in the terminal portion.

Then, as shown in FIG. 10B, after an ITO film has been formed on all surfaces thereof, by using a resist pattern as a mask, the transparent electrode film 5 (as a pixel electrode) on the reflective film 6 of the reflective region PXb as well as the transmissive region Pxa in the pixel region, G-D converting electrode 22, and terminal electrode 23 are formed at a same time. In the second embodiment, unlike in the case of the first embodiment, since the reflective film 6 is not covered with a second passivation film 24, if a portion exists in which the reflective film 6 is not covered with the transparent electrode film 5 and when a region occurs in which coverage by the transparent electrode film 5 in an end of the reflective film 6 is insufficient when a resist pattern used for processing a transparent electrode film is formed, there is a fear that an electric erosion reaction occurs. Therefore, the transparent electrode film 5 has to be formed so as to cover entire portions of the reflective film 6, that is, the transparent electrode film 5 has to be formed in a manner that a resist pattern is left on entire portions of the reflective film 6.

Moreover, in the first embodiment, since the second passivation film 24 is formed between the reflective film 6 and the transparent electrode film 5 and the reflective film 6 is in an electrically floating state, there is a fear that a potential of the reflective film 6 fluctuates due to a gate voltage applied to the TFT 3. However, in the second embodiment, since the reflective film 6 is electrically connected to the transparent electrode film 5, no fluctuation occurs in a potential of the reflective film 6. Therefore, since it is not necessary to keep a distance between the TFT 3 and the reflective film 6, formation of the concave/convex shaped film 11 on the TFT 3 is not required.

Thereafter, by forming an orientated film made of polyimide on the transparent electrode film 5 in approximately the same way as employed in the first embodiment, formation of the active matrix substrate 12 is completed. Then, a facing substrate 16 is prepared which includes a color filter 14, black matrix (not shown), facing electrode 15, orientated film 29 having been formed sequentially on the transparent insulating substrate 13. Then, by inserting the liquid crystal layer 17 between the active matrix substrate 12 and the facing substrate 16 and, in approximately the same way employed in the first embodiment, by placing phase difference plates 20a and 20b and polarizers 19a and 19b on both sides of the active matrix substrate 12 and facing substrate 16 respectively and by placing a backlight source 18 on a rear of the polarizer 19a placed on a side of the active matrix substrate 12, the semi-transmissive-type liquid crystal display device as shown in FIG. 8 is manufactured. That is, in approximately the same way as employed in the first embodiment, by inserting a liquid crystal having its twisted angle being set at about 72°, the semi-transmissive-type liquid crystal display device having no step between the reflective region PXb and the transmissive region PXa (the reflective gap dr and the transmissive gap df are the same which is about 2.7 µm) is manufactured. However, the phase difference plates 20a and 20b, polarizers 19a and 19b, and backlight source 18 are not shown in FIG. 8.

Thus, according to the semi-transmissive-type liquid crystal display device of the second embodiment, since the transparent electrode film 5 is formed above the reflective film 6 in a manner so as to cover the reflective film 6, an electric erosion reaction between Al and ITO can be avoided and occurrence of a pixel defect can be also prevented. Moreover, since Al does not come into contact with polyimide, occurrence of a flicker caused by a residual DC voltage can be prevented. Moreover, G G-D conversion can be made in the outer regions of the liquid crystal panel.

Moreover, also in the second embodiment, as in the case of the first embodiment, a modified configuration is possible in which a twisted angle of a liquid crystal is set at about 0° or about 60°. FIG. 11 is a cross-sectional view of a first modified example (its twisted angle being set at about 0°) of the semi-transmissive-type liquid crystal display device of the second embodiment. This structure can be achieved by adjusting conditions for applying a photosensitive acrylic resin so that a thickness of the concave/convex shaped film 11 becomes about 1.4 µm when the concave/convex shaped film 11 is formed in the process shown in FIG. 9A and by removing the concave/convex shaped film 11 in the transmissive region PXa when the contact hole 7 is formed on the source electrode 2b. Then, by performing approximately the same process as described above, the semi-transmissive-type liquid crystal display device having its twisted angle being set at about 0°, its reflective gap "dr" being about 1.5 µm and its transmissive gap "df" being about 2.9 µm is manufactured finally as shown in FIG. 11.

FIG. 12 is a cross-sectional view of a second modified example (its twisted angle being set at about 60°) of the semi-transmissive-type liquid crystal display device of the second embodiment. This structure can be achieved by forming the concave/convex shaped film 11 in both the reflective region PXb and the transmissive region PXa (existence of concave and convex portions on a surface in the transmissive region PXa presents no problem) and by placing a hollow in the transmissive region PXa of the facing substrate 16 to calibrate a gap. Then, by performing approximately the same process as described above, the semi-transmissive-type liquid crystal display device having its twisted angle being set at about 60°, its reflective gap "dr" being about 2.0 µm and its transmissive gap "df" being about 2.8 µm is manufactured.

Third Embodiment

Figure 13:
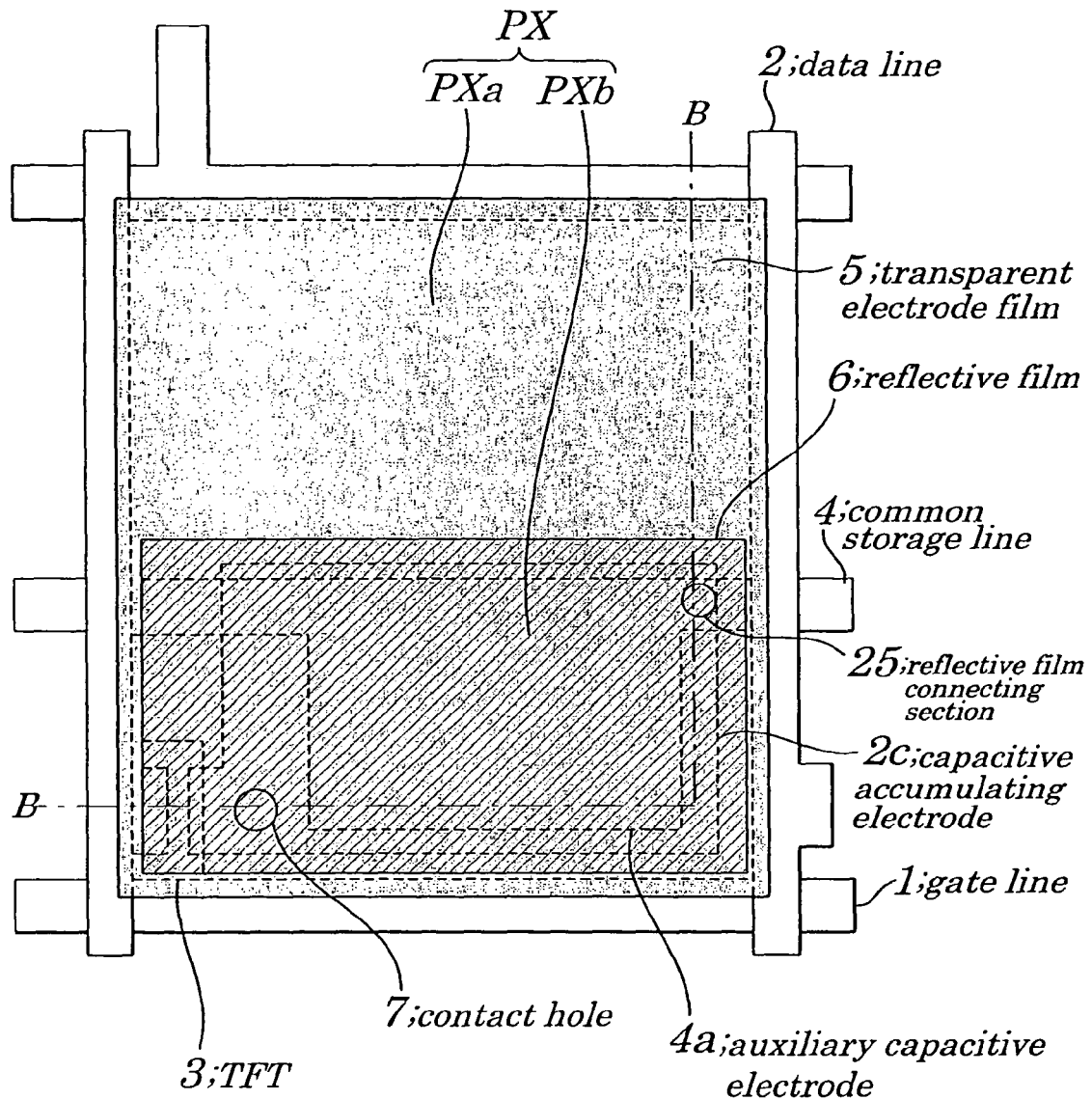
FIG. 13 is a plan view for showing a configuration of a semi-transmissive-type liquid crystal display device according to a third embodiment of the present invention.
Figure 14A:
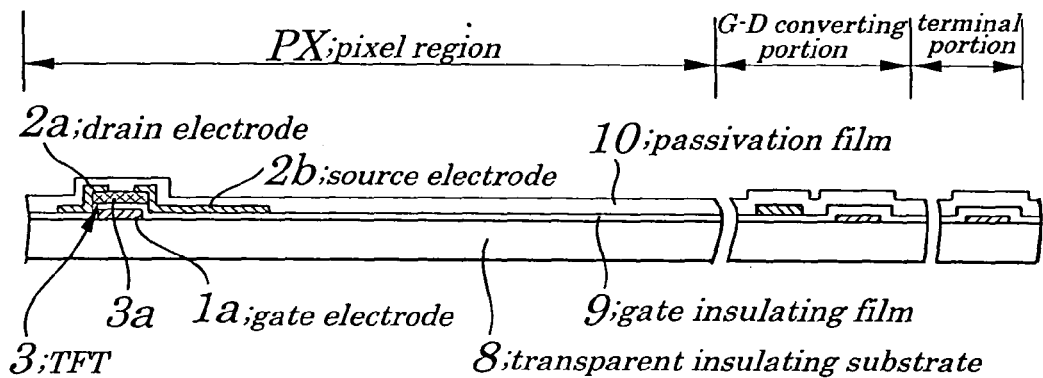
FIGS. 14A, 14B, and 14C are process charts for illustrating the method of manufacturing the semi-transmissive-type liquid crystal display device in order of step according to the third embodiment of the present invention.
Figure 14B:
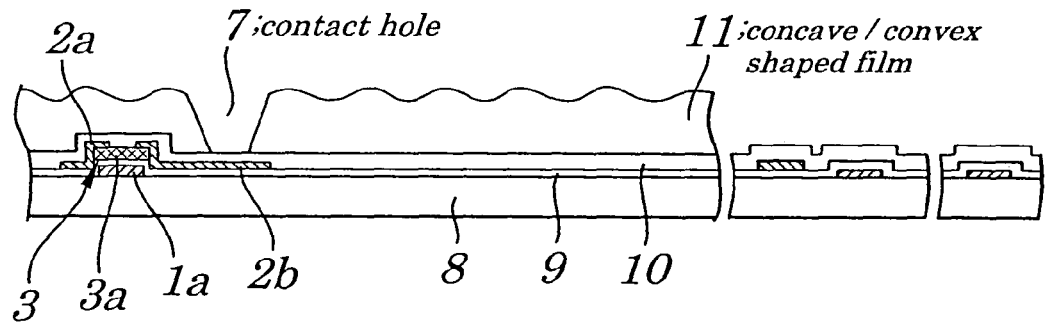
Figure 14C:
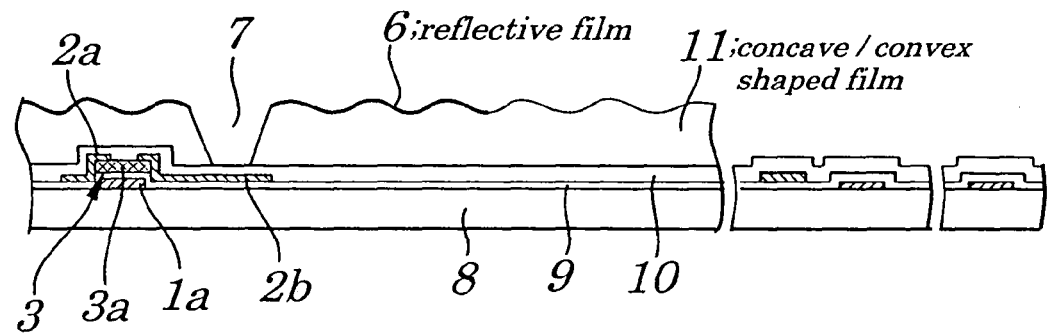
Figure 15A:
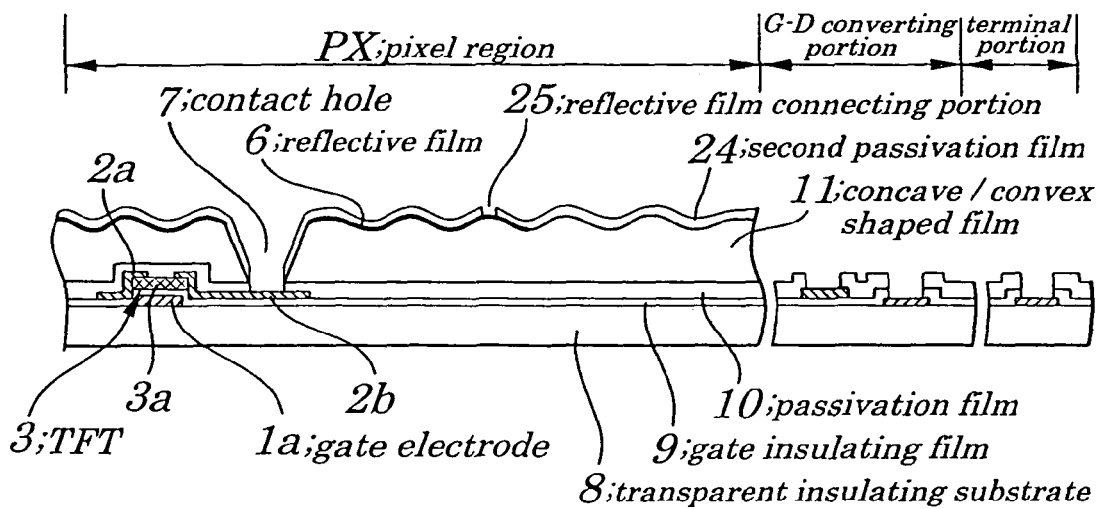
FIGS. 15A and 15B are also process charts illustrating the method of manufacturing the semi-transmissive-type liquid crystal display device in order of step according to the third embodiment of the present invention.
Figure 15B:
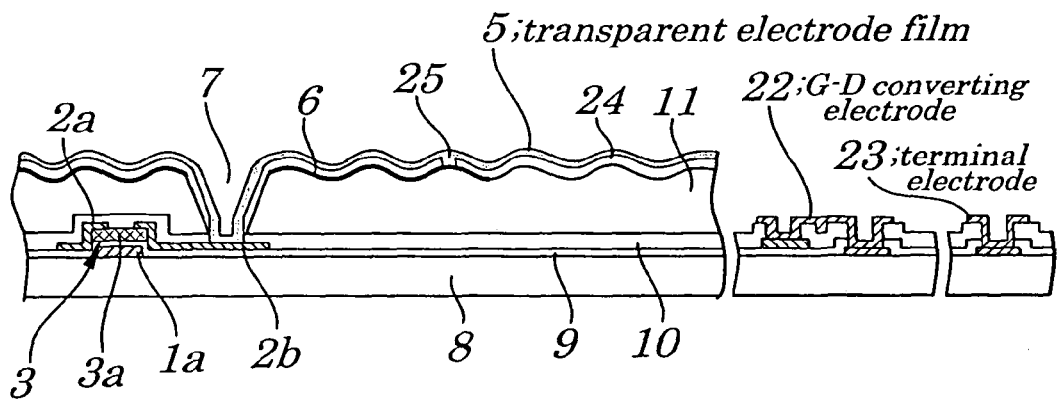

FIG. 13 is a plan view of a semi-transmissive-type liquid crystal display device according to a third embodiment of the present invention. FIGS. 14A, 14B, and 14C are process charts illustrating the method of manufacturing the semi-transmissive-type liquid crystal display device in order of step according to the third embodiment. FIGS. 15A and 15B are process charts illustrating the method of manufacturing the semi-transmissive-type liquid crystal display device in order of step according to the third embodiment. Configurations of the semi-transmissive-type liquid crystal display of the third embodiment differ from those in the first embodiment in that, in order to prevent fluctuation in a potential of a reflective film, the reflective film is connected to a transparent electrode film through a contact hole (reflective film connecting portion). In the semi-transmissive-type liquid crystal display device of the third embodiment, as shown in FIG. 13, a reflective film 6 made of Al or an Al alloy is formed in a reflective region PXb and the reflective film 6 is connected to a transparent electrode film 5 through a reflective film connecting portion 25 formed in a second passivation film 24. Configurations other than described above are the same as in the first embodiment. Therefore, in FIG. 13, same reference numbers are assigned to components corresponding to those in FIG. 1 and their descriptions are omitted accordingly.

Next, a method for manufacturing the semi-transmissive-type liquid crystal display device of the third embodiment is explained in order of step by referring to FIGS. 14A to 14C and FIGS. 15A and 15B. FIGS. 14A to 14C and FIGS. 15A and 15B are cross-sectional views of the semi-transmissive-type liquid crystal display device of FIG. 13 taken along a line B-B.

First, as shown in FIG. 14A, in approximately the same method as employed in the first and second embodiments, after a gate line 1 (not shown), a gate electrode 1a, a common storage line 4 (not shown), and an auxiliary capacitive electrode 4a have been formed, a semiconductor layer 3a is formed with a gate insulating film 9 being interposed between the semiconductor layer 3a and the gate electrode 1a. Next, a data line 2 (not shown), a drain electrode 2a, a source electrode 2b, and a capacitive accumulating electrode 2c (not shown) are formed to construct a TFT 3 and then a passivation film 10 is formed.

Next, as shown in FIG. 14B, by the same method as in the first embodiment, after the passivation film 10 has been coated with a photosensitive acrylic resin, a acrylic resin is removed from a contact hole 7 formed in the pixel region PX, the G-D converting section and the terminal region placed outside of a pixel region PX, and a concave/convex shaped film 11 is formed in a reflective region PXb and in a transmissive region PXa containing the TFT 3. In this case, in order to suppress attenuation of transmitted light caused by the concave/convex film 11, it is preferable that exposure processing is performed on all surfaces thereof and decoloring of the acrylic film is performed.

Next, as shown in FIG. 14C, by approximately the same method employed in the first and second embodiments, after Al has been formed on all the surfaces thereof, Al in the transmissive region PXa is removed by using a resist pattern as a mask and the reflective film 6 is formed in the reflective region PXb. At this point, in order to prevent light fed from an outside from entering the TFT 3, it is preferable that the reflective film 6 is formed on the TFT 3.

Then, as shown in FIG. 15A, after an insulating film made of $SiO_x$ has been deposited on all the surfaces thereof by using a plasma CVD method or a like, a resist pattern is formed on the insulating film and then a second passivation film 24 is formed thereon. Next, selective etching is performed on the second passivation film 24 below the contact hole 7 and the second passivation film 24 in the G-D converting portion and in the terminal portion and, at a same time, the reflective film connecting portion 25 is formed to have the reflective film 6 be exposed to the second passivation film 24. Then, selective etching is performed on the passivation film 10 below the contact hole 7, the passivation film 10 in the G-D converting portion and in the terminal portion, and the gate insulating film 9 to have the source electrode 2b be exposed and then a contact hole is formed at a same time in the G-D converting portion and in the terminal portion. Moreover, the reflective film connecting portion 25 can be formed at an arbitrary place on the reflective film 6, however, since there is a fear that Al is eroded by a developer when etching is performed on the reflective film connecting portion 25, it is preferable that the reflective film connecting portion 25 is formed in a place surrounding each of the pixels. Etching on the second passivation film 24 and etching on the passivation film 10 and on the gate insulating film 9 may be simultaneously performed.

Next, as shown in FIG. 15B, after a transparent conductive film made of ITO has been deposited on all the surfaces thereof by using a sputtering a method, the transparent electrode film 5 formed throughout surface of the pixels, a G-D converting electrode 22 and a terminal electrode 23 are formed using a resist pattern as a mask at a same time. By employing the layer-stacked structure and layout structure of the reflective film 6 and the transparent electrode film 5, the reflective film 6 can avoid contact with the developer.

Moreover, in the first embodiment, since the reflective film 6 is in an electrically floating state, there is a fear that a potential of the reflective film 6 fluctuates due to a gate voltage being applied to the TFT 3. However, in the third embodiment, as in the case of the second embodiment, since the reflective film 6 is electrically connected to the transparent electrode film 5, no fluctuation occurs in a potential of the reflective film 6. As a result, it is not necessary to keep a distance between the TFT 3 and the reflective film 6 and, therefore, formation of the concave and convex film 11 on the TFT 11 is not required.

Thereafter, by forming an orientated film 29 made of polyimide on the transparent electrode film 5, formation of the active matrix substrate 12 is completed. Next, a facing substrate 16 is prepared which includes the color filter 14, black matrix (not shown), facing electrode 15, orientated film 29 having been formed sequentially on the transparent insulating substrate 13. Then, by inserting the liquid crystal layer 17 between the active matrix substrate 12 and the facing substrate 16 and by placing phase difference plates 20a and 20b and polarizers 19a and 19b on both sides of the active matrix substrate 12 and facing substrate 16 respectively and by placing the backlight source 18 on a rear of the polarizer 19a placed on a side of the active matrix substrate 12, the semi-transmissive-type liquid crystal display device as shown in FIG. 13 is manufactured.

Thus, according to the semi-transmissive-type liquid crystal display device of the third embodiment, since the transparent electrode film 5 is formed throughout the pixel region PX in a manner so as to cover fully the reflective film 6, an electric erosion reaction between Al and ITO can be avoided and occurrence of a pixel defect can be prevented. Moreover, since Al does not come into contact with polyimide, occurrence of a flicker caused by a residual DC voltage can be prevented. Also, G-D conversion can be made in the outer regions of the liquid crystal panel.

Fourth Embodiment

Figure 16:
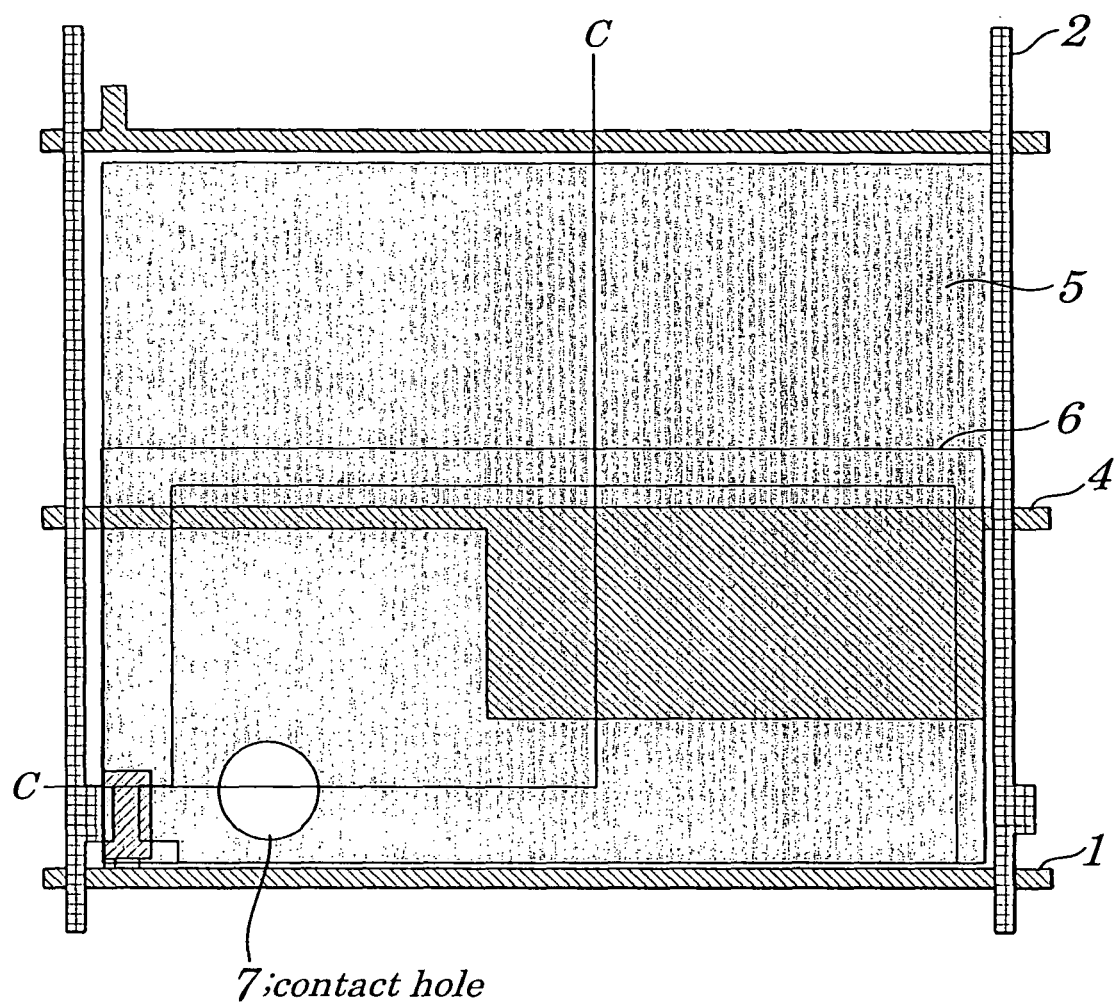
FIG. 16 is a plan view of a semi-transmissive-type liquid crystal display device according to a fourth embodiment of the present invention.
Figure 17:
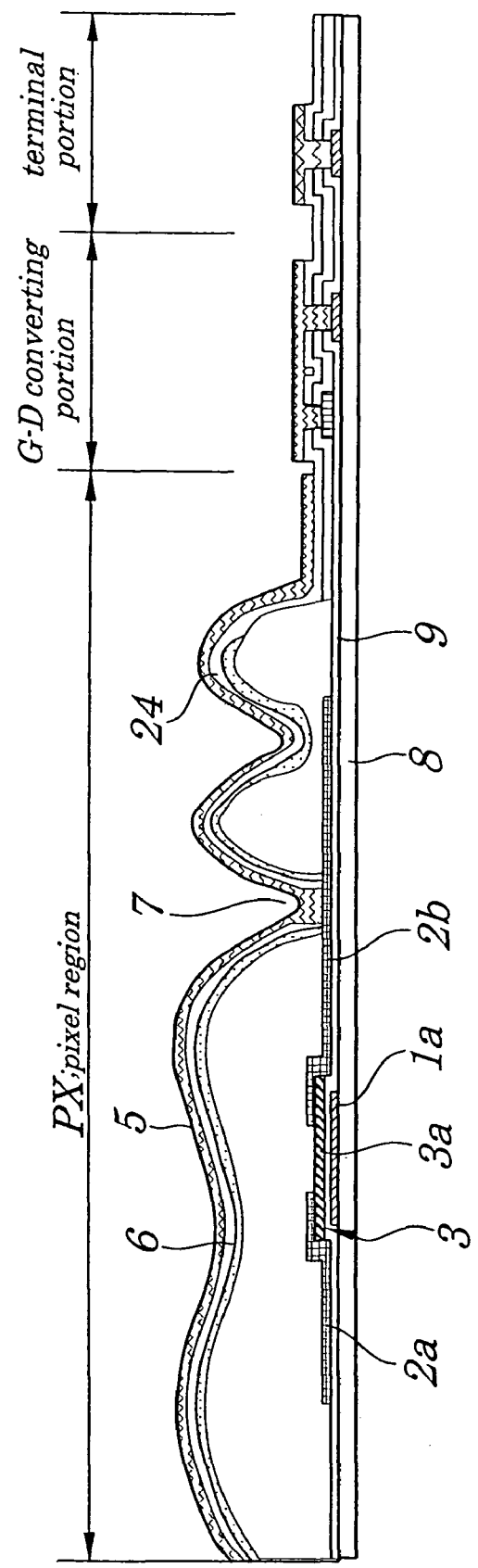
FIG. 17 is a cross-sectional view of the semi-transmissive-type liquid crystal display device of FIG. 16 taken along a line C-C.
Figure 18:
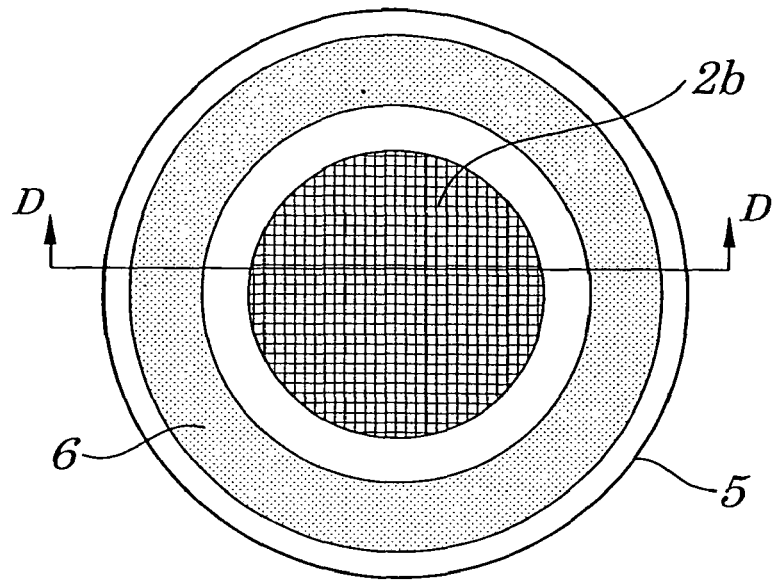
FIG. 18 is a plan view of an expanded structure of a main portion of the semi-transmissive-type liquid crystal display device of the fourth embodiment of the present invention.
Figure 19:
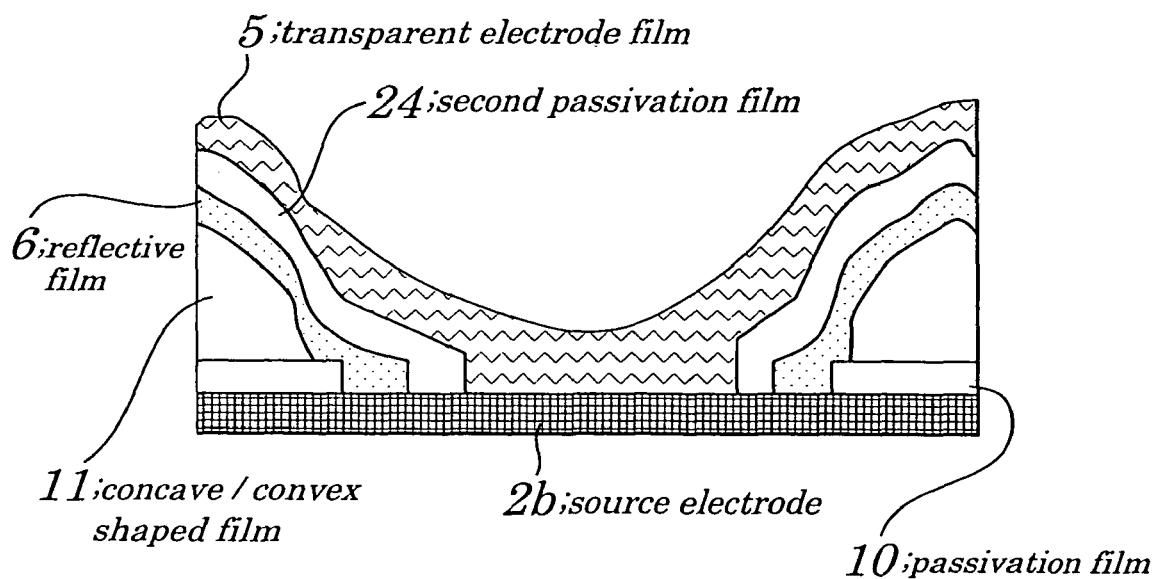
FIG. 19 is a cross-sectional view of the semi-transmissive-type liquid crystal display device of FIG. 18 taken along a line D-D.

FIG. 16 is a plan view of a semi-transmissive-type liquid crystal display device according to a fourth embodiment of the present invention. FIG. 17 is a cross-sectional view of the semi-transmissive-type liquid crystal display device of FIG. 16 taken along a line C-C. FIG. 18 is a plan view of an expanded structure of a main portion of the semi-transmissive-type liquid crystal display device of the fourth embodiment. FIG. 19 is a cross-sectional view of the semi-transmissive-type liquid crystal display device of FIG. 18 taken along a line D-D. FIGS. 20A, 20B, 20C, and 20D are process charts illustrating a method of manufacturing the semi-transmissive-type liquid crystal display device in order of step according to the fourth embodiment. FIGS. 21A and 21B are also process charts illustrating the method of manufacturing the semi-transmissive-type liquid crystal display device in order of step according to the fourth embodiment. Configurations of the semi-transmissive-type liquid crystal display device of the fourth embodiment differ from those in the third embodiment in that, in order to prevent a fluctuation in a potential of a reflective film, at two different points within a contact hole formed on a second passivation film, the reflective film and a transparent electrode film are connected to a source electrode. In the semi-transmissive-type liquid crystal display device of the fourth embodiment, as shown in FIG. 16 to FIG. 19, a transparent electrode film 5 is formed above the reflective film 6 with a second passivation film 24 being interposed between the reflective film 6 and the transparent electrode film 5, as in the case of the first embodiment. Moreover, as in the case of the third embodiment, the reflective film 6 is electrically connected to the transparent electrode film 5 and in a first region 7a within a contact hole 7 formed on the second passivation film 24 and, in a second region 7b within the contact hole 7, a source electrode 2b is connected to the transparent electrode film 5. Configurations other than described above are the same as in the third embodiment. Therefore, in FIGS. 16 and 17, same reference numbers are assigned to components corresponding to those in FIG. 13 and their descriptions are omitted accordingly.

When the reflective film 6 made of Al is connected to the transparent electrode film 5 made of ITO in order to prevent a fluctuation in a potential of the reflective film 6 as in the case of the third embodiment, in some cases, a non-conductor made of aluminum oxide or a like is formed at an interface surface between Al and ITO depending on a process selected and contact resistance between the reflective film 6 and the transparent electrode film 5 becomes as high as 10 M☐ or more. Therefore, in this case, since a fluctuation in a potential of the reflective film 6 caused by an electrostatic characteristic in a manufacturing process of a liquid crystal panel cannot be fully suppressed, a fear exists that display quality is degraded.

To solve this problem, in the fourth embodiment, at two different places (first region 7a and second region 7b) within the contact hole 7 formed in the second passivation film 24, each of the reflective film 6 and transparent electrode film 5 is connected to the source electrode 2b. By configuring as above, since the reflective film 6 is not directly connected to the transparent electrode film 5, such the high contact resistance as described above does not occur and a fluctuation in a potential of the reflective film 6 can be fully suppressed, thus preventing degradation of display quality.

Next, a method for manufacturing the semi-transmissive-type liquid crystal display device of the fourth embodiment is explained in order of step by referring to FIGS. 20 to 21. FIGS. 20 to 21 are cross-sectional views of the semi-transmissive-type liquid crystal display device of FIG. 16 taken along a line C-C.

First, as shown in FIG. 20A, after a gate line 1 (not shown), a gate electrode 1a, a common storage line 4 (not shown), and an auxiliary capacitive electrode 4a (not shown) have been formed on a transparent insulating substrate 8 made of glass or a like by approximately the same method as employed in the first to third embodiments, a semiconductor layer 3a is formed with a gate insulating film 9 being interposed between the semiconductor layer 3a and the gate electrode 1a. Next, a data line 2 (not shown), a drain electrode 2a, a source electrode 2b, and a capacitive accumulating electrode 2c (not shown) are formed to construct a TFT 3 and then a passivation film 10 is formed.

Next, as shown in FIG. 20B, by the same method as in the first to third embodiments, after the passivation film 10 has been coated with a photosensitive acrylic resin, a acrylic resin is removed from the contact hole 7, a G-D converting section placed outside of the pixel region PX and then a terminal region and a concave/convex shaped film 11 is formed in a reflective region PXb and transmissive region PXa containing the TFT 3. In this case, in order to suppress attenuation of transmitted light caused by the concave/convex film 11, it is preferable that exposure processing is performed on all surfaces thereof and decoloring of the acrylic film is made.

Then, as shown in FIG. 20C, by removing the passivation film 10 placed below the contact hole 7 using a resist pattern formed on the concave/convex shaped film 11 as a mask, only the source electrode 2b is made exposed. At this point, the passivation film 10 in the G-D converting portion and in the terminal portion and the gate insulating film 9 are not removed.

Next, as shown in FIG. 20D, after Al has been formed on all surfaces thereof, Al in the transmissive region PXa is removed by using a resist pattern as a mask and the reflective film 6 is formed in the reflective region PXb. At this point, in order to prevent light from an outside from entering the TFT 3, it is preferable that the reflective film 6 is formed also on the TFT 3.

Then, as shown in FIG. 21A, after an insulating film made of $SiO_x$ has been deposited on all the surfaces thereof by using a plasma CVD method or a like, a resist pattern is formed on the insulating film to form a second passivation film 24. Next, selective etching is performed on the second passivation film 24 below the contact hole 7 and the second passivation film 24 in the G-D converting portion and in the terminal portion. Then, selective etching is performed on the passivation film 10 below the contact hole 7, the passivation film 10 in the G-D converting portion and in the terminal portion, and the gate insulating film 9 to have the source electrode 2b be exposed and, at a same time, a contact hole is also formed in the G-D converting portion and in the terminal portion. Moreover, etching on the second passivation film 24 and etching on the passivation film 10 and on the gate insulating film 9 may be simultaneously performed.

Next, as shown in FIG. 21B, after a transparent conductive film made of ITO has been deposited on all the surfaces thereof by using a sputtering method, the transparent electrode film 5 formed throughout the pixel regions PX, a G-D converting electrode 22 and a terminal electrode 23 are formed using a resist pattern as a mask at a same time.

Then, the orientated film 29 made of polyimide is formed on the active matrix substrate 12 to complete the formation of the active matrix substrate 12. Next, a facing substrate 16 is prepared which includes the color filter 14, black matrix (not shown), facing electrode 15, orientated film 29 having been formed sequentially on the transparent insulating substrate 13. Then, by inserting the liquid crystal layer 17 between the active matrix substrate 12 and the facing substrate 16 and by placing phase difference plates 20a and 20b and polarizers 19a and 19b on both sides of the active matrix substrate 12 and facing substrate 16 respectively and by placing the backlight source 18 on a rear of the polarizer 19a placed on a side of the active matrix substrate 12, the semi-transmissive-type liquid crystal display device as shown in FIG. 16 and FIG. 17 is manufactured.

Thus, according to the semi-transmissive-type liquid crystal display device of the fourth embodiment and its manufacturing method, by forming the transparent electrode film 5 above the reflective film 6 with the second passivation film 24 being interposed between the reflective film 6 and the transparent electrode film 5 and by connecting the reflective film 6 and transparent electrode film 5 to the source electrode 2b at two different points within the contact hole 7 formed in the second passivation film 24 to prevent a fluctuation of a potential of the reflective film 6, contact resistance between the reflective film 6 and the transparent electrode film 5 is made lowered, which serves to improve display quality.

Fifth Embodiment

Figure 22:
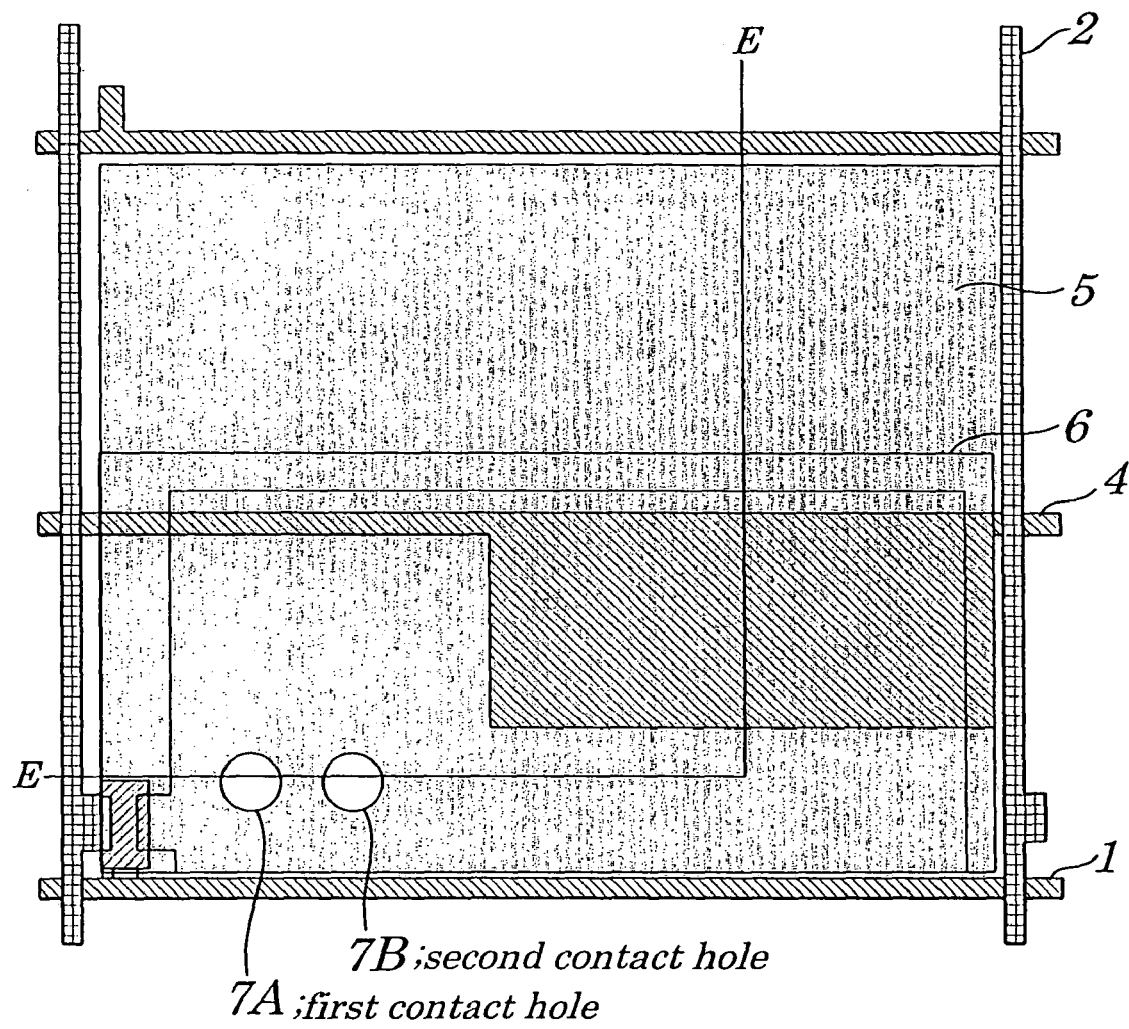
FIG. 22 is a plan view of a semi-transmissive-type liquid crystal display device according to a fifth embodiment of the present invention.
Figure 23:
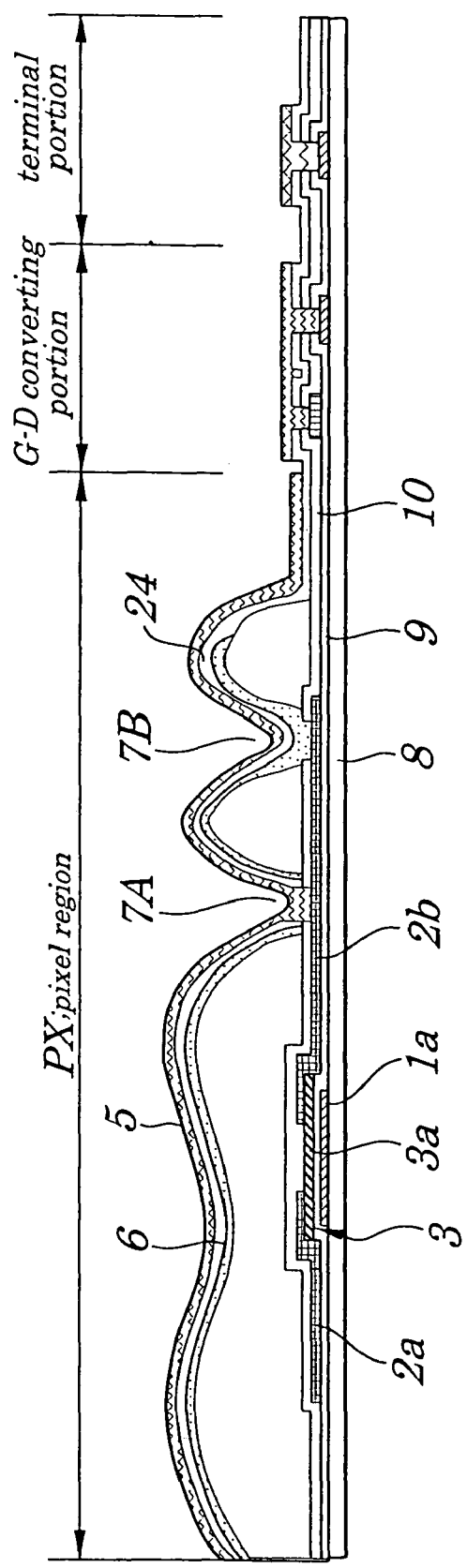
FIG. 23 is a cross-sectional view of the semi-transmissive-type liquid crystal display device of FIG. 22 taken along a line E-E.

FIG. 22 is a plan view of a semi-transmissive-type liquid crystal display device according to a fifth embodiment of the present invention. FIG. 23 is a cross-sectional view of the semi-transmissive-type liquid crystal display device of FIG.

Figure 24:
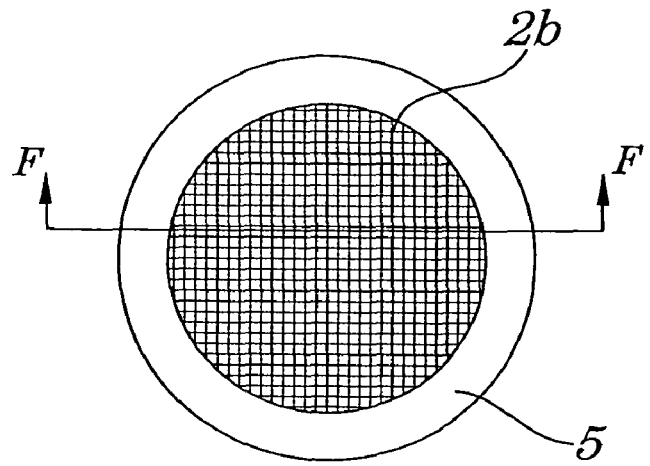
FIG. 24 is a plan view of an expanded structure of a main portion of the semi-transmissive-type liquid crystal display device of the fifth embodiment of the present invention.
Figure 25:
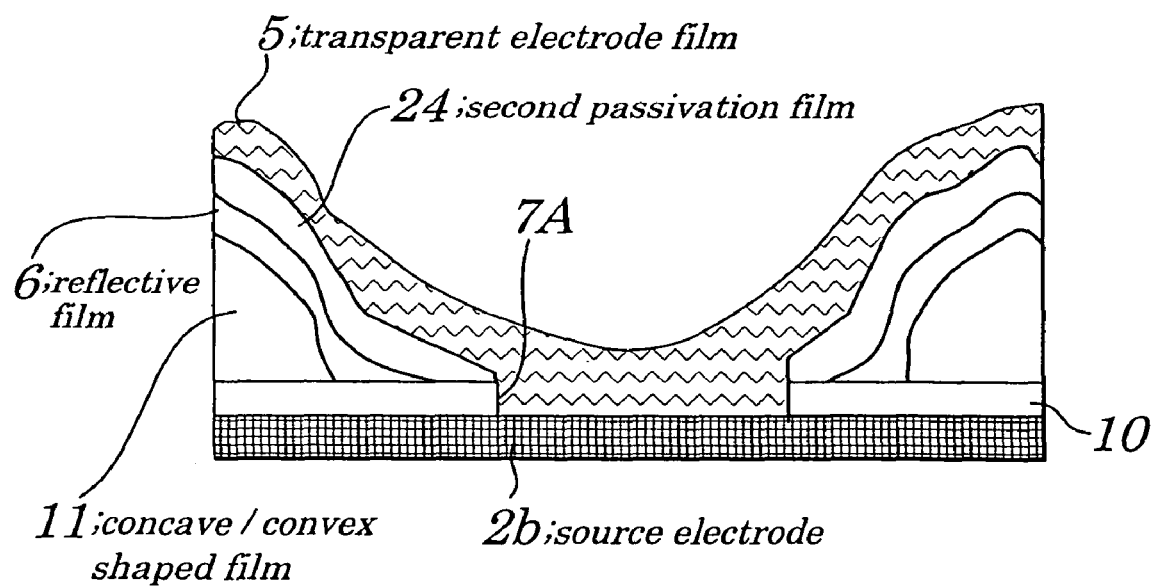
FIG. 25 is a cross-sectional view of the expanded structure of the main portion of the semi-transmissive-type liquid crystal display device of FIG. 24 taken along a line F-F.
Figure 26:
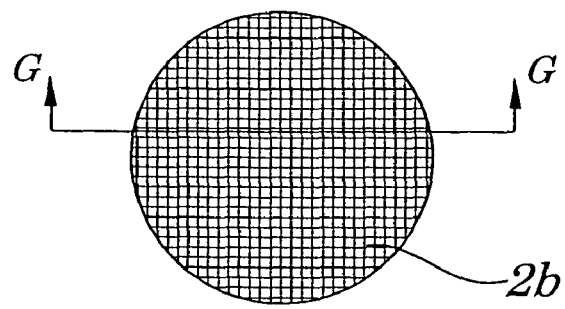
FIG. 26 is a plan view of an expanded structure of another main portion of the semi-transmissive-type liquid crystal display device of the fifth embodiment of the present invention.
Figure 27:
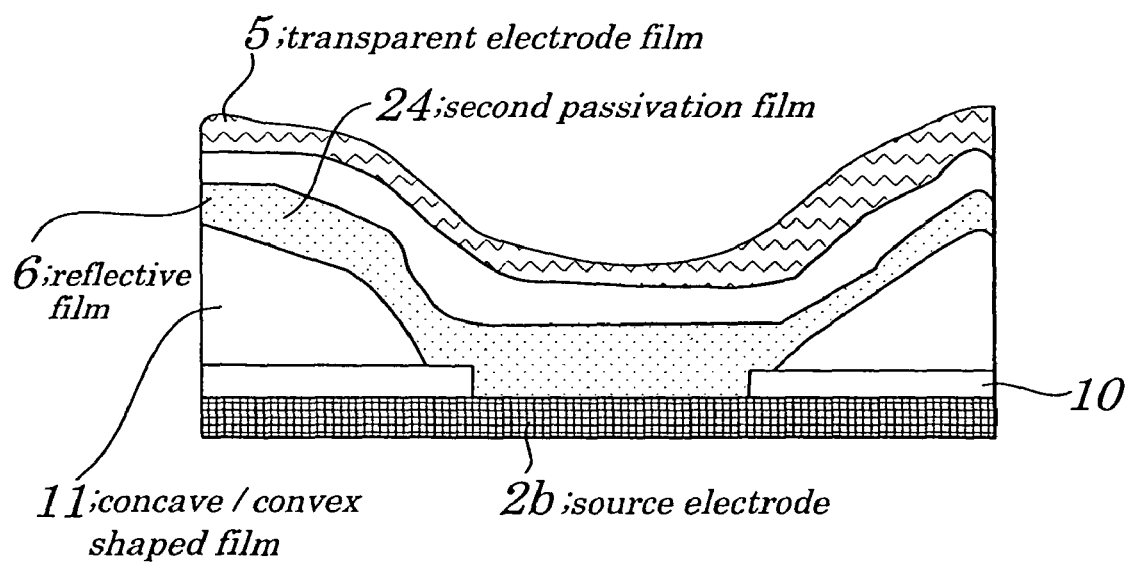
FIG. 27 is a cross-sectional view of the expanded structure of the main portion of the semi-transmissive-type liquid crystal display device of FIG. 26 taken along a line G-G.
Figure 29A:
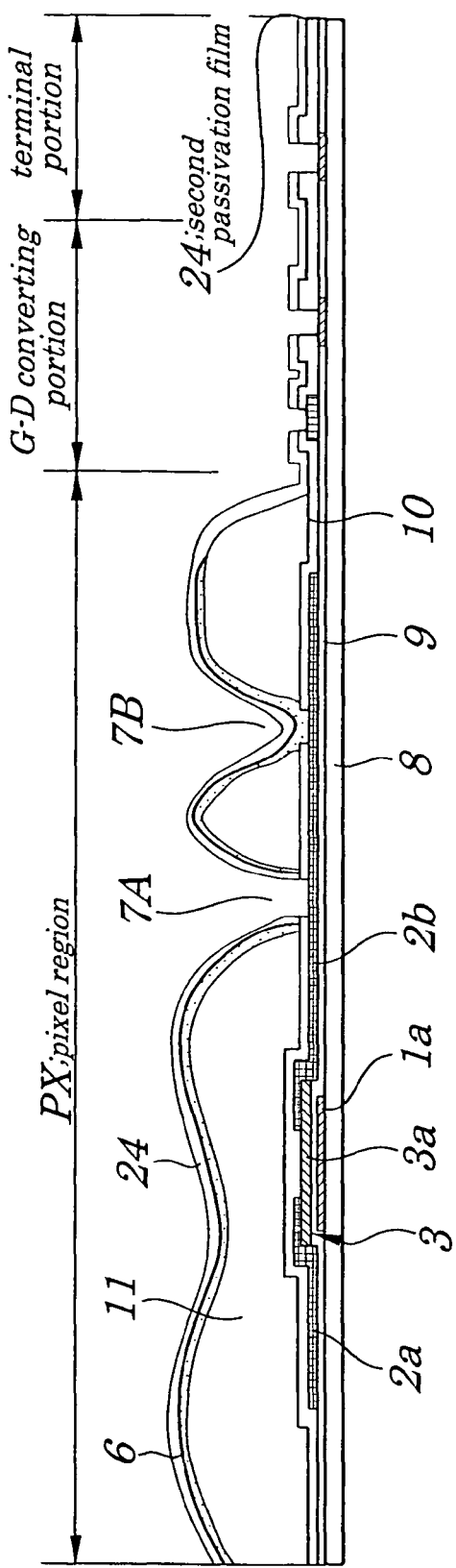
FIGS. 29A and 29B are also process charts illustrating a method of manufacturing the semi-transmissive-type liquid crystal display device in order of step according to the fifth embodiment of the present invention.
Figure 29B:
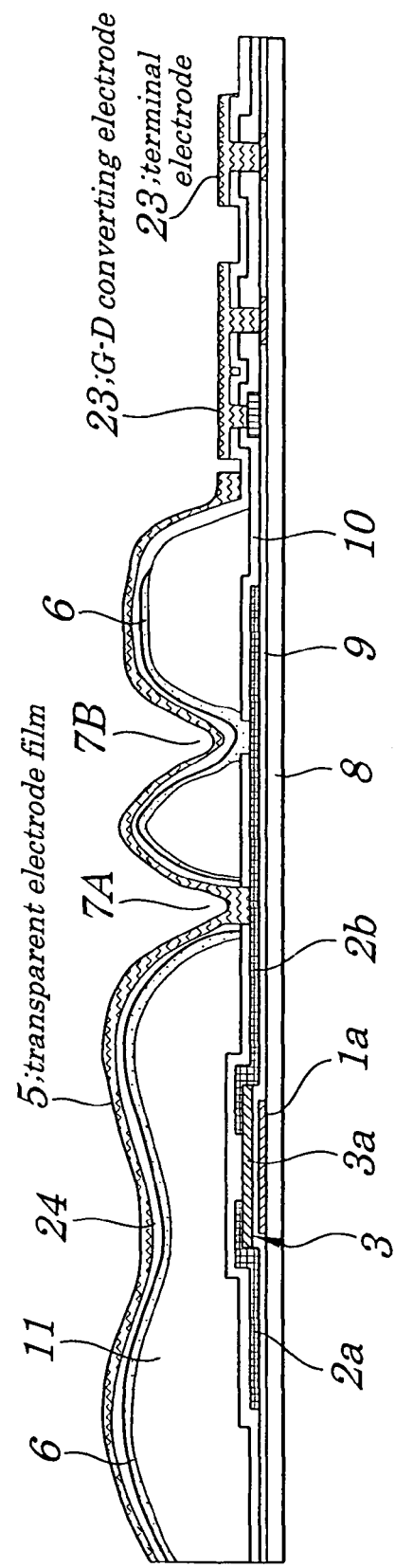
Figure 30:
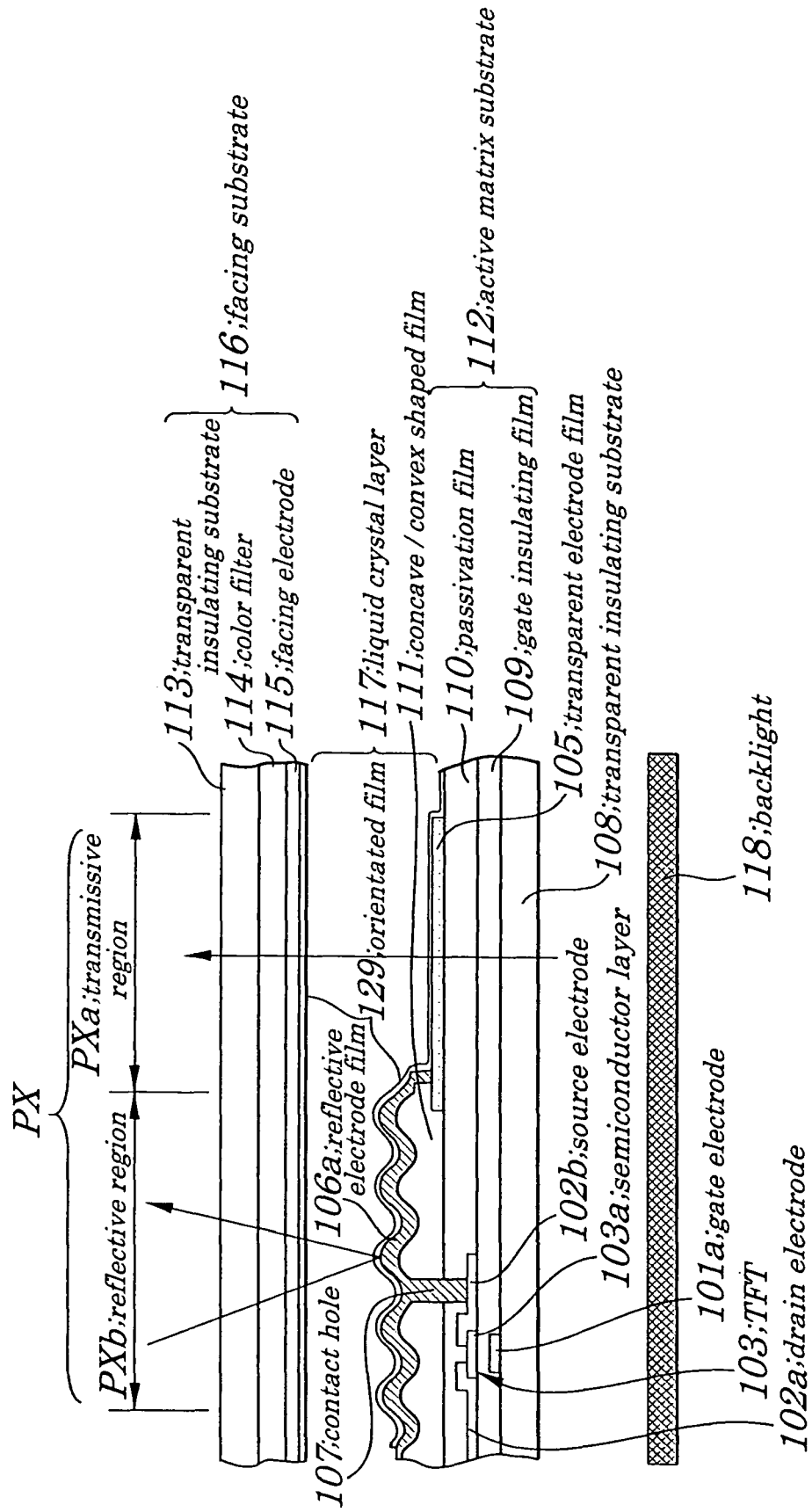
FIG. 30 is a plan view for showing configurations of a conventional semi-transmissive-type of a liquid crystal display device.
Figure 31A:
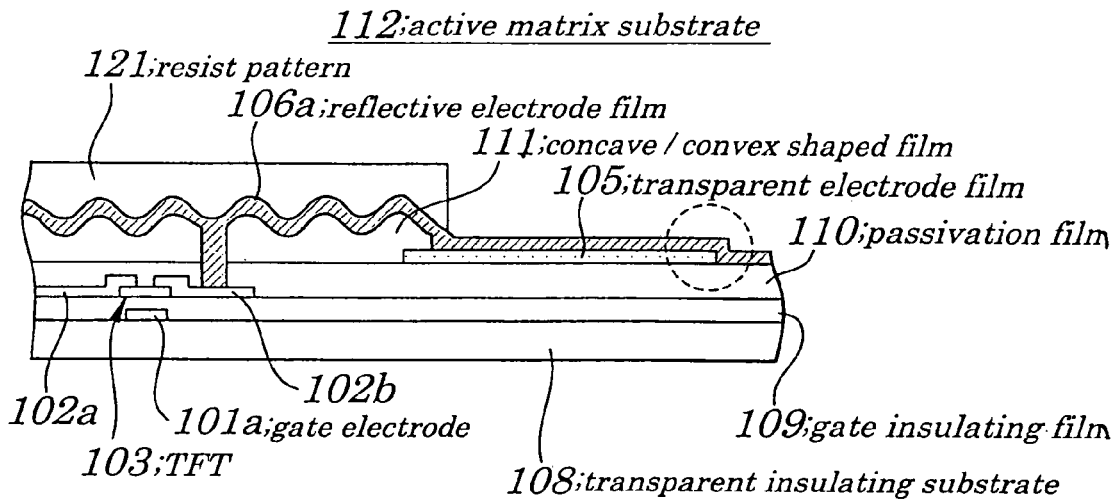
FIGS. 31A, 31B, and. 31C are diagrams illustrating problematic points in the conventional semi-transmissive-type liquid crystal display device.
Figure 31B:
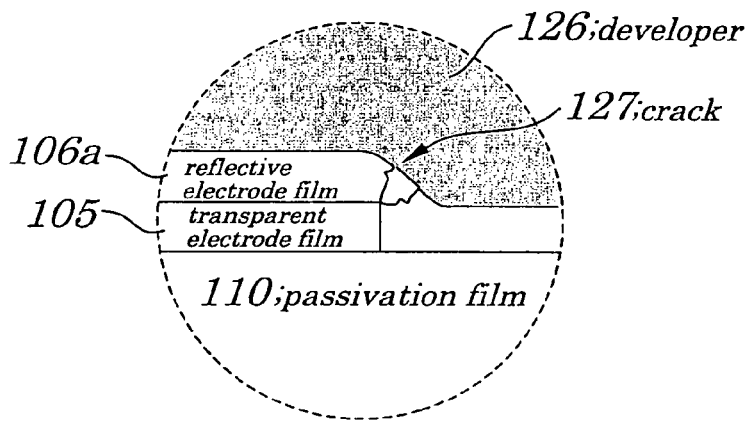
Figure 31C:
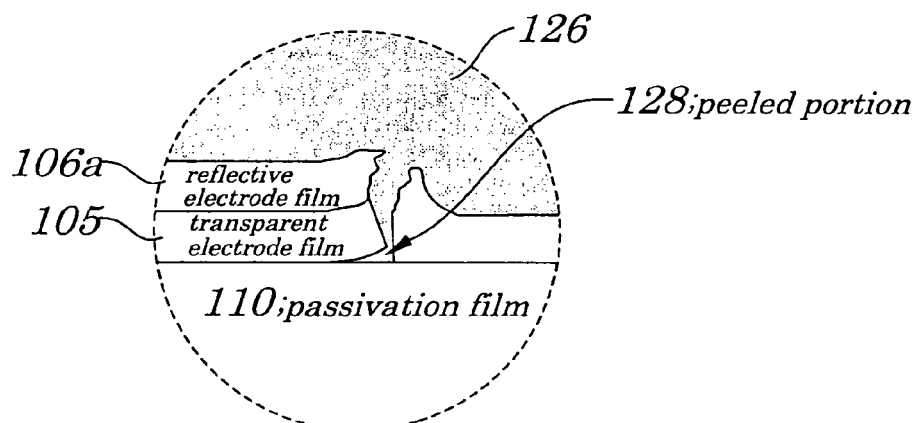
Figure 32:
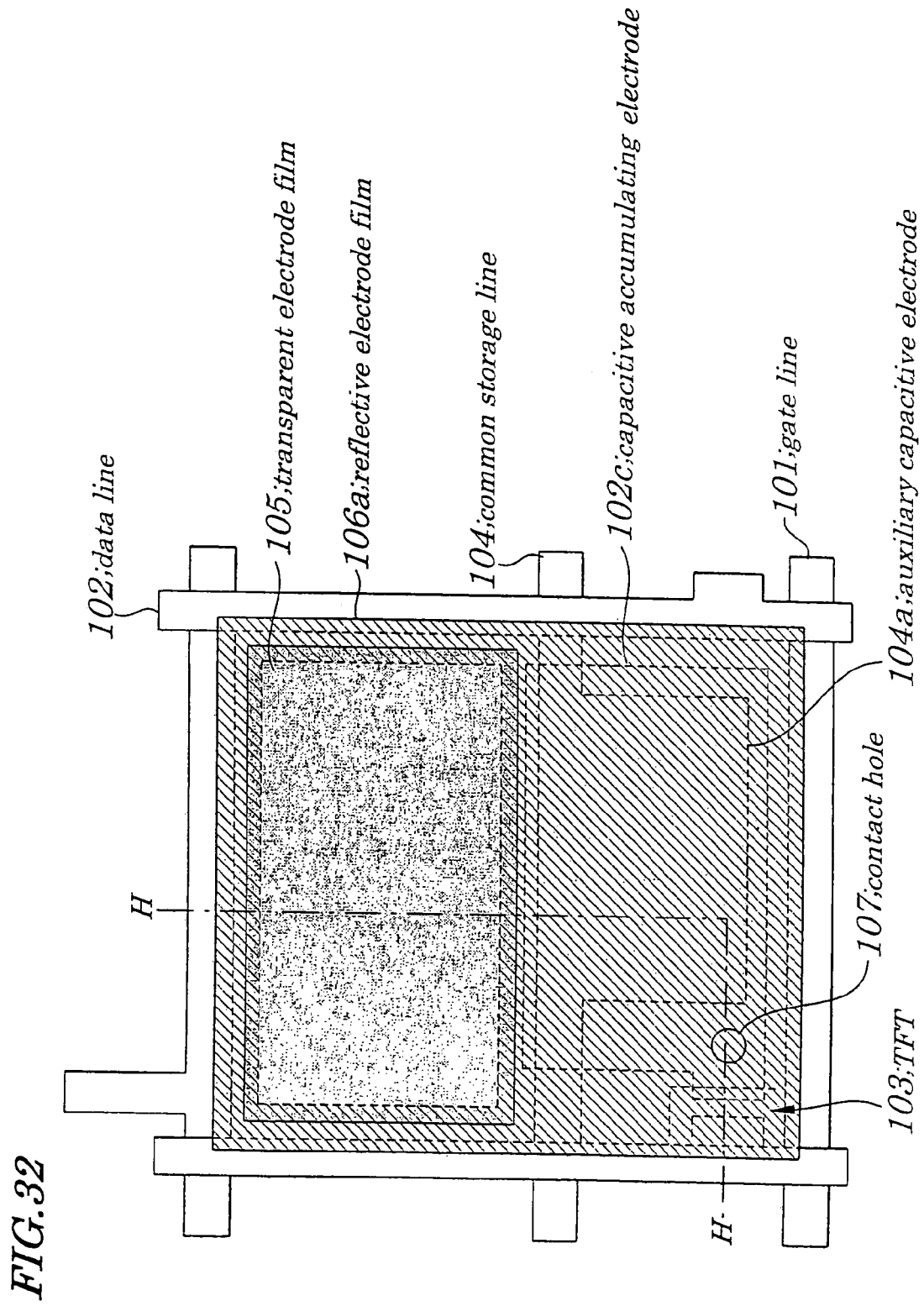
FIG. 32 is a plan view of a semi-transmissive-type liquid crystal display device for explaining a preface of the present invention.
Figure 33:
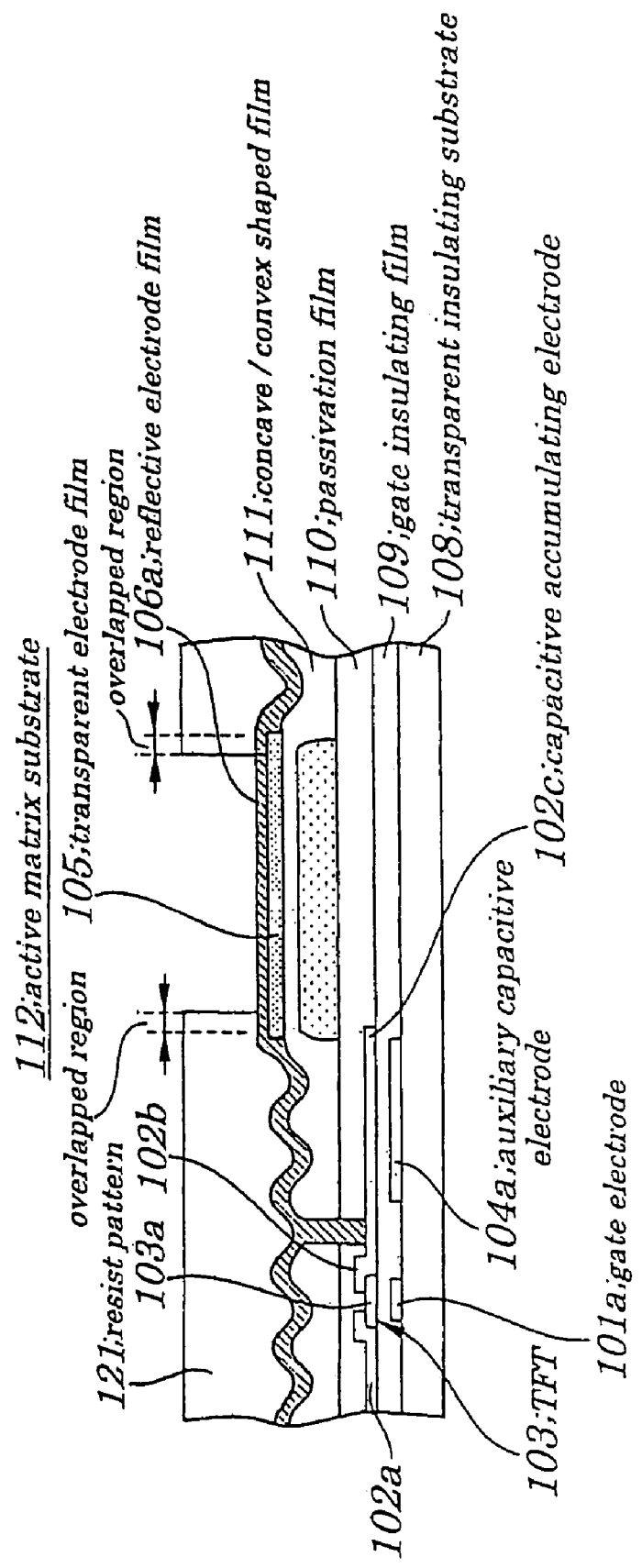
FIG. 33 is a cross-sectional view of the semi-transmissive-type liquid crystal display of FIG. 32 taken along a line H-H.
Figure 34:
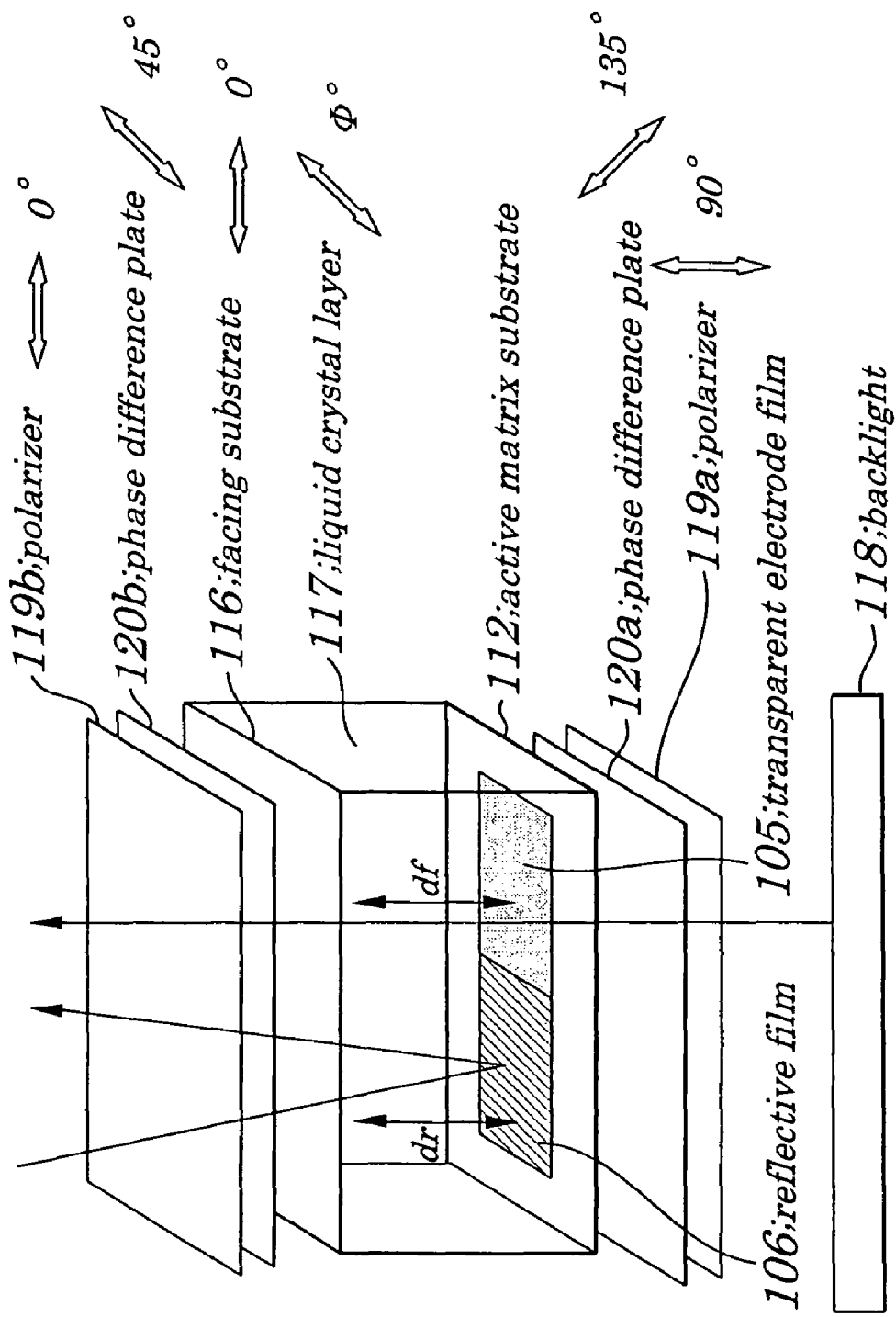
FIG. 34 is a diagram showing an outline of configurations of the conventional semi-transmissive-type liquid crystal display device needed to optimize intensity of outgoing light in its transmissive region and reflective region.
Figure 35:
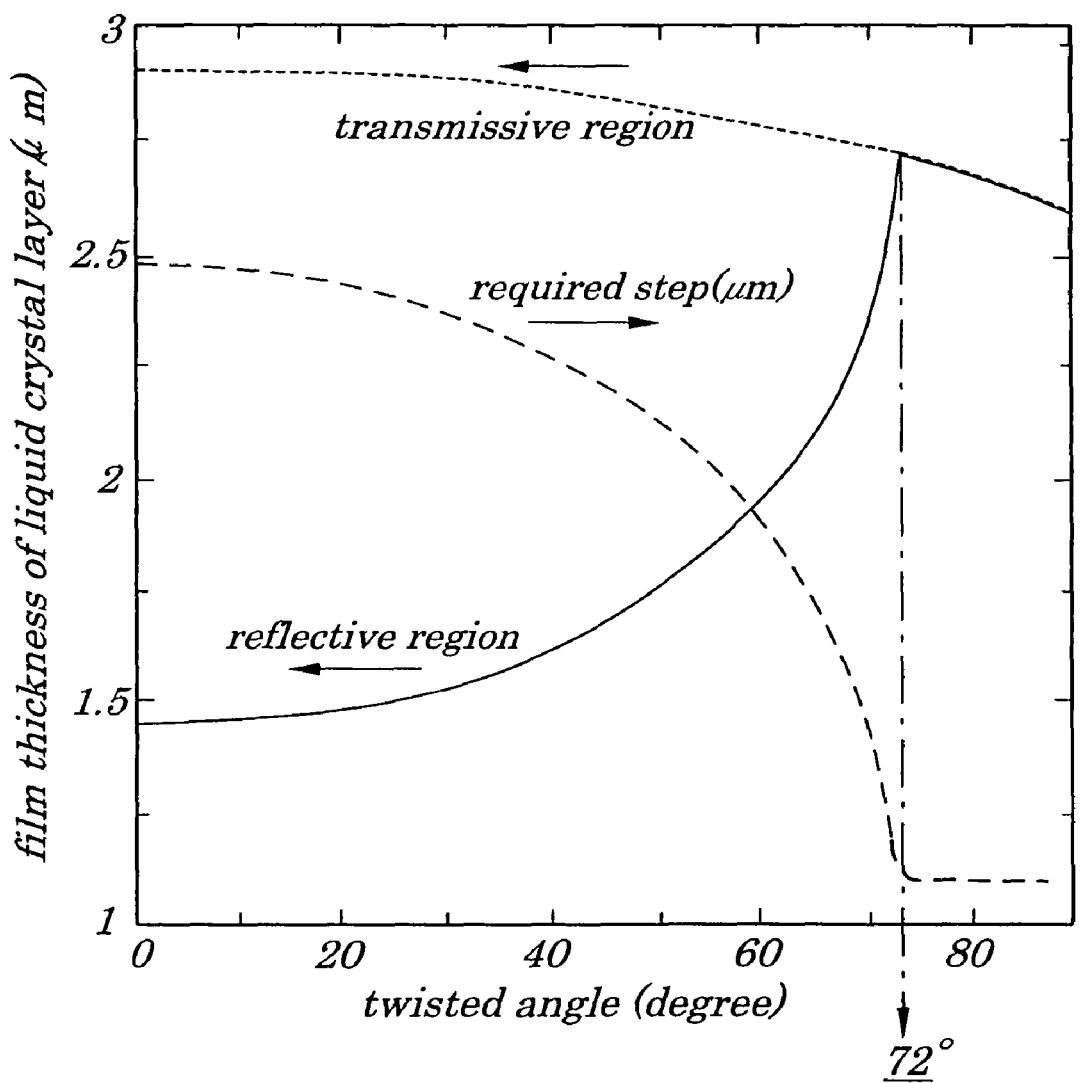
FIG. 35 is a diagram illustrating a relation between a twisted angle of a liquid crystal and a layer thickness of the liquid crystal layer in the conventional semi-transmissive-type liquid crystal display device of FIG. 34.
Figure 36:
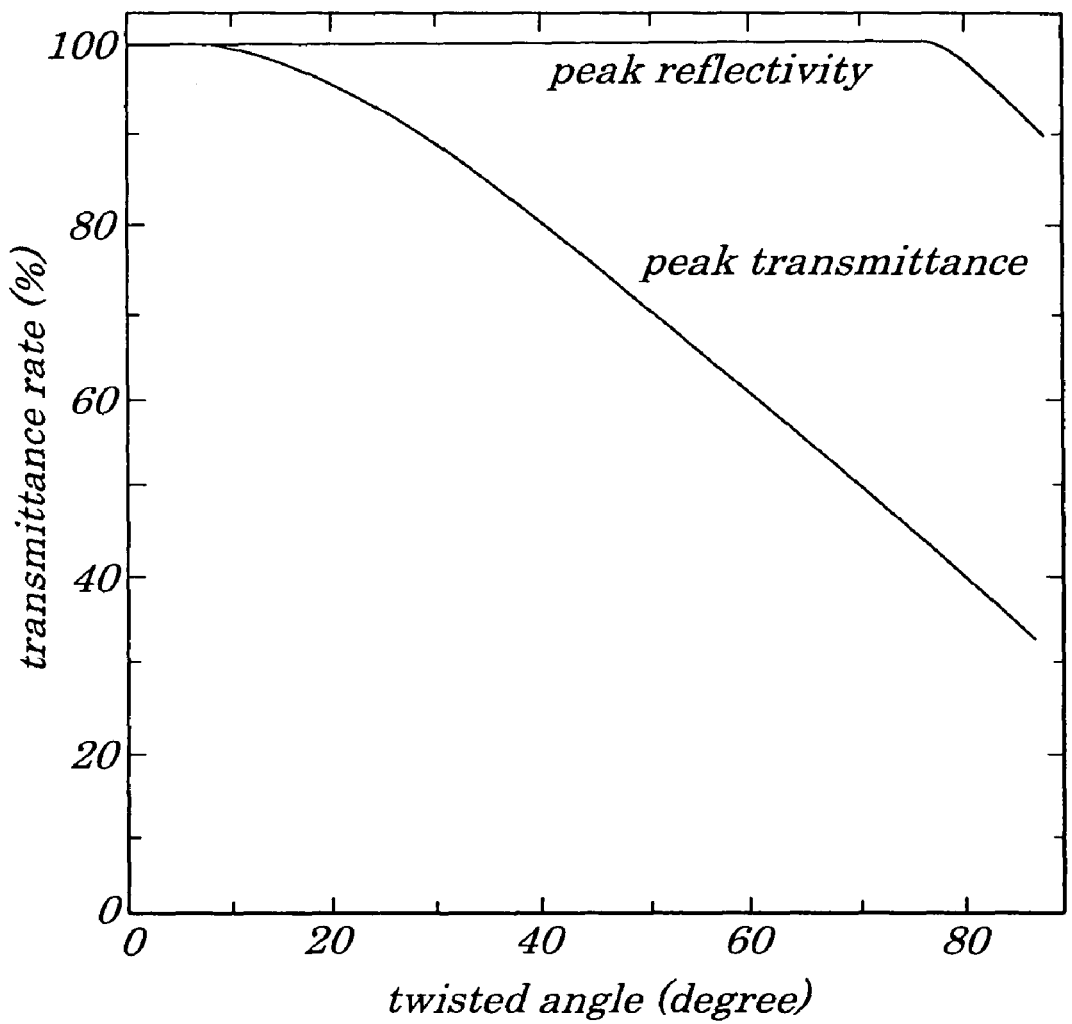
FIG. 36 is a diagram illustrating a relation among a twisted angle of a liquid crystal, a transmittance of the liquid crystal and a reflectivity of-the liquid crystal in the conventional semi-transmissive-type liquid crystal display device of FIG. 34.

22 taken along a line E-E. FIG. 24 is a plan view of an expanded structure of a main portion of the semi-transmissive-type liquid crystal display device of the fifth embodiment. FIG. 25 is a cross-sectional view of the expanded structure of the main portion of the semi-transmissive-type liquid crystal display device of FIG. 24 taken along a line F-F. FIG. 26 is a plan view of an expanded structure of another main portion of the semi-transmissive-type liquid crystal display device of the fifth embodiment of the present invention. FIG. 27 is a cross-sectional view of the expanded structure of the main portion of the semi-transmissive-type liquid crystal display device of FIG. 26 taken along a line G-G. FIGS. 28A, 28B, 28C, and 28D are process charts illustrating a method of manufacturing the semi-transmissive-type liquid crystal display device in order of step according to the fifth embodiment. FIGS. 29A and 29B are also process charts illustrating a method of manufacturing the semi-transmissive-type liquid crystal display device in order of step according to the fifth embodiment. Configurations of the semi-transmissive-type liquid crystal display device of the fifth embodiment differ from those in the above fourth embodiment in that, in order to prevent a fluctuation of a potential of the reflective film, two contact holes are formed in a second passivation film and, in each of the contact holes, the reflective film and transparent electrode film are connected respectively to the source electrode. In the semi-transmissive-type liquid crystal display-device of the fifth embodiment, as shown in FIG. 22 to FIG. 27 and as in the case of the first embodiment, the transparent electrode film 5 is formed above the reflective film 6 with the second passivation film 24 being interposed between the reflective film 6 and the transparent electrode film 5 and, as in the case of the fourth embodiment, each of the reflective film 6 and the transparent electrode film 5 is connected to the source electrode 2b, and the source electrode 2b is connected to the transparent electrode film 5 through a first contact hole 7A formed in the second passivation film 24 and the source electrode 2b is connected to the reflective film 6 through a second contact hole 7B formed in the second passivation film 24.

Moreover, FIGS. 24 to 27 show positional relations among the passivation film 10 in the first and second contact hole 7A and 7B, concave/convex shaped film 11, reflective film 9, second passivation film 24 and transparent electrode film 5. That is, in the first contact hole 7A, the concave/convex shaped film 11 is placed in its most outer region and, in an inside of the concave/convex shaped film 11 are placed the reflective film 6, passivation film 10, second passivation film 24, and transparent electrode film 5. In the second contact hole 7B, the concave/convex shaped film 11 is placed in its most outer region and, in an inside of the concave/convex shaped film 11 are placed the passivation film 10, reflective film 6, second passivation film 24, and transparent electrode film 5. As shown in FIG. 25, the transparent electrode film 5 is connected to the source electrode 2b and, as shown in FIG. 27, the reflective film 6 is connected to the source electrode 2b. Moreover, as shown in FIG. 25, in the first contact hole 7A, if the reflective film 6 is placed outside of the concave/convex shaped film 11, since there is a fear that stepping of the transparent electrode film 5 occurs due to a step of the reflective film 6 and due to a sharp inclination caused by a concave and convex portion of the concave and convex shaped film 11, it is preferable that the reflective film 6 is placed inside of the concave/convex shaped film 11.

If, in order to prevent a fluctuation in a potential of the reflective film 6, the reflective film 6 and transparent electrode film 5 are connected to the source electrode 2b at two different points (first region 7a and second region 7b) within the contact hole formed in the second passivation film 24 as in the case of the fourth embodiment, it is necessary to make large a diameter of the contact hole 7, which causes a freedom in arrangement positions of the contact hole 7 to be reduced and a reflection characteristic to be lowered.

To solve this problem, in the fifth embodiment, the reflective film 6 is connected to the source electrode 2b in the first contact hole 7A formed in the second passivation film 24 and the transparent electrode film 5 is connected to the source electrode 2b in the second contact hole 7B formed in the first passivation film 24. Since this enables the diameters of the first contact hole 7A and of the second contact hole 7B to be decreased, a freedom in arrangement positions in each of the first contact hole 7A and second contact hole 7B is increased. Therefore, since each of the first contact hole 7A and the second contact hole 7B can be placed in a portion (flat part in the concave and convex portions) not being attributable to a reflection characteristic, out of the concave and convex portions of the reflective film 6, it is made possible to have the reflective film 6 be connected to the TFT 3.

Next, a method for manufacturing the semi-transmissive-type liquid crystal display device of the fifth embodiment is explained in order of step by referring to FIGS. 28A to 28D to FIGS. 29A and 29B. FIGS. 28A to 28D and FIGS. 29A and 29B are cross-sectional views of the semi-transmissive-type liquid crystal display device of FIG. 22 taken along a line E-E.

First, as shown in FIG. 28A, after a gate line 1 (not shown), a gate electrode 1a, a common storage line 4 (not shown), and an auxiliary capacitive electrode 4a (not shown) have been formed on a transparent insulating substrate 8 made of glass or a like by approximately the same method as employed in the first to fourth embodiments, a semiconductor layer 3a is formed with a gate insulating film 9 being interposed between the semiconductor layer 3a and the gate electrode 1a. Next, a data line 2 (not shown), a drain electrode 2a, the source electrode 2b, and a capacitive accumulating electrode 2c (not shown) are formed to construct the TFT 3 and then the passivation film 10 is formed.

Then, as shown in FIG. 28B, after the passivation film 10 has been coated with a photosensitive acrylic resin, an acrylic resin is removed from the first contact hole 7, the second contact hole, a G-D converting section placed outside of the pixel region PX and a terminal region, and a concave/convex shaped film 11 is formed in a reflective region PXb and transmissive region PXa containing the TFT 3. In this case, in order to suppress attenuation of transmitted light caused by the concave/convex film 11, it is preferable that exposure processing is performed on all the surfaces thereof and decoloring of the acrylic film is made.

Then, as shown in FIG. 28C, by removing the passivation film 10 placed below the second contact hole 7B using a resist pattern formed on the concave/convex shaped film 11 as a mask, only the source electrode 2b is made exposed. At this point, unlike in the case of the fourth embodiment, the passivation film 10 in the G-D converting portion and in the terminal portion and the gate insulating film 9 are removed.

Then, as shown in FIG. 28D, after Al has been formed on all the surfaces thereof, Al in the transmissive region PXa is removed using a resist pattern as a mask and the reflective film 6 is formed on the reflective region PXb. At this point, in order to prevent light from an outside from entering the TFT 3, it is preferable that the reflective film 6 is formed also on the TFT 3. Furthermore, a G-D converting electrode 22 is formed using a reflective film 6. An aim of forming the G-D converting electrode 22 using the reflective film 6 unlike in the case of the fourth embodiment is to suppress degradation of characteristics of a TFT array caused by plasma damage occurring at the time of sputtering used to form the second passivation film 24 made of SiO$_x$ or a like, by dropping a potential of the TFT array, data line, or a like to a ground level and by forming a shunt-transistor using the G-D converting electrode 22.

Next, as shown in FIG. 29A, after an insulating film made of SiO$_x$ has been deposited on all the surfaces thereof by using a plasma CVD method or a like, a resist pattern is formed on the insulating film to form the second passivation film 24. Next, selective etching is performed on the second passivation film 24 below the first contact hole 7 and the second passivation film 24 in the terminal portion. Then, selective etching is also performed on the passivation film 10 in the terminal portion and the gate insulating film 9 to have the first source electrode 2b be exposed and, at a same time, a contact hole is formed in the G-D converting portion and in the terminal portion. Moreover, a removing process to be performed on the passivation film 10 in the terminal portion and on the gate insulating film 9 and a removing process to be performed on the passivation film 10 below the second contact hole 7B shown in FIG. 28C may be simultaneously performed.

Then, as shown in FIG. 29B, after a transparent conductive film made of ITO has been deposited on all the surfaces thereof by using a sputtering method, the transparent electrode film 5, G-D converting electrode 22, and terminal electrode 23 are simultaneously formed by using a resist pattern as a mask in a manner so as to cover all surfaces of pixels.

Then, an orientated film 29 made of polyimide is formed on the active matrix substrate 12 to complete the formation of the active matrix substrate 12. Next, a facing substrate 16 is prepared which includes a color filter 14, black matrix (not shown), facing electrode 15, orientated film 29 having been formed sequentially on the transparent insulating substrate 13. Then, by inserting a liquid crystal layer 17 between the active matrix substrate 12 and the facing substrate 16 and by placing phase difference plates 20a and 20b and polarizers 19a and 19b on both sides of the active matrix substrate 12 and facing substrate 16 respectively and by placing the backlight source 18 on a rear of the polarizer 19a placed on a side of the active matrix substrate 12, the semi-transmissive-type liquid crystal display device of the embodiment as shown in FIG. 23 and FIG. 24 is manufactured.

Moreover, in the embodiment, an example is explained in which the transparent electrode film 5 is formed above the reflective film 6 with the second passivation film 24 being interposed between the transparent electrode film 5 and the reflective film 6. However, if the second passivation film is not employed, there is a fear that contact resistance between the reflective film 6 and the transparent electrode film 5 becomes high and even in such the case, by employing the configurations employed in the embodiment, a fluctuation in a potential of the reflective film 6 can be suppressed.

Thus, according to the semi-transmissive-type liquid crystal display device of the fifth embodiment and the method for manufacturing the same, in order to prevent a fluctuation of a potential of the reflective film 6, since, by using the contact hole 7 formed in the second passivation film 24, each of the reflective film 6 and the transparent electrode film 5 is connected to the source electrode 2b and each of the reflective film 6 and the transparent electrode film 5 is connected to the source electrode 2b through the first contact hole 7A and the second contact hole 7B formed in the second passivation film 24, a freedom of arrangement positions in each of the contact holes 7A and 7B can be increased. Therefore, the reflective film 6 can be connected to the TFT 3 without lowering a reflective characteristic.

Moreover, according to the semi-transmissive-type liquid crystal display device of the fifth embodiment and the method for manufacturing the same, before the second passivation film 24 is formed, by forming the G-D converting electrode 22 using the reflective film 6, a potential of the TFT array, data line, or a like can be dropped to a ground potential and, therefore, it is possible to suppress degradation of characteristics of the TFT caused by plasma damage occurring at the time of the formation of the second passivation film.

It is apparent that the present invention is not limited to the above embodiments but may be changed and modified without departing from the scope and spirit of the invention. For example, in the above embodiments, the example is shown in which a transmissive gap and a reflective gap are optimized when a twisted angle is set at about 0°, about 60° and about 72°. However, the transmissive gap and reflective gap may be optimized by setting the twisted angle at any other degree. Also, in the above embodiments, the example is shown in which, as a material for the reflective film, Al or a material including an Al alloy is used and, as a material for the transparent electrode film, ITO is used. However, the present invention is not limited to the combination of Al and the material including Al alloy and/or ITO as the material for the reflective film, that is, so long as the combination of the materials suppresses an electric erosion reaction at the time of formation of a pattern, any combination may be employed. Also, in the above embodiments, the example is shown in which the TFT serving as a switching element is formed on the active matrix substrate. However, it is not necessary that the TFT is formed on a side of the active matrix. Furthermore, the relation between the reflective film and transparent electrode film employed in the semi-transmissive-type liquid crystal display device is applied not only to each pixel but also to each segment (sub-pixel) making up the pixel.

What is claimed is:

1. A method for manufacturing a semi-transmissive-type liquid crystal display device comprising a first substrate including a plurality of signal electrodes being arranged in parallel to one another along a first direction; a plurality of scanning electrodes being arranged in parallel to one another along a second direction orthogonal to said first direction and a plurality of pixel regions each having a pixel electrode being placed in a one-to-one correspondence to an intersection between each of said signal electrodes and each of said scanning electrodes; a second substrate; a liquid crystal layer inserted between said first substrate and said second substrate; a backlight source to feed light to said liquid crystal layer; and wherein each of said pixel regions includes a reflective region having a reflective film to receive ambient light from an outside and to display in a reflective manner while being in a reflective display mode, and a transmissive region having a transmissive electrode film to allow light from said backlight source to be transmitted to display in a transmissive manner at time of operations in a transmissive display mode, said method comprising:

a first process of forming said reflective film making up said reflective region on a surface of said first substrate facing said second substrate, said first substrate and said second substrate having a first gap there between in said reflective region; and a second process of forming said transparent electrode film making up said transmissive region in a manner that said transparent electrode film covers part or all of said reflective film, said first substrate and said second substrate having a second gap there between in said transmissive region, wherein said first gap and said second gap are set approximately equal, and wherein a twisted angle of said liquid crystal is set to about 72°.

2. The method for manufacturing a semi-transmissive-type liquid crystal display device according to claim 1, comprising a third process of forming an insulating film on said reflective film to be performed between said first process and said second process.

3. The method for manufacturing a semi-transmissive-type liquid crystal display device according to claim 2, further comprising a fourth process of forming a contact hole to electrically connect said reflective film and said transparent electrode film in said insulating film.

* * * * *